United States Patent [19]
Watanabe et al.

[11] Patent Number: 5,519,518
[45] Date of Patent: May 21, 1996

[54] DISPLAY APPARATUS WITH A VARIABLE APERTURE STOP MEANS ON EACH SIDE OF THE MODULATOR

[75] Inventors: Yoshihiro Watanabe, Yokohama; Hiroki Nakamura, Chigasaki; Nozomu Harada, Yokohama; Seiji Murakami, Fukaya; Tsutomu Sakamoto, Faukaya; Kazuki Taira, Kawasaki; Yutaka Saitoh, Fukaya, all of Japan

[73] Assignee: Kabushiki Kaisha Toshiba, Kawasaki, Japan

[21] Appl. No.: 479,641

[22] Filed: Jun. 7, 1995

Related U.S. Application Data

[62] Division of Ser. No. 363,776, Dec. 27, 1994.

[30] Foreign Application Priority Data

| Dec. 27, 1993 | [JP] | Japan | 5-331786 |
| Jun. 30, 1994 | [JP] | Japan | 6-150192 |
| Aug. 12, 1994 | [JP] | Japan | 6-190272 |
| Aug. 12, 1994 | [JP] | Japan | 6-190273 |
| Aug. 12, 1994 | [JP] | Japan | 6-190350 |

[51] Int. Cl.⁶ .............................................. G02F 1/1335
[52] U.S. Cl. ........................................... 359/40; 359/49
[58] Field of Search ............................ 359/40, 41, 48, 359/49; 352/89, 141; 354/227.1, 228, 229, 230

[56] References Cited

U.S. PATENT DOCUMENTS

| 4,537,481 | 8/1985 | Witty | 352/89 |
| 4,806,964 | 2/1989 | Tamada | 352/141 |
| 5,083,854 | 1/1992 | Zampolin | 359/40 |
| 5,260,815 | 11/1993 | Takizawa | 359/49 |
| 5,381,252 | 1/1995 | Chen | 359/40 |

FOREIGN PATENT DOCUMENTS

| 4113344 | 4/1992 | Japan . |
| 4291333 | 10/1992 | Japan . |
| 5188345 | 7/1993 | Japan . |
| 5-181166 | 7/1993 | Japan | 359/40 |
| 5216004 | 8/1993 | Japan . |
| 6-82746 | 3/1994 | Japan | 359/40 |

*Primary Examiner*—Anita Pellman Gross
*Assistant Examiner*—Tier H. Nguyen
*Attorney, Agent, or Firm*—Cushman Darby & Cushman

[57] ABSTRACT

A display apparatus includes a light source, a modulating device for modulating light emitted from the light source, a modulating device driving unit for driving the modulating device, a first aperture stop unit arranged between the light source and the modulating device to limit a bundle of rays to be incident on the modulating device from the light source, the first aperture stop unit having an aperture with a variable size, a display screen onto which exit light from the modulating device is projected, a projection optical system for projecting the exit light from the modulating device onto the display screen, a second aperture stop unit arranged between the modulating device and the projection optical system to limit a bundle of rays to be incident on the projection optical system from the modulating device, the second aperture stop unit having an aperture with a variable size, a photosensor for detecting the display luminance on the display screen, and an aperture control unit for controlling the size of the aperture of at least one of the first and second aperture stop units on the basis of a display luminance signal from the photosensor.

11 Claims, 32 Drawing Sheets

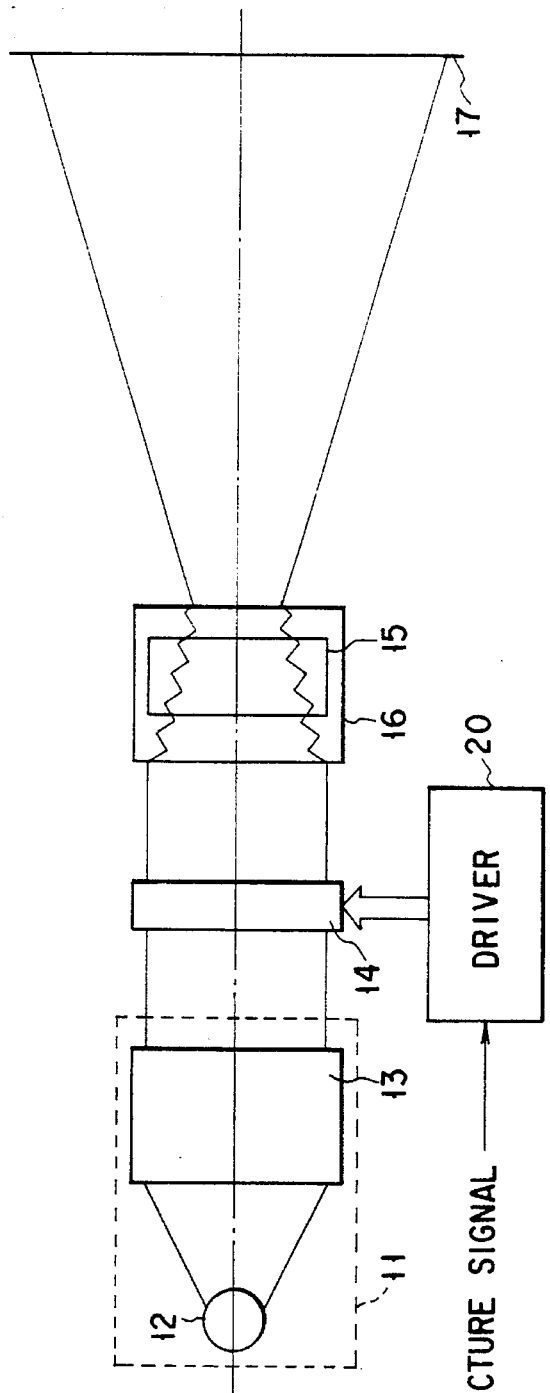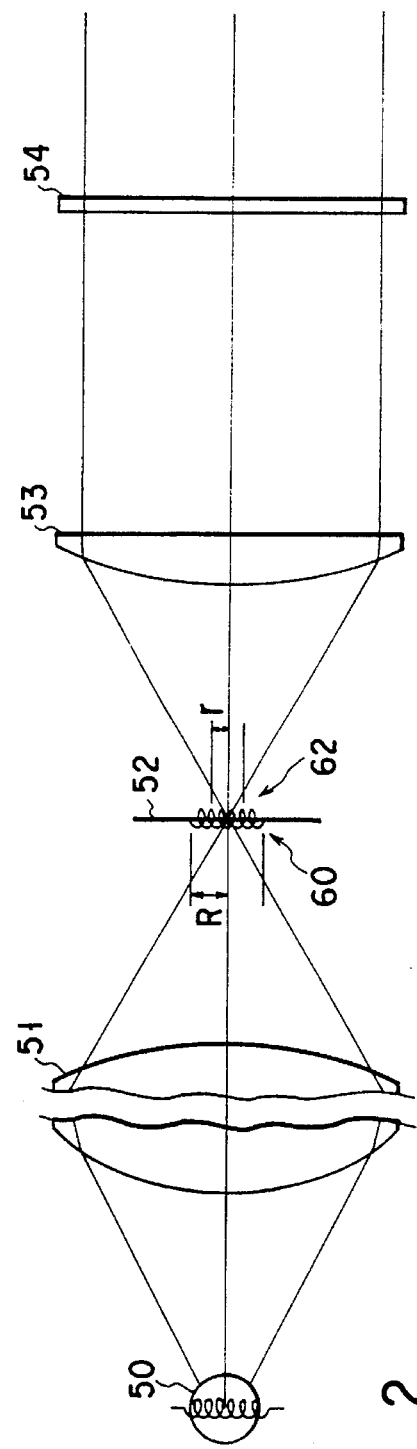
FIG. 1 PRIOR ART
FIG. 2

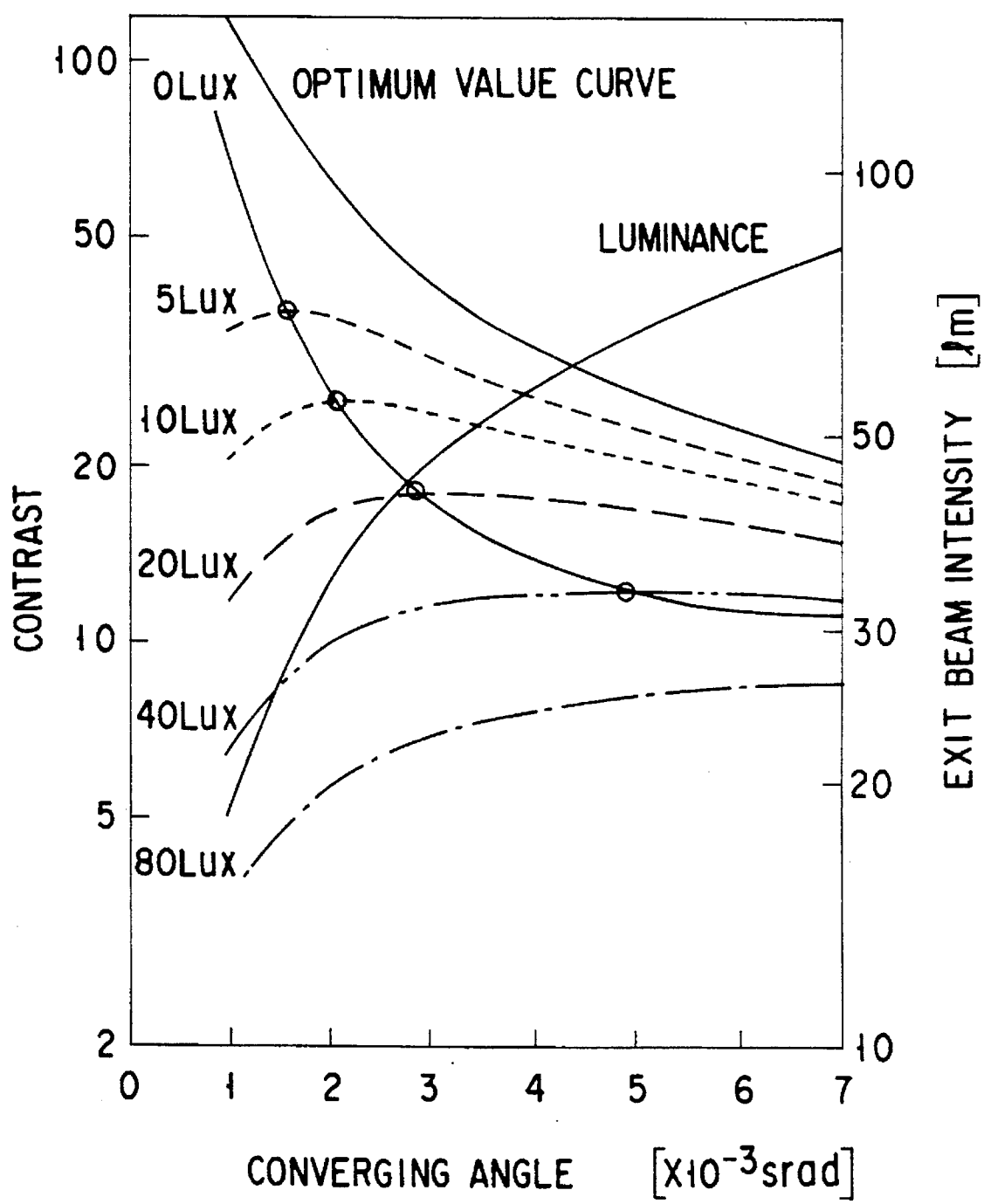
F I G. 5

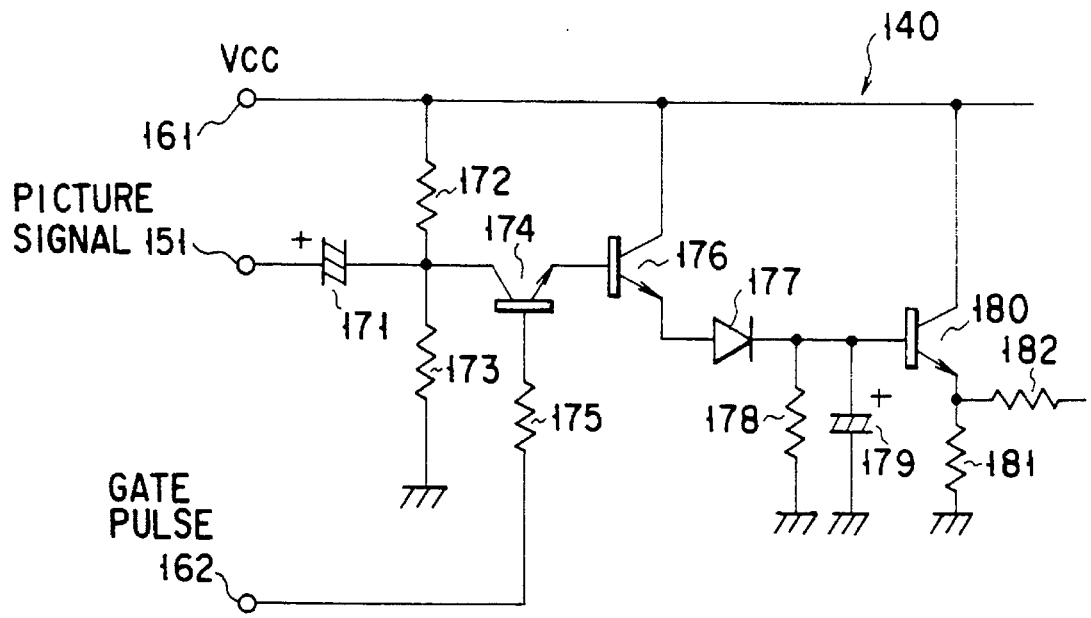
F I G. 14
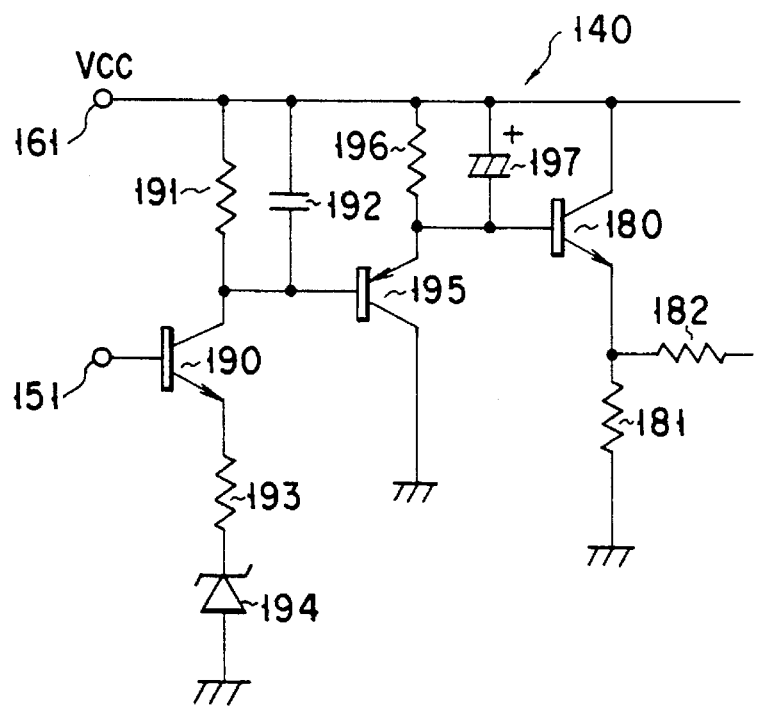
F I G. 16

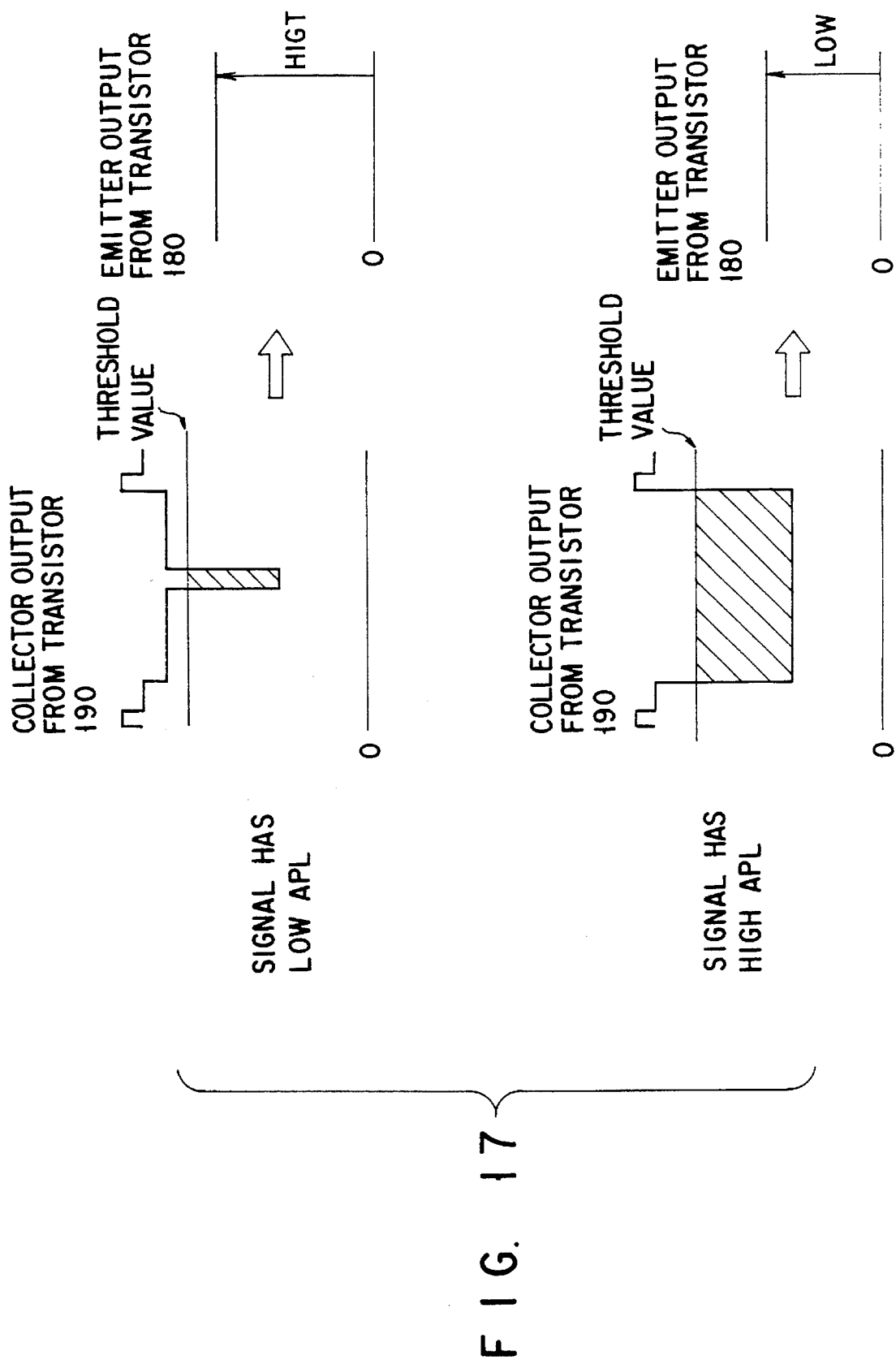

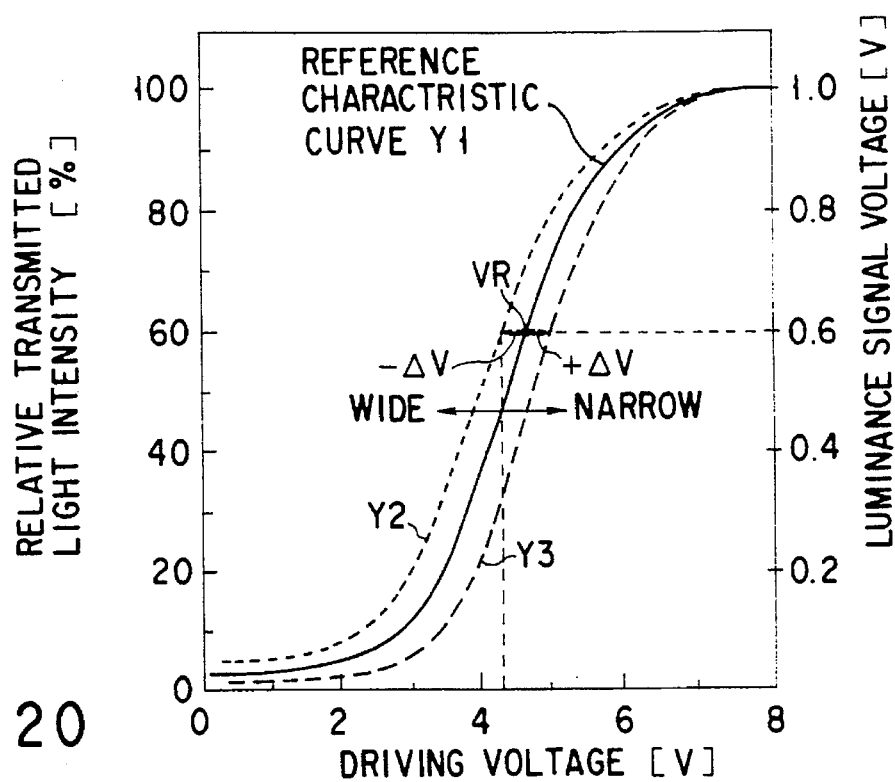
F I G. 20
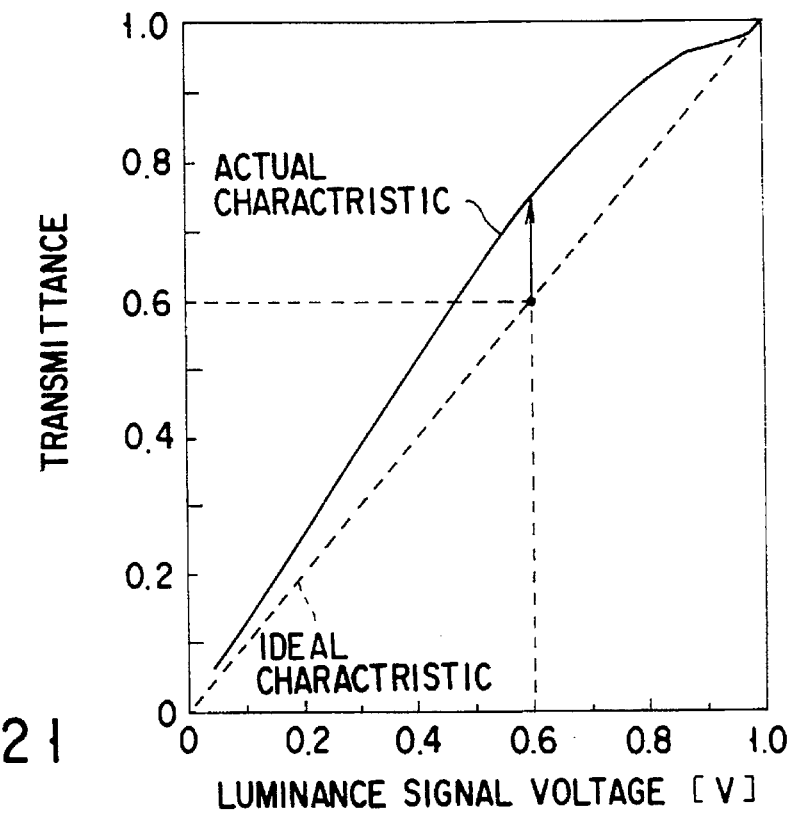
F I G. 21

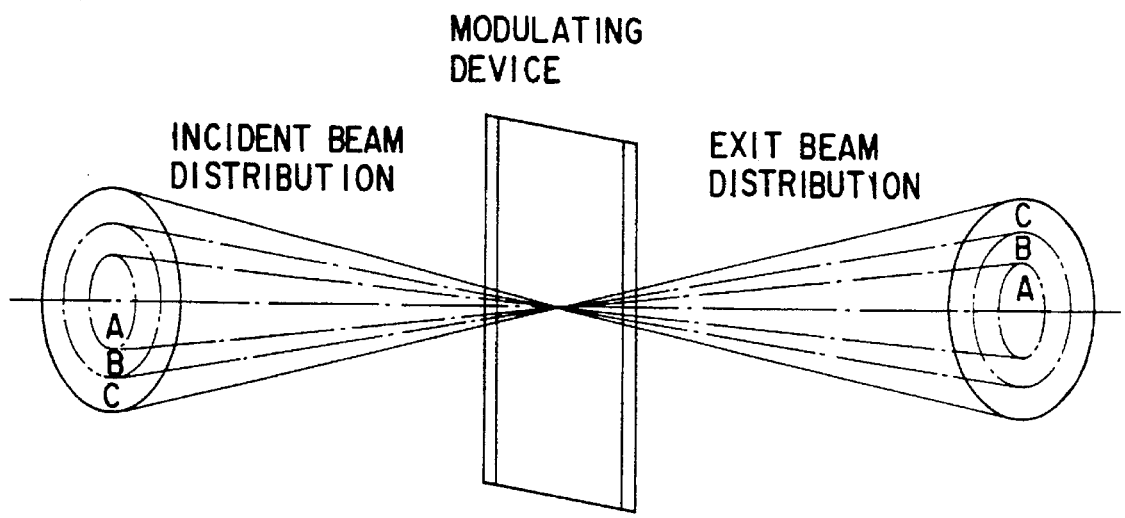
F I G. 22
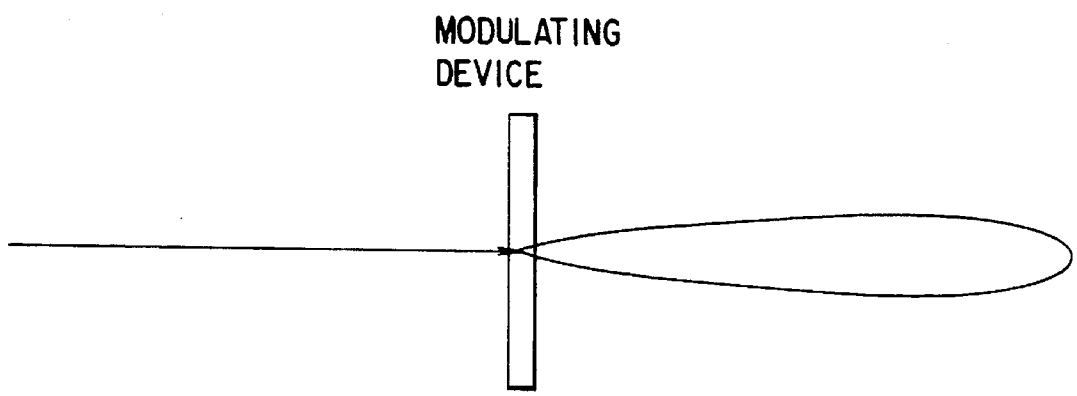
F I G. 23

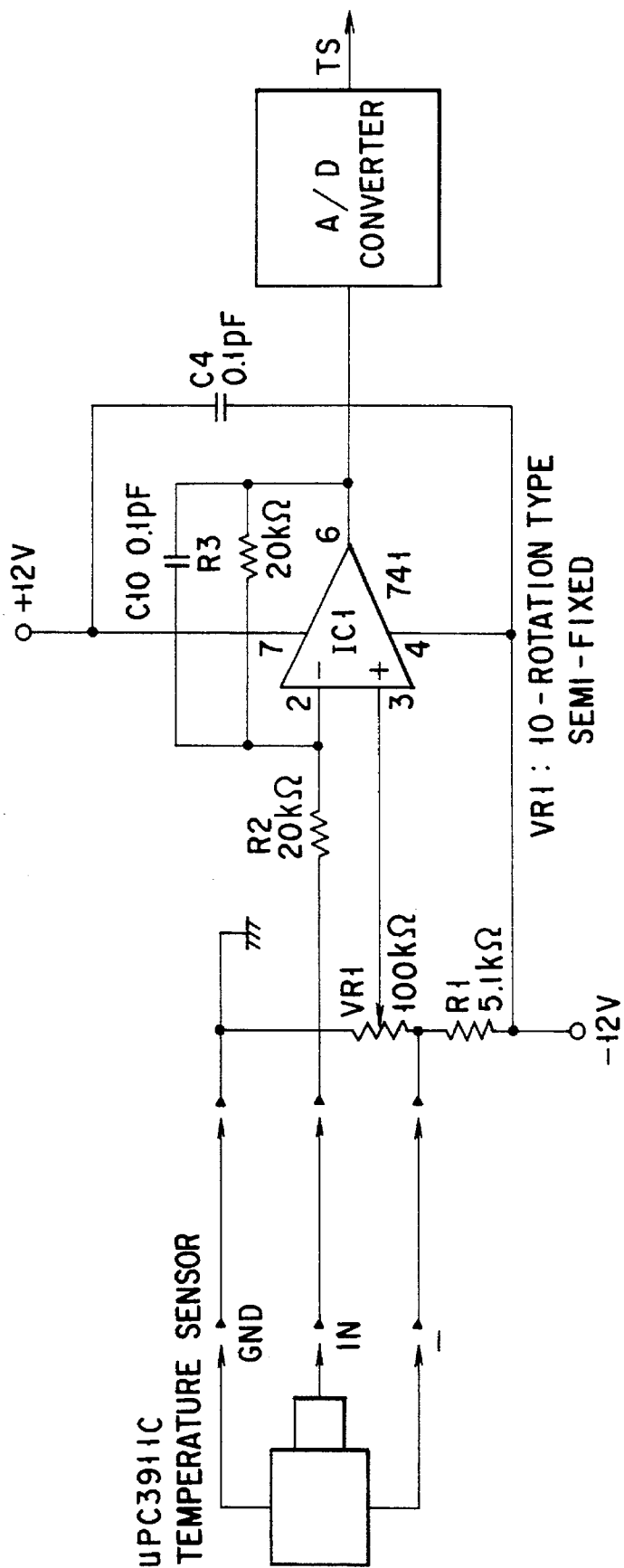
F I G. 32

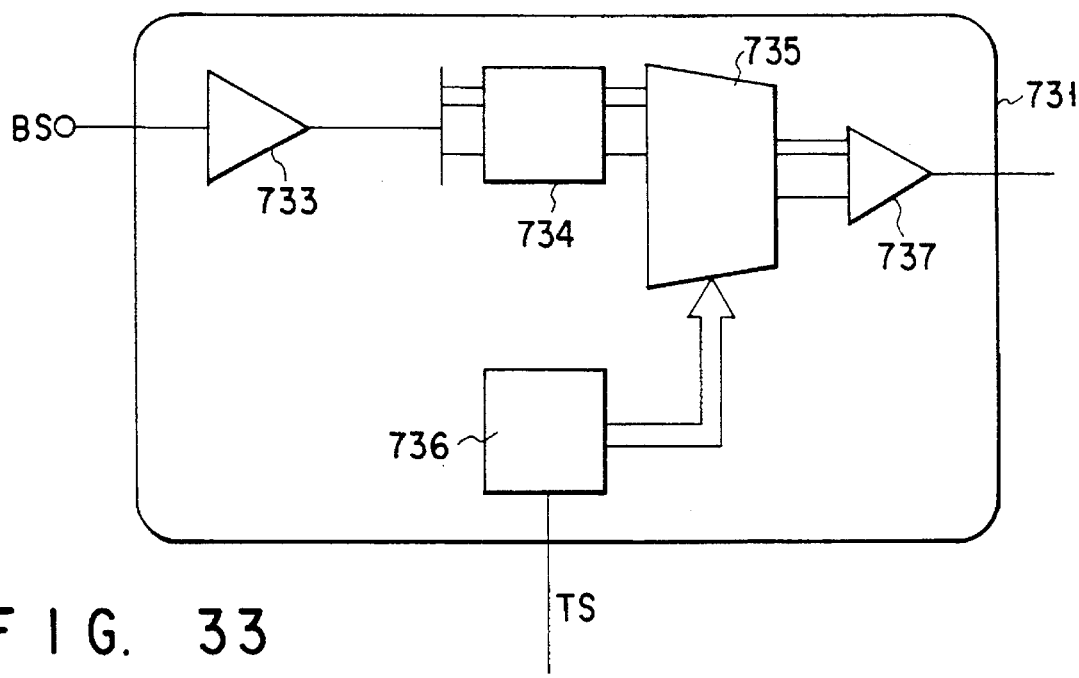
F I G. 33
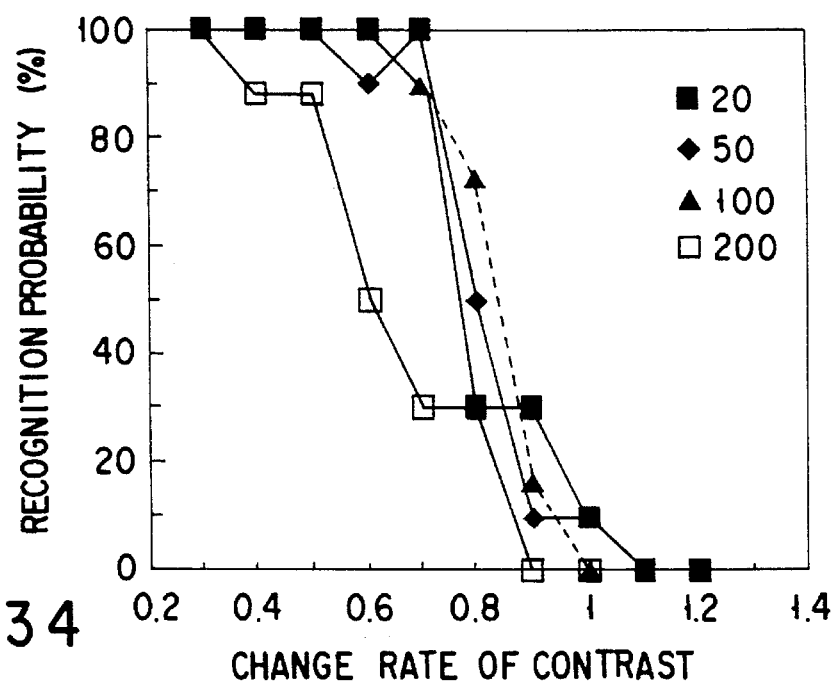
F I G. 34

DISPLAY APPARATUS WITH A VARIABLE APERTURE STOP MEANS ON EACH SIDE OF THE MODULATOR

This is a division of application Ser. No. 08/363,776, filed Dec. 27, 1994 pending.

BACKGROUND OF THE INVENTION

1. Field of the Invention

The present invention relates to a display apparatus for displaying images on the basis of picture signals and, more particularly, to a display apparatus for projecting light from a light source onto a screen via a modulating device.

2. Description of the Related Art

A plasma display panel and a modulating device are presently attracting attention as compact, light-weight flat display apparatuses which can replace CRT display apparatuses. These flat display apparatuses are roughly classified into two categories; i.e., a self-luminescing type display apparatus which emits light by itself in a display operation and a transmittance control type display apparatus which controls the transmittance of incident light from a separate light source in a display operation. For example, a plasma display panel belongs to the self-luminescing type, and a modulating device belongs to the transmittance control type. In particular, the modulating device is considered as the most promising display apparatus of the next generation, so the research and development of the modulating device are being done in various application fields.

As represented by a twisted nematic type modulating device introduced in Liquid Crystal Device Handbook, a general modulating device is characterized in that light which is linearly polarized by a polarizing plate is input to a liquid crystal layer having birefringence or optical rotatory power. Unfortunately, modulating devices of this sort have the drawback that the quantity of light obtained from the light source is reduced to about one half when the light passes through the polarizing plate.

Recently, a modulating device requiring no such polarizing plate as discussed above has been developed. This modulating device has either a polymer dispersion type liquid crystal layer in which a liquid crystal material is contained in a polymer resin, or a fine-particle dispersion type liquid crystal layer in which fine particles are contained in a liquid crystal material, between a pair of transparent electrode substrates, or between a transparent substrate and a reflective electrode substrate. This modulating device functions as a scattering type modulating device which modulates the spatial propagation direction of incident rays on the liquid crystal layer. In this device the use efficiency of the light from the light source is improved in comparison with that of an apparatus using a polarizing plate.

A modulating device having the polymer dispersion type liquid crystal layer is set in a milky white, light-scattering state, in which incident light rays are scattered, in a pixel region between electrodes applied with no voltage, and in a transparent, light-transmitting state, in which incident light rays are not easily scattered, in a pixel region between electrodes applied with a voltage. Therefore, the light-scattering property of each pixel region is so controlled that the intensity of the transmitted light or the reflected light changes in accordance with a picture signal. Consequently, one of the transmitted light and the reflected light is guided to the screen by a projection optical system.

The function of a modulating device having the fine-particle dispersion type liquid crystal layer is basically identical with that of the modulating device having the polymer dispersion type liquid crystal layer.

As a display apparatus of another type, a micro mirror device (DMD) is introduced in SID93 Digest, from page 1,012. In the micro mirror device, the angles of micro mirrors arranged in a two-dimensional matrix manner are independently changed to control the direction of reflected rays, and the light reflected in a desired direction is guided to the screen by a projection optical system. The micro mirror device also functions in the same fashion as the modulating device having the fine-particle liquid crystal layer or the polymer dispersion type liquid crystal layer in that the spatial propagation direction of the incident light rays is modulated.

FIG. 1 schematically illustrates the arrangement of a conventional projection display apparatus. In FIG. 1, a light source unit 11 is constituted by a lamp 12 as a light source and a collimator optical system 13 for collimating light from the lamp 12 into parallel rays. A scattering type modulating device 14 has a function of two-dimensionally modulating the spatial propagation direction of the incident parallel rays from the collimator optical system 13. The scattering type modulating device 14 is, e.g., a polymer dispersion type modulating device. A driver 20 drives the modulating device 14 in accordance with a picture signal. A projection optical system 16 includes an aperture stop unit 15 for extracting light rays within a certain fixed angle range from the light transmitted through the modulating device 14. The projection optical system 16 projects the extracted transmitted light onto a screen 17. In this manner, an image is displayed on the screen 17 with a light intensity distribution corresponding to the picture signal.

The contrast and the luminance of the displayed image depend upon the angle distribution of light rays constituting the exit light from the modulating device 14 and used in the display. The contrast improves as the angle distribution decreases, and the luminance improves as the angle distribution increases. That is, the contrast and the luminance of the displayed image are contrary to each other.

Jpn. Pat. Appln. KOKAI Publication No. 5-216004 or 5-188345, for example, has disclosed a technique by which the relationship between the contrast and the luminance of a displayed image is optimized in accordance with the luminance of the use environment by using an arrangement in which the aperture size of the aperture stop unit 15 for stopping down the exit light rays from the modulating device 14 is made variable.

Unfortunately, it is difficult to improve both the contrast and the luminance to respective satisfactory degrees simply by making the aperture size variable in accordance with the luminance of the use environment.

SUMMARY OF THE INVENTION

It is an object of the present invention to provide a display apparatus capable of displaying images easier to see in accordance with the environment in which a screen is placed.

It is another object of the present invention to provide a display apparatus capable of accurately reproducing the gradation of an image.

It is still another object of the present invention to provide a display apparatus capable of displaying high-quality images regardless of the environmental temperature condition.

According to one aspect of the present invention, there is provided a display apparatus comprising a light source, a modulating device for modulating light emitted from the light source, liquid crystal driving means for driving the modulating device, first aperture stop means, arranged between the light source and the modulating device, for limiting a bundle of rays to be incident on the modulating device from the light source, the first aperture stop means having an aperture with a variable size, a display screen onto which exit light from the modulating device is projected, a projection optical system for projecting the exit light from the modulating device onto the display screen, second aperture stop means, arranged between the modulating device and the projection optical system, for limiting a bundle of rays to be incident on the projection optical system from the modulating device, the second aperture stop means having an aperture with a variable size, a photosensor for detecting a display luminance on the display screen, and aperture control means for controlling the size of the aperture of at least one of the first and second aperture stop means on the basis of a display luminance signal from the photosensor.

According to another aspect of the present invention, there is provided a display apparatus comprising a light source, a modulating device for modulating light emitted from the light source, liquid crystal driving means for driving the modulating device, first aperture stop means, arranged between the light source and the modulating device, for limiting a bundle of rays to be incident on the modulating device from the light source, the first aperture stop means having an aperture with a variable size, a display screen onto which exit light from the modulating device is projected, a projection optical system for projecting the exit light from the modulating device onto the display screen, second aperture stop means, arranged between the modulating device and the projection optical system, for limiting a bundle of rays to be incident on the projection optical system from the modulating device, the second aperture stop means having an aperture with a variable size, a photosensor for detecting a display luminance on the display screen, and aperture control means for controlling the size of the aperture of at least one of the first and second aperture stop means on the basis of a picture luminance signal supplied from the liquid crystal driving means to the modulating device and a display luminance signal from the photosensor.

According to still another aspect of the present invention, there is provided a display apparatus comprising a light source, a modulating device for modulating light emitted from the light source, liquid crystal driving means for driving the modulating device, first aperture stop means, arranged between the light source and the modulating device, for limiting a bundle of rays to be incident on the modulating device from the light source, the first aperture stop means having an aperture with a variable size, a display screen onto which exit light from the modulating device is projected, a projection optical system for projecting the exit light from the modulating device onto the display screen, second aperture stop means, arranged between the modulating device and the projection optical system, for limiting a bundle of rays to be incident on the projection optical system from the modulating device, the second aperture stop means having an aperture with a variable size, aperture control means for controlling the size of the aperture of at least one of the first and second aperture stop means, and liquid crystal driving means for supplying to the modulating device a picture signal controlled on the basis of the size of the aperture, which is controlled by the aperture control means, of at least one of the first and second aperture stop means.

According to still another aspect of the present invention, there is provided a display apparatus comprising a light source, a modulating device for modulating light emitted from the light source, liquid crystal driving means for driving the modulating device, first aperture stop means, arranged between the light source and the modulating device, for limiting a bundle of rays to be incident on the modulating device from the light source, the first aperture stop means having an aperture with a variable size, a display screen onto which exit light from the modulating device is projected, a projection optical system for projecting the exit light from the modulating device onto the display screen, second aperture stop means, arranged between the modulating device and the projection optical system, for limiting a bundle of rays to be incident on the projection optical system from the modulating device, the second aperture stop means having an aperture with a variable size, a temperature sensor arranged near the modulating device, and picture signal control means for controlling a picture signal supplied from the driving means to the modulating device on the basis of a temperature signal from the temperature sensor.

According to still another aspect of the present invention, there is provided a display apparatus comprising a light source, a modulating device for modulating light emitted from the light source, liquid crystal driving means for driving the modulating device, first aperture stop means, arranged between the light source and the modulating device, for limiting a bundle of rays to be incident on the modulating device from the light source, the first aperture stop means having an aperture with a variable size, a display screen onto which exit light from the modulating device is projected, a projection optical system for projecting the exit light from the modulating device onto the display screen, second aperture stop means, arranged between the modulating device and the projection optical system, for limiting a bundle of rays to be incident on the projection optical system from the modulating device, the second aperture stop means having an aperture with a variable size, aperture control means for controlling the size of the aperture of at least one of the first and second aperture stop means, and compensating means for compensating for a change in a driving voltage-modulated light intensity characteristic of the modulating device caused in correspondence with the size of the aperture, which is controlled by the aperture control means, of at least one of the first and second aperture stop means.

According to still another aspect of the present invention, there is provided a display apparatus comprising a light source, a modulating device for modulating light emitted from the light source, liquid crystal driving means for driving the modulating device, first aperture stop means, arranged between the light source and the modulating device, for limiting a bundle of rays to be incident on the modulating device from the light source, the first aperture stop means having an aperture with a variable size, a display screen onto which exit light from the modulating device is projected, a projection optical system for projecting the exit light from the modulating device onto the display screen, second aperture stop means, arranged between the modulating device and the projection optical system, for limiting a bundle of rays to be incident on the projection optical system from the modulating device, the second aperture stop means having an aperture with a variable size, aperture control means for controlling the size of the aperture of at least one of the first and second aperture stop means, light intensity setting means for setting at least two light intensities I, a photosensor for detecting display luminances L on the screen which correspond to the light intensities I, environment analyzing means for calculating a projection coefficient q and an environmental luminance $L_0$ ($L_0$ is a luminance generated on the display screen resulting from light from an environment in which the display apparatus is placed, i.e., environmental luminance) by substituting the light intensities I and the detected display luminances L into an equation $L=qI+L_0$, data storage means for calculating a contrast on the display screen from the equation solved for the projection coefficient q and the environmental luminance $L_0$ and storing data indicating the size of the aperture, by which the contrast is maximized, of at least one of the first and second aperture stop means, and processing means for specifying the size of the aperture of at least one of the first and second aperture stop means, the data of which is stored in the data storage means and by which the contrast is maximized, and determining the size as an optimum value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a schematic view showing the arrangement of a conventional projection display apparatus;

FIG. 2 is a view showing an example of a collimator light source for obtaining parallel light rays from a lamp;

FIG. 5 is a graph showing the relationship between the intensity of an exit light beam from the modulating device and the contrast of an image measured in correspondence with the converging angle when the image is displayed on a screen placed in an illuminated environment;

FIG. 14 is a circuit diagram showing the details of an average picture level (APL) detector in FIG. 12;

FIG. 16 is a circuit diagram showing another example of the APL detector;

FIG. 17 is a view showing the collector output from a transistor and the emitter output from another transistor of the circuit in FIG. 16;

FIG. 20 is a graph showing the driving voltage-transmitted light intensity characteristic of a modulating device in a display apparatus according to the third aspect of the present invention;

FIG. 21 is a graph for explaining that the transmittance of the modulating device in the display apparatus according to the third aspect of the present invention shifts from a desired value due to a change in the angle of collection of an aperture stop;

FIG. 22 is a view showing the distribution of incident light beams to the modulating device and the distribution of exit light beams from the modulating device;

FIG. 23 is a view showing the light scattering property of the modulating device;

FIG. 32 is a circuit diagram showing a practical circuit of the temperature sensor;

FIG. 33 is a view showing a driving voltage supply circuit in the display apparatus in FIG. 28;

FIG. 34 is a graph showing the relationship between the change rate of a contrast and the recognition probability;

DETAILED DESCRIPTION OF THE PREFERRED EMBODIMENTS

Figure 3:
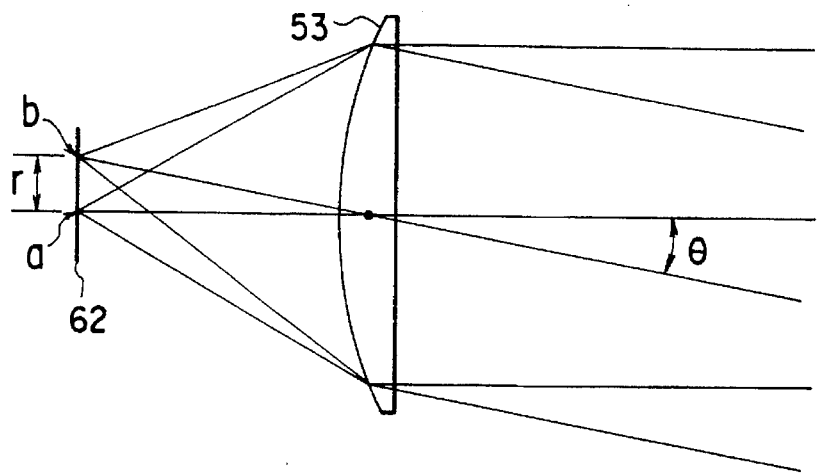
FIG. 3 is a view showing incident light rays to a condenser lens shown in FIG. 2.

In a display apparatus according to the first aspect of the present invention, in an aperture adjustment mode a control means causes a modulating device to produce modulated light under predetermined conditions. With this modulated light projected onto a screen, the control means detects the luminance on the screen. In accordance with this detected luminance, the control means adjusts the angle of collection, i.e., the aperture size of at least one of first and second aperture stop means such that the contrast and the luminance of the displayed image are set to their respective optimum values. This control of the aperture size is based on the finding obtained by the present inventors that the luminance and the contrast of a displayed image largely depend upon the angle distribution of a light beam incident on the modulating device.

By using the luminance on the screen, which reflects the angle distribution of a light beam incident on the modulating device, as a factor for determining an optimum value of the angle of collection, it is possible to obtain displayed images easier to see under the environment in which the screen is placed. It is also possible to automatically correct the angle of collection to an optimum value in the aperture adjustment mode even if the luminance of the room has changed.

To allow a better understanding of the present invention, the relationship between the luminance and the contrast of an image displayed on a screen will be explained below.

FIG. 2 shows an example of a collimator light source for obtaining parallel light rays from a lamp. This collimator light source is constituted by a lamp 50, a focusing lens system 51, an aperture stop 52, and a collimator lens 53, all of which are arranged along the optical axis.

One characteristic feature of the existing lamp 50 is that the lamp is not a point illuminant which emits light from a single point. The focusing lens system 51 focuses light, which is emitted from the surface of the lamp 50 with a certain area, at the aperture stop 52 into a circular lamp image 60 with a radius R. The aperture stop 52 limits the beam area of the lamp image 60 in a plane perpendicular to the optical axis. Therefore, the lamp image 60 can be regarded as a surface illuminant 62 with an area which is determined by a radius r of the aperture stop 52. The light beam from this surface illuminant 62 enters a scattering type modulating device 54 through the collimator lens 53. However, the two-dimensional spread of the illuminant 62 gives an angle distribution to the incident rays to this modulating device 54.

FIG. 3 shows the incident light rays to the collimator lens 53. This collimator lens 53 is a convex lens having a focal point in the center of the surface illuminant 62 and having a sufficiently small aberration. The collimator lens 53 is used to form parallel rays from the light rays emitted from the surface illuminant 62. Assuming that the center and the end portion of the surface illuminant 62 are a point a and a point b, respectively, all homocentric light rays propagating from the point a to the collimator lens 53 become parallel to the optical axis after being transmitted through the collimator lens 53. In contrast, all homocentric light rays traveling from the point b to the collimator lens 53 form a constant angle $\theta$ with the optical axis after being transmitted through the collimator lens 53. This angle $\theta$ is in proportion to the distance between the points a and b, i.e., the radius r of the lamp image 62. The collimator lens 53 outputs, toward the modulating device, a light beam whose angle distribution is $\theta$ in correspondence with the entire surface illuminant 62. If the range of $\theta$ is not so wide, an angle distribution $\Omega_i$ of the incident light beam to the modulating device can be represented as a solid angle by Equation (1) below:

$$\Omega_i = \int_0^\Omega 2\pi \sin\theta \, d\theta \approx \pi\theta^2 \tag{1}$$

Since the angle $\theta$ and the radius r of the lamp image are in proportion as discussed above, the angle distribution $\Omega_i$ of the incident light beam and the area of the lamp image 62 are proportional. This demonstrates that, assuming the intensity of the light beam transmitted through the aperture stop 52 and incident on the modulating device is $I_i$, within the range of r<R the angle distribution $\Omega_i$ and the beam intensity $I_i$ tend to monotonically increase as the radius r of the aperture stop 52 increases.

Figure 4:
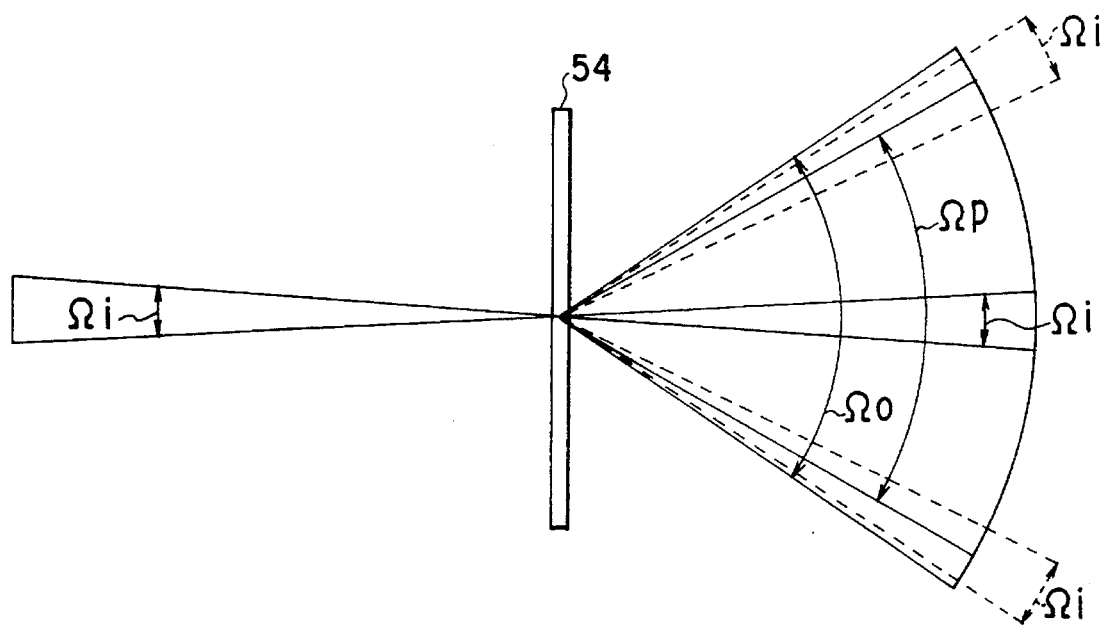
FIG. 4 is a view showing the relationship between the angle distribution of an incident light beam to a modulating device and the angle distribution of an exit light beam from the modulating device.

The display characteristics of the scattering type modulating device on which the light beam with the intensity $I_i$ is incident will be described below. FIG. 4 shows the relationship between the angle distribution $\Omega_i$ of the incident light beam to the modulating device and the angle distribution $\Omega_0$ of the exit light beam from the modulating device. For the sake of simplicity, assume that the incident light beam is uniform over the range of the angle distribution $\Omega_i$ and does not exist outside this range. Assume also that the modulating device uniformly scatters the incident light beam in the scattering state. This scattering power is represented by $\Omega_p$ when the angle distribution of an exit light beam obtained in correspondence with an incident light beam having no angle distribution is $\Omega_0$.

If this angle distribution $\Omega_p$ is sufficiently large with respect to the angle distribution $\Omega_i$ of the incident light beam, the display characteristic of the modulating device holds the following relationships with the aperture stop on the light source side and the aperture stop on the projection side.

The angle distribution $\Omega_i$ of the incident light beam represents the state of the aperture stop on the light source side and satisfies Equation (2) below with respect to a angle of collection $\Omega_{A1}$ of the aperture stop:

$$\Omega_i = \Omega_{A1} \quad (2)$$

Assuming the angle distribution $\Omega_0$ of the exit light beam from the modulating device in the non-scattering state is $\Omega_{ON}$, this angle distribution $\Omega_{0ON}$ directly reflects the angle distribution $\Omega_i$ of the incident light beam as indicated by Equation (3) below:

$$\Omega_0 = \Omega_{0ON} = \Omega_i \quad (3)$$

Assuming the angle distribution $\Omega_0$ of the exit light beam from the modulating device in the scattering state is $\Omega_{0OFF}$, this angle distribution $\Omega_{0OFF}$ takes a superposed form of the angle distribution $\Omega_p$ indicating the scattering power of the modulating device and the angle distribution $\Omega_i$ of the incident light beam, as illustrated in FIG. 4. From the relation $\Omega_i < \Omega_p$, the angle distribution $\Omega_{0OFF}$ can be approximated to $\Omega_p$ as represented by Equation (4) below:

$$\Omega_0 = \Omega_{0OFF} \approx \Omega_i \quad (4)$$

The exit light beam discussed above is uniform over the range of the angle distribution $\Omega_0$, and only rays within the range of a fixed angle of collection $\Omega_{A2}$ which is determined by the aperture stop on the projection side are extracted and displayed. Equations (5) and (6) shown below indicate the relation of the intensity $I_0$ of the exit light beam to the intensity $I_i$ of the incident light beam.

$$I_0 = (\Omega_{A2}/\Omega_0) \cdot I_i (\Omega_{A2} < \Omega_0) \quad (5)$$

In this case the intensity $I_0$ of the exit light beam is determined by the ratio of $\Omega_0$ to $\Omega_{A2}$.

$$I_0 = I_i (\Omega_{A2} \geq \Omega_0) \quad (6)$$

Contrast CR is obtained as the ratio of an exit beam intensity $I_{ON}$ when the modulating device is in the scattering state to an exit beam intensity $I_{OFF}$ when the device is in the non-scattering state. Generally, $\Omega_{A2} < \Omega_p$. Therefore, the contrast CR is given by Equation (7) or (8) depending on the magnitude relationship between $\Omega_{A2}$ and $\Omega_{A1}$. In the case of $$\Omega_{A2} \leq \Omega_{A1} < \Omega_p, \quad (7)$$
$$CR = I_{ON}/I_{OFF} = (I_i\Omega_{A2}/\Omega_{A1})/(I_i\Omega_{A2}/\Omega_P)$$
$$= \Omega_P/\Omega_{A1}$$

In the case of $$\Omega_{A1} \leq \Omega_{A2} < \Omega_p, \quad (8)$$
$$CR = I_{ON}/I_{OFF} = I_i/(I_i\Omega_{A2}/\Omega_P)$$
$$= \Omega_P/\Omega_{A2}$$

That is, assuming that a larger one of the angle of collection $\Omega_{A1}$ of the aperture stop on the light source side and the angle of collection $\Omega_{A2}$ of the aperture stop on the projection side is represented by $\Omega_A$, the contrast CR is given by the ratio of the angle distribution $\Omega_p$ indicative of the scattering power to the angle of collection $\Omega_A$, as shown by Equation (9) below:

$$CR = \Omega_p/\Omega_A \quad (9)$$

Consider the relationship between the magnitudes of the angle of collections $\Omega_{A1}$ and $\Omega_{A2}$ which determine the contrast and the luminance of a displayed image, i.e., the exit beam intensity $I_{ON}$. If $\Omega_{A1} \leq \Omega_{A2}$, the exit beam intensity $I_{ON}$ of a white display is constant independently of $\Omega_{A2}$ from Equation (6). In this case the condition under which the contrast is a maximum is $\Omega_{A1} = \Omega_{A2}$ from Equation (9). If $\Omega_{A1} \geq r\Omega_{A2}$, the contrast $CR = \Omega_p/\Omega_{A1}$ from Equation (7), and $I_{ON} = I_i\Omega_{A2}/\Omega_{A1}$ from Equation (5). Therefore, the exit beam intensity $I_{ON}$ is a maximum when $\Omega_{A2} = \Omega_{A1}$ ($= \Omega_i$). From these two relationships, the condition under which the highest exit beam intensity is obtained at an arbitrary contrast and the best contrast is obtained at an arbitrary luminance is $\Omega_{A1} = \Omega_{A2}$. As discussed above, the condition by which the best display characteristics are obtained is that the angle of collection $\Omega_{A1}$ of the aperture stop on the light source side is in agreement with the angle of collection $\Omega_{A2}$ of the aperture stop on the projection side.

Even under the optimum condition discussed above, although the luminance of a displayed image, i.e., the exit beam intensity $I_{ON}$ ($= I_i$) increases as the radius r of the aperture stop increases, the contrast CR of the displayed image decreases with increasing radius. This indicates that it is not possible to improve both $I_{ON}$ and CR by changing these factors by adjusting the size of the aperture stop.

The foregoing is a qualitative examination, so a detailed examination must be performed for individual optical systems in accordance with the respective schemes of the systems, lamp property, or the like. However, the above basic behavior that the luminance and the contrast of a displayed image trade off each other is a common characteristic of optical systems using a modulating device for modulating the spatial propagation direction of light, such as a polymer dispersion type modulating device, a fine-particle dispersion type modulating device, slant field effect liquid crystal diffraction grating, (Japanese Patent Application Nos. 6-298496, 6-172935) or a DMD.

Consider the contrast of an image displayed on a screen by the operation of a projection display apparatus using a polymer dispersion type liquid crystal as a scattering type modulating device. The contrast of this displayed image is influenced by the surrounding environment of the screen. Therefore, while an image was displayed on the screen placed in an illuminated room, the intensity of an exit light beam from the modulating device and the contrast of the image were measured in correspondence with the angle of collection of an aperture stop. FIG. 5 shows the intensity of the exit light beam from the modulating device and the contrast of the image measured in correspondence with the angle of collection. The relationship in FIG. 5 shows that an optimum value by which the maximum contrast is given exists within the adjustable range of the angle of collection.

When an image is displayed on the screen by the operation of the display apparatus, luminance L of the screen is the sum of luminances $L_{ON}$ or $L_{OFF}$ of the displayed images and luminance $L_0$ of the background which depends upon the environment in which the screen is placed. Therefore, an actual contrast $CR_{room}$ is represented using the luminances $L_{ON}$ and $L_{OFF}$ by Equation (10) below:

$$CR_{room} = (L_{ON} + L_0)/(L_{OFF} + L_0) \quad (10)$$

The luminance $L_0$ of the background is a value obtained by multiplying the intensities of, e.g., the illuminating light in the room in which the screen is set and external light entering through windows, by one of the light transmittance and the light reflectance that are determined by the display form (a light transmitting type or a light reflecting type) of the screen. This $L_0$ is not negligible since it has an effect of significantly decreasing the original contrast CR obtained by Equation (9).

If the value of $L_0$ is sufficiently small, the contrast exhibits a dependence of $1/\Omega_A$ close to the original slope and improves as the angle of collection $\Omega_A$ decreases. If the value of $L_0$ is sufficiently large, the maximum luminance becomes dominant over the contrast; that is, the contrast tends to increase as the angle of collection $\Omega_A$ increases.

Consider, therefore, a contrast $CR_{room}$ obtained in correspondence with the aperture stop angle of collection $\Omega_A$ when $L_0$ takes intermediate values. The relationship between the aperture stop angle of collection $\Omega_A$, the intensity I of projected light from the display apparatus, and the luminance L of the screen is given by using positive proportionality factors k and q by Equation (11):

$$L = K\Omega_A = qI \qquad (11)$$

Equation (12) below indicates the actual contrast $CR_{room}$ when the luminance $L_0$ of the background is taken into account:

$$\begin{aligned} CR_{room} &= (L_{ON} + L_0)/(L_{OFF} + L_0) \\ &= (\Omega_A + L_0/k)/(\Omega_{A2}/\Omega_p + L_0/k) \end{aligned} \qquad (12)$$

When $L_0 = 0$, the contrast improves as the angle of collection $\Omega_A$ decreases, as discussed above. Equation (13) below represents the condition required to obtain the maximum contrast when $L_0$ takes a finite value larger than 0:

$$\begin{aligned} \partial CR_{room}/\partial \Omega_A &= -\{\Omega_{A2} + (2\Omega_A - \Omega_p)L_0/k\}/ \\ & \qquad (\Omega_{A2}/\Omega_p + L_0/k)2\Omega_p \\ &= 0 \end{aligned} \qquad (13)$$

If there is a point at which the contrast reaches a maximum, the point is dependent upon the luminance $L_0$ of the background and the angle of collection $\Omega_A$ of the aperture stop. If the angle of collection $\Omega_A$ has a realizable solution in Equation (13), this solution is an optimum value which allows the contrast $CR_{room}$ to be a maximum. Unfortunately, the upper limit of the angle of collection $\Omega_A$ of the aperture stop is essentially determined by the size of an actual light source. The upper-limit value of this adjustable range is present. When $L_0$ has exceeded a certain fixed value, the maximum value of the angle of collection within the adjustable range becomes an optimum value in order that the contrast becomes maximum within the adjustable range. If the value of $L_0$ is almost 0, the contrast improves as the angle of collection $\Omega_A$ decreases. If the angle of collection $\Omega_A$ is too small, however, displayed images become dark and difficult to see. In these instances the angle of collection $\Omega_A$ is set at a minimum value within the range over which displayed images can be readily seen.

There will be described a fundamental concept of the present invention prior to describing a projection display apparatus according to the present invention.

Figure 6A:
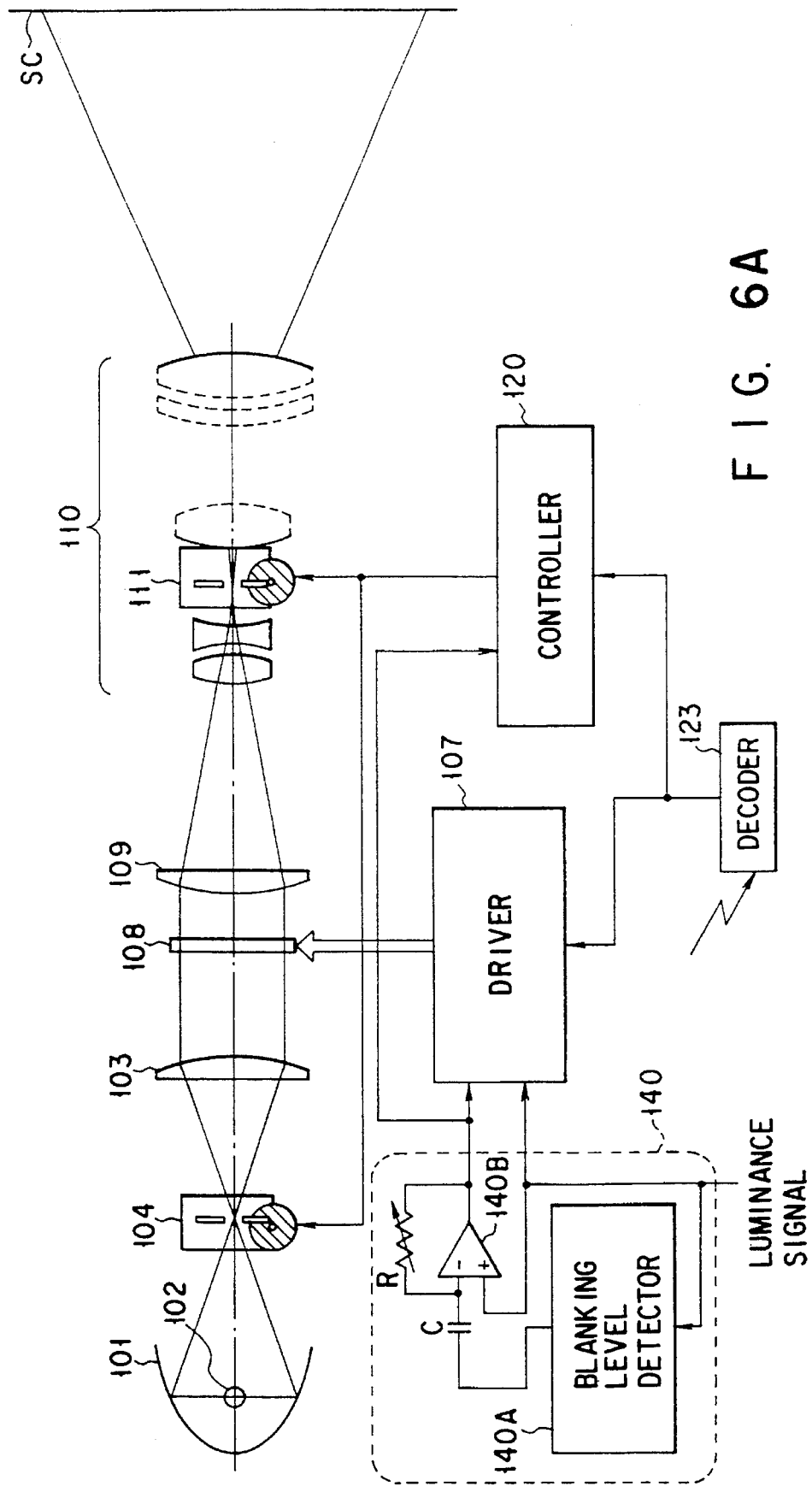
FIG. 6A is a block diagram showing the arrangement of a projection display apparatus for explaining a fundamental concept of the present invention.

FIG. 6A shows the arrangement of this projection display apparatus. The projection display apparatus comprises an optical system having a spheroidal mirror 101, a light source lamp 102, a collimator lens 103, an electric aperture stop 104, a scattering type liquid crystal panel 108, a field lens 109, projection lenses 110, and another electric aperture stop 111. The light from the lamp 102 enters the collimator lens 103 directly and after being reflected by the mirror 101. The collimator lens 103 outputs this incident light as parallel rays to the scattering type liquid crystal panel 108. The scattering type liquid crystal panel 108 includes a liquid crystal layer, in which a liquid crystal material is dispersed in a polymer resin, as a light-modulating layer between a pair of transparent electrode substrates. The scattering type liquid crystal panel 108 is driven by a modulating device driver 107 as a light-modulating device which modulates the spatial propagation direction of light by using this light-modulating layer. The modulated light from the scattering type liquid crystal panel 108 is incident on the projection lenses 110 through the field lens 109. The projection lenses 110 project the modulated light onto a reflection screen SC. That is, the basic display concept of this projection display apparatus is identical with that of the projection display apparatus illustrated in FIG. 1.

As shown in FIG. 6A, this display apparatus includes the two electric aperture stops 104 and 111. The electric aperture stop 104 narrows the bundle of rays entering the collimator lens 103. The electric aperture stop 111 narrows the bundle of rays projected from the projection lenses 110. Each of the electric aperture stops 104 and 111 has an internal servo motor M which is controlled by a controller 120. The aperture size, i.e., the shape of the aperture of each aperture stop is adjusted by the action of the servo motor. The controller 120 operates the aperture stops 104 and 111 on the basis of an input signal A from a luminance signal smoothing circuit 140, and input signal B from a decoder 121, thereby controlling the distribution of the incident light beam to the scattering type liquid crystal panel 108 and the exit beam angle range which contributes to a display. The decoder 121 receives a control signal transmitted from an external infrared remote controller and decodes the received signal to obtain the signal B.

Figure 13:
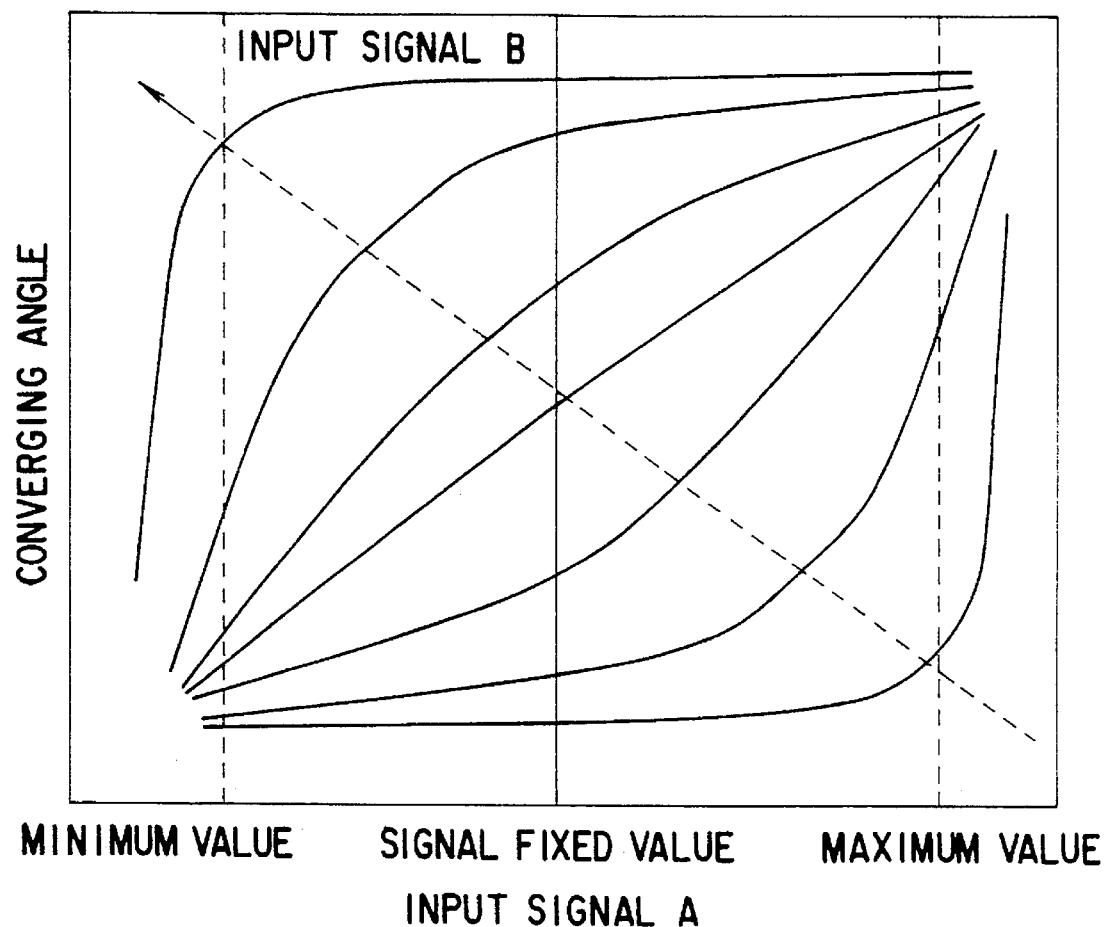
FIG. 13 is a graph showing the relationship between the two input signals to a controller in FIG. 12 and the angle of collection of aperture stops.

FIG. 13 shows the relationship between the input signals A and B to the controller 120 and the angle of collection of the aperture stops. The state of each aperture stop is represented by the angle at which the exit light beam from the scattering type liquid crystal panel 108 passes through the aperture stop, i.e., the angle of collection. The angle of collection of the aperture stop 111 is so set as to be variable within the range from $8.6 \times 10^{-3}$ to $1.1 \times 10^{-3}$ sr. The aperture stop 104 is so controlled that a light beam within the same angle range is incident on the scattering type liquid crystal panel 108.

The input signal A to the controller 120 indicates the time average intensity of a luminance signal contained in a picture signal. The input signal A is generated by the luminance signal smoothing circuit 140. As in FIG. 12, this luminance signal smoothing circuit 140 is composed of a luminance signal blanking level (black level) detector 140A and an RC integrator 140B. A time constant RC of the integrator 140B can be altered by adjusting a resistor R. The input signal A to the controller 120 is obtained by averaging the difference between the output (black level) from the blanking level (black level) detector 140A and the luminance signal by using the RC integrator 140B.

Figure 18:
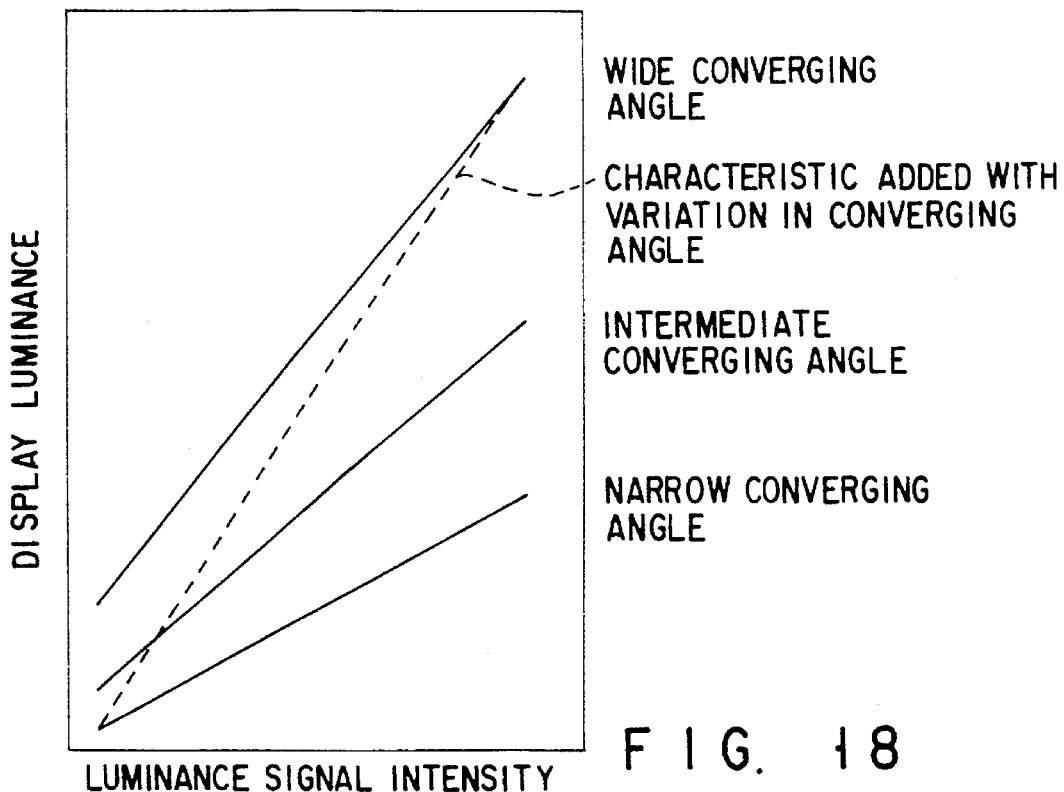
FIG. 18 is a graph showing the relationship between the angle of collection and the display characteristic.

The input signal B to the controller 120 is obtained by decoding the control signal from the infrared remote controller by using the decoder 121. This signal can be set to an arbitrary value by the infrared remote controller. As illustrated in FIG. 18 the input signal B changes the magnitude of the effect that the input signal A has on the aperture stops. When the value of the input signal B is sufficiently small, the angle of collection of each aperture stop is held minimized regardless of the input signal A. When the value of the input signal B is sufficiently large, the angle of collection of each aperture stop is held maximized regardless of the input signal A. To fix the angle of collection at a specific value, the input signal A is held constant at an intermediate signal fixed value, FIG. 18, by using a switch (not shown) of the controller 120.

The driver 107 is characterized by receiving, as its one input, an output signal from the smoothing circuit 140B and correcting the voltage for driving the scattering type liquid crystal panel. In this correction, the operation state of the controller 120 is detected on the basis of the decoded signal from the decoder 121, and the driving signal is corrected in synchronism with the controller such that a change in the average intensity of the signal is decreased. Therefore, if a projected image which is originally dark is further darkened with a decrease in the angle of collection, the driving signal is corrected such that the luminance of the scattering type liquid crystal panel is increased. Consequently, a variation in the luminance is reduced in the projected image finally obtained.

The display apparatus with the arrangement illustrated in FIG. 6A was operated to perform a display in a dark room. The result was that the contrast was 70:1 for a angle of collection of $1.1 \times 10^{-3}$ sr and 18:1 for a angle of collection of $8.6 \times 10^{-3}$ sr, because of unsatisfactory characteristics of the polymer dispersion type liquid crystal. The quantity of light in a white image display was 18 lm for an angle of collection of $1.1 \times 10^{-3}$ sr and 75 lm for an angle of collection of $8.6 \times 10^{-3}$ sr. When the aperture stops were fixed, it was necessary to use the aperture stops at the minimum angle of collection of $1.1 \times 10^{-3}$ sr in order to obtain a sufficient contrast. When the aperture stops were variable as in this embodiment, in contrast, the impression of the display was dramatically improved since the entire luminance could be raised in bright scenes. Especially when the display operation was done by using video software recording pictures of constellations and the lunar world, the blackness of the background was enhanced in the scenes of constellations, resulting in a very good display entirely different from that obtained with the fixed aperture stops. In addition, to check the relationship between the average luminance change and the aperture adjustment speed, the time constant of the aperture adjustment was changed from 0.5 to about ϕ1 sec. As a result, the display characteristics were improved with little unnaturalness.

The display operation was also done by using a screen with a reflection gain of 13 times in a 500-lux room. Consequently, the brightness of the screen resulting from the internal light in the room was rather disturbing. The best impression was obtained when the angle of collection was set to nearly a maximum. This setting is worse than decreasing the angle of collection, since an insufficient contrast results if the room is sufficiently dark. It was confirmed that the use of the display apparatus shown in FIG. 6A made it possible to perform the display operation by optimizing the display characteristics even if the luminance of the use environment changed.

In a bright environment, the sense of a human recognizes a portion which is dark by contrast with the brightness as black. Therefore, the requirement for a black display in bright scenes is not very strict. In this case a sufficient brightness of white portions is more important than the contrast.

Conversely, in dark scenes the sense of a human becomes sensitive to the darkness so that light black and dark black are clearly distinguished. The brightness of white portions is emphasized by contrast with black portions surrounding the white portions, and so an absolute luminance of white portions is not so important. In this case it is required that the contrast be high enough to display sufficiently dark black.

The projection display apparatus shown in FIG. 6A can change the display characteristics to satisfy the sense of a human and also can obtain a display characteristic that has never been obtained by conventional apparatuses. That is, it is possible to improve an essential brightness at a sufficiently high contrast.

This projection display apparatus is put into practical use in various environments depending on, e.g., the period of time or the location. In particular, since external light (illumination of a room or light from a window) acts on the screen to determine its luminance, black images are readily affected by the external light. That is, if a portion surrounding the screen is too bright, the contrast of an image displayed on the screen decreases even when the output light from the display apparatus has a high contrast. In these circumstances, therefore, display is performed by giving priority to the luminance rather than the contrast. In a sufficiently dark room or the like place, a display is performed such that black is shown with a sufficient darkness even if white is somewhat darkened.

In the projection display apparatus shown in FIG. 6A, it is possible to freely choose which of a black display or a white display is given priority in accordance with various conditions of the surrounding environment. In addition, this display apparatus consumes less power regardless of the above-mentioned superior display performance.

Note that in the display apparatus shown in FIG. 6A, the reflection screen SC is placed on the front side to display images. However, it is also possible to use a transmission screen placed on the rear side to display images.

In addition, in the display apparatus, shown in FIG. 6A is so designed as to use the transmitted light from the scattering type liquid crystal panel, which is provided as a light-modulating device, as the modulated light. However, the reflected light from the scattering type liquid crystal panel also can be used. This scattering type liquid crystal panel can have a fine-particle dispersion type liquid crystal layer, instead of the polymer dispersion type liquid crystal layer, as the light-modulating layer. Also, the scattering type liquid crystal panel can be replaced with a light-modulating device such as a DMD, TN type liquid crystal device and slant field effect liquid crystal diffraction grating.

A projection display apparatus according to the first aspect of the present invention will be described below with reference to FIG. 6B.

Figure 6B:
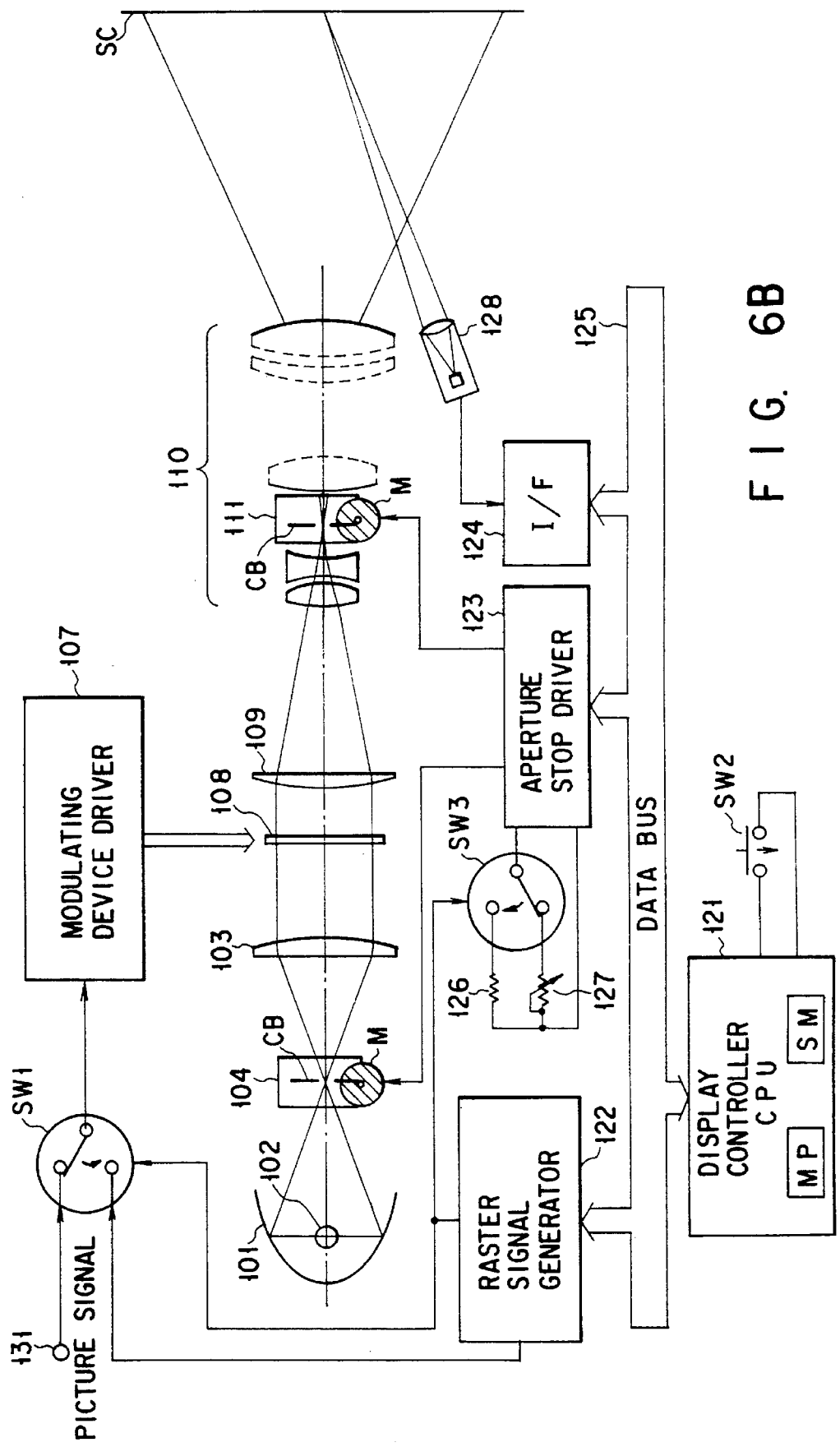
FIG. 6B is a block diagram showing the arrangement of a projection display apparatus according to the first aspect of the present invention.

Referring to FIG. 6B, this projection display apparatus comprises an optical system in which a spheroidal mirror 101, a light source lamp 102, an electric aperture stop 104, a collimator lens 103, a scattering type modulating device 108, a field lens 109, projection lenses 110, and another electric aperture stop 111 are arranged on the optical axis. The light from the lamp 102 enters the collimator lens 103 directly and after being reflected by the mirror 101. The collimator lens 103 outputs this incident light as parallel rays to the modulating device 108. The modulating device 108 has a function of modulating the spatial propagation direction of incident light in a two-dimensional region and is driven by a modulating device driver 107. The modulating device 108 is a liquid crystal panel having, between a pair of transparent electrode substrates, a liquid crystal layer in which a liquid crystal material is dispersed in a polymer resin. The field lens 109 guides the modulated light from the modulating device 108 to the projection lenses 110. The projection lenses 110 project the modulated light onto a reflection screen SC. That is, the basic display principle of this projection display apparatus is identical with the conventional principle.

In this display apparatus, the electric aperture stop 104 is arranged between the light source lamp 102 and the collimator lens 103, and the electric aperture stop 111 is arranged within the projection lenses 110. The electric aperture stop 104 stops down the beam of the light from the light source lamp 102 in order to control the angle range of light rays to be incident on the modulating device 108. The electric aperture stop 111 stops down the beam of the modulated light from the modulating device 108 in order to control the angle range of light rays to be projected onto the screen SC.

Figure 7A:
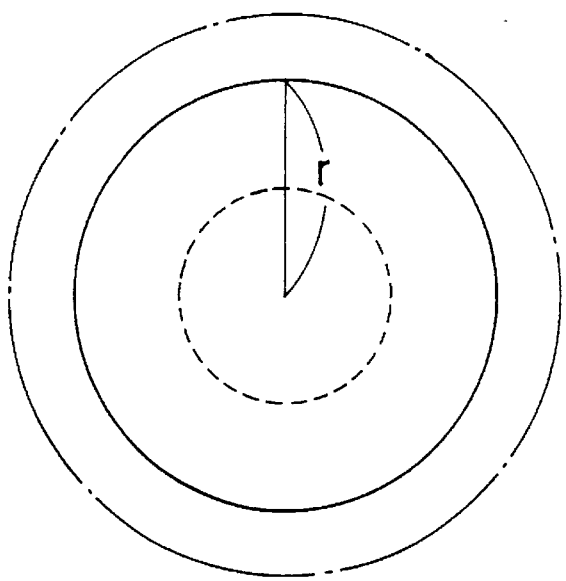
FIGS. 7A and 7B are views each showing the shape of the aperture of an aperture stop.
Figure 7B:
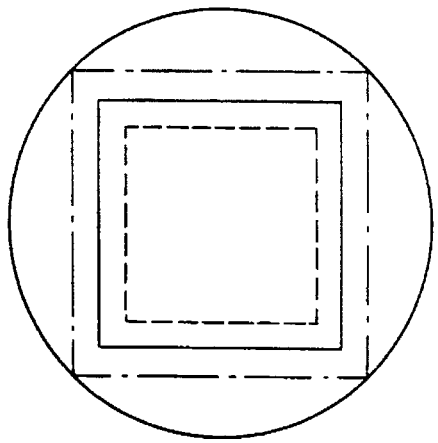

Each of the electric aperture stops 104 and 111 has an internal servo motor M which is controlled by an aperture stop driver 123. The aperture size, i.e., the shape of the aperture of each aperture stop is adjusted by the action of this servo motor. The shape of the aperture can be, e.g., rectangular or circular. More preferably, the aperture shape is circular, as in FIG. 7A, and a radius r of the aperture is changed by the servo motor. Alternatively, as illustrated in FIG. 7B, light is interrupted in the upper and lower portions and/or the right and left portions of the aperture by the servo motor.

It is more preferable that the electric aperture stops 104 and 111 have a rectangular shape in which light is interrupted in the upper and lower portions, and right and left portions.

Figure 8A:
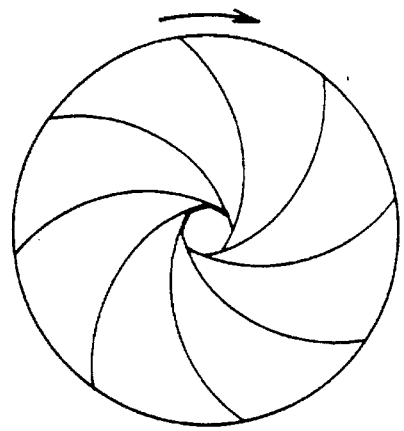
FIGS. 8A to 8C are views showing various aperture diameters of the aperture stop.
Figure 8B:
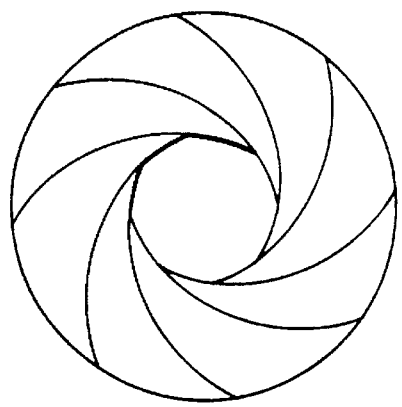
Figure 8C:
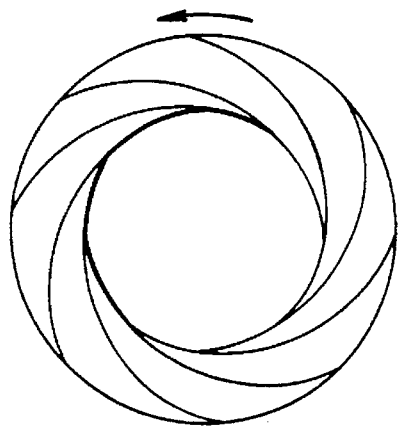

It is most preferable that the electric aperture stops 104 and 111 have an arrangement similar to that of an aperture stop often used in a camera, as depicted in FIGS. 8A to 8C. FIGS. 8A, 8B, and 8C illustrate the states in which the aperture diameter is small, medium, and large, respectively.

In the embodiment shown in FIG. 6B, each of the electric aperture stops 104 and 111 consists of five ceramic blades CB with a high heat resistance. Each electric aperture stop functions as a circular variable aperture stop whose angle of collection is changed by altering the size, i.e., the radius r of the circular aperture constituted by the combination of the ceramic blades CB by using the servo motor M.

This display apparatus further comprises a display controller 121, a raster signal generator 122, the aperture stop driver 123, a photosensor 128, and a photosensor interface circuit 124. The display controller 121 controls the whole display operation. The raster signal generator 122 generates a raster signal set at a luminance level designated by the display controller 121. The aperture stop driver 123 drives the electric aperture stops 104 and 111 so that each aperture stop has a angle of collection, i.e., an aperture radius r designated by the display controller 121. The photosensor 128 detects the luminance of the screen SC to generate an analog voltage signal corresponding to the detected luminance. The photosensor interface circuit 124 converts the voltage signal from the photosensor 128 into a digital signal and applies the digital signal to the display controller 121. The display controller 121 is connected to the raster signal generator 122, the aperture stop driver 123, and the photosensor interface circuit 124 via a data bus 125. The photosensor 128 is connected to the photosensor interface circuit 124. The aperture stop driver 123 is connected to the electric aperture stops 104 and 111. The modulating device driver 107 is connected to the modulating device 108.

This display apparatus also includes switches SW1 and SW3 which are controlled in accordance with the state of the raster signal generator 122, and a push switch SW2 for instructing the aperture adjustment. The switch SW1 has a first contact connected to a video input terminal 131 to which a picture signal is supplied, a second contact connected to the raster signal output terminal of the raster signal generator 122, and a common contact connected to the modulating device driver 107. The switch SW1 also has a control terminal connected to the status output terminal of the raster signal generator 122. The switch SW2 is connected between a pair of switch connecting terminals of the display controller 121. The switch SW3 has a first contact connected to one end of a variable resistor 127, a second contact connected to one end of a fixed resistor 126, and a common contact connected to one resistor connecting terminal of the aperture stop driver 123. The switch SW3 also has a control terminal connected to the status output terminal of the raster signal generator 122. The other end of each of the fixed resistor 126 and the variable resistor 127 is connected to the other resistor connecting terminal of the aperture stop driver 123.

The display controller 121 sets the aperture adjustment mode upon detecting that the switch SW2 is pushed. The raster signal generator 122 is normally kept in an inoperative state and set in an operative state in this aperture adjustment mode. The switch SW1 connects the common contact to the first contact under the control of a status signal which is supplied when the raster signal generator 122 is in the inoperative state. The switch SW1 connects the common contact to the second contact under the control of a status signal which is supplied when the raster signal generator 122 is in the operative state. That is, the switch SW1 supplies a picture signal to the modulating device driver 107, and the switch SW3 connects the variable resistor 127 to the aperture stop driver 123. When the raster signal generator 122 is rendered operative upon setting of the aperture adjustment mode, the switch SW1 supplies a raster signal to the modulating device driver 107, and the switch SW2 connects the fixed resistor 126 to the aperture stop driver 123.

When connected to the fixed resistor 126, the aperture stop driver 123 adjusts the electric aperture stops 104 and 111 to have a angle of collection, i.e., an aperture radius designated by the display controller 121. The variable resistor 127 is provided to further correct the angle of collection thus set and is operated manually. When the aperture stop driver 123 is connected to the variable resistor 127 and the variable resistor 127 is operated, the aperture stop driver 123 corrects the value of the angle of collection in either the positive or negative direction in accordance with the resistance of the variable resistor 127.

The photosensor 128 consists of, e.g., a photodiode and a collimator lens. The luminance of the screen SC is measured on the basis of a signal supplied from the photosensor 128 to the display controller 121 via the photosensor interface circuit 124.

The display controller 121 includes a microprocessor MP for performing various data processing and a memory SM for storing control programs of the microprocessor MP and various data. The control programs include a processing routine for determining an optimum angle of collection in the aperture control mode.

The operation of this display apparatus will be described below with reference to the flow charts shown in FIGS. 9 and 10.

Figure 9:
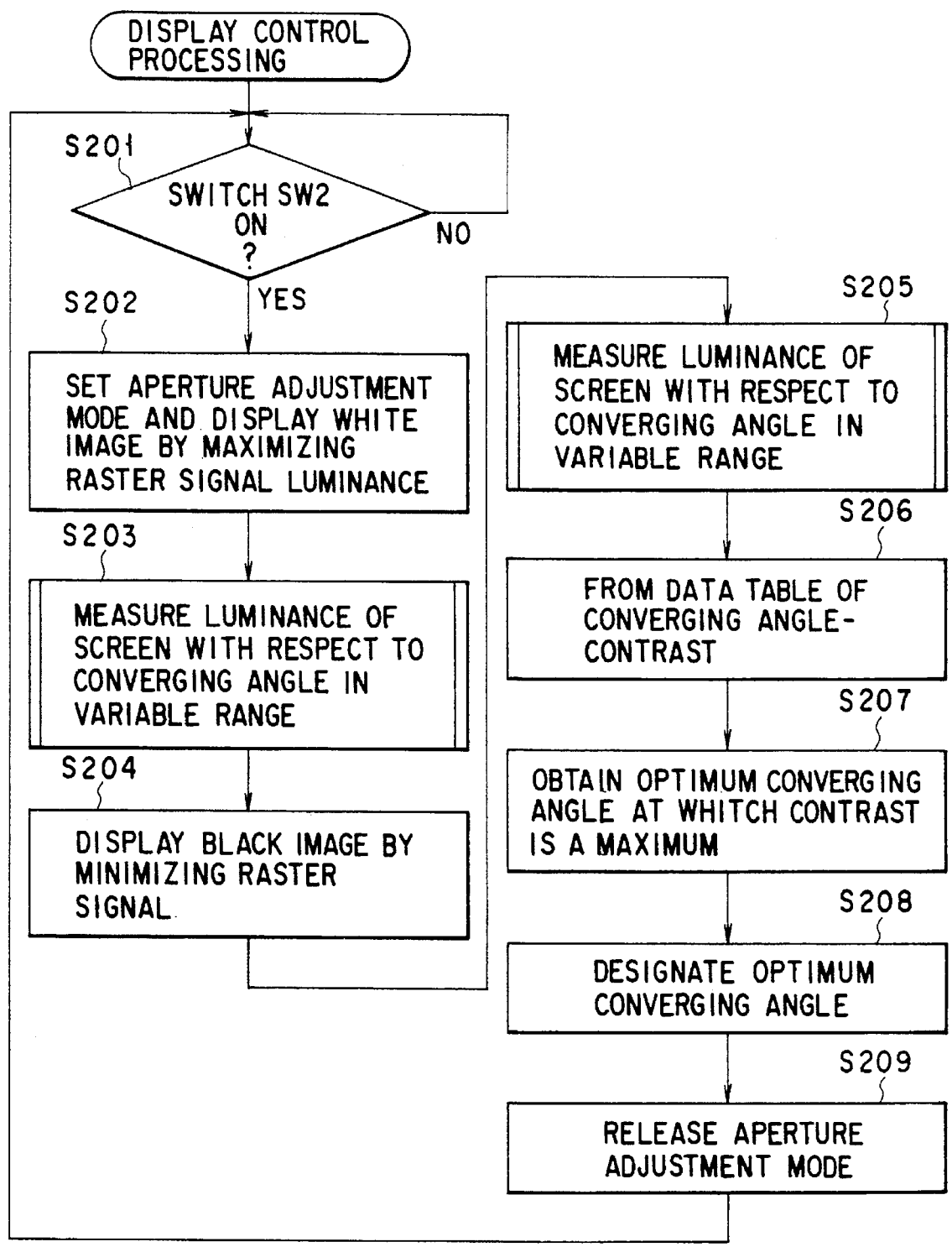
FIG. 9 is a flow chart for explaining the operation of the display apparatus shown in FIG. 6.

Referring to FIG. 9, the display controller 121 performs the display control processing, FIG. 2, by executing control programs upon turning on of a power supply. When this display control processing is started, the display controller 121 checks in step S201 whether the push switch SW2 is pushed. If it is detected that the push switch SW2 is pushed, the display controller 121 sets the aperture adjustment mode to make the raster signal generator 122 operative in step S202. The display controller 121 designates the raster signal generator 122 to maximize the luminance level of the raster signal. The switch SW1 supplies the raster signal generated by the raster signal generator 122 to the modulating device driver 107. The switch SW3 connects the fixed resistor 126 to the aperture stop driver 123. The modulating device driver 107 drives the modulating device 108 such that the light transmittance (modulation degree) reaches a maximum in correspondence with the raster signal. Consequently, the modulating device 108 outputs the brightest modulated light by which a white image is displayed on the entire screen SC. Thereafter, in step S203 the display controller 121 performs measurement for obtaining the luminances of the screen SC with respect to various angle of collections of the aperture stops.

Figure 10:
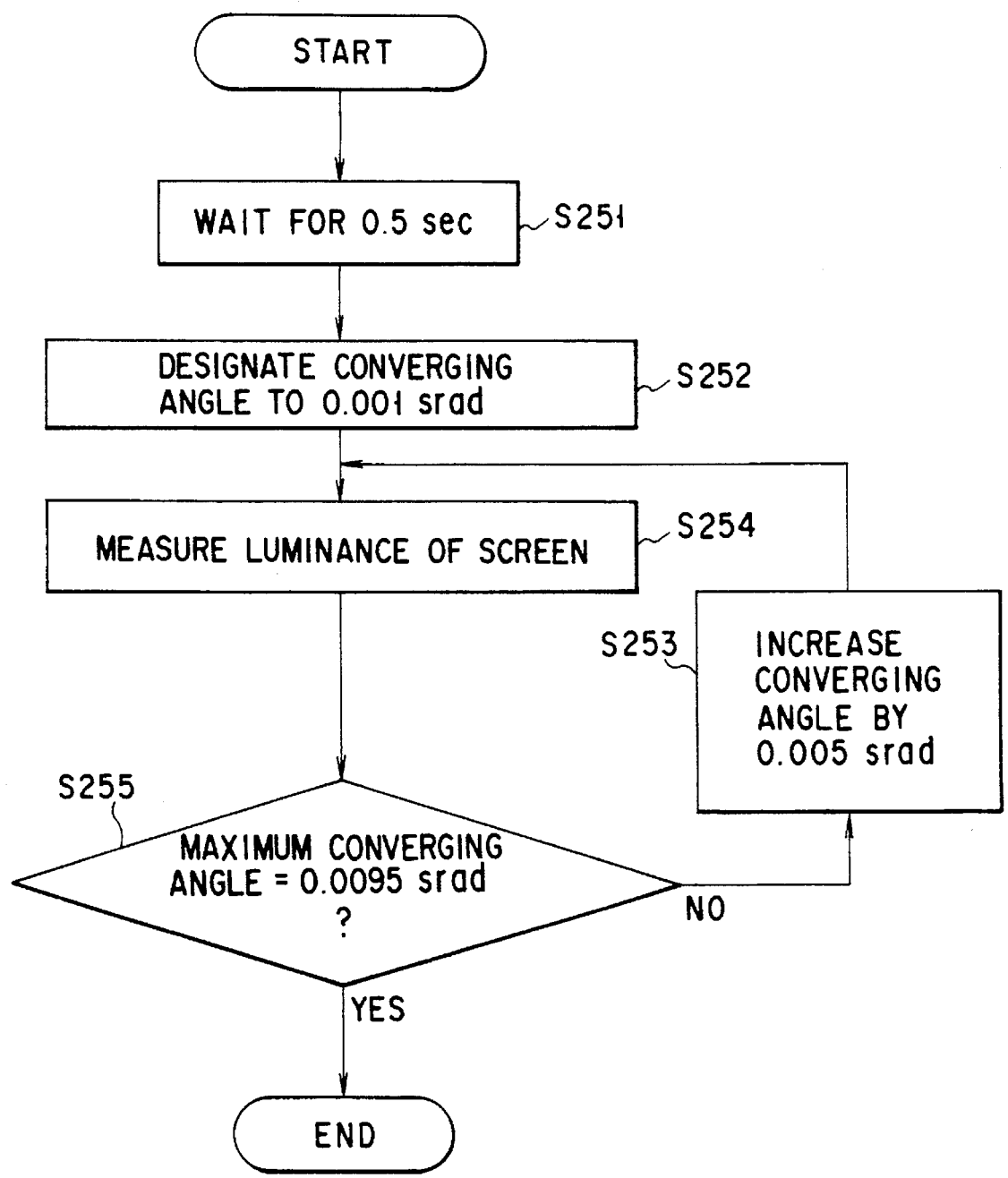
FIG. 10 is a flow chart showing the details of the processing operation in FIG. 9.

FIG. 10 shows details of this measurement. In step S251, the display controller 121 waits for a predetermined time of about 0.5 second which is determined in consideration of the response time required to actually drive the modulating device 108. In step S252, the display controller 121 designates an angle of collection of $1.0 \times 10^{-3}$ sr to the aperture stop driver 123 in order to set each aperture stop in the most stopped down state. With each aperture stop in the most stopped down state, the display controller 121 measures the luminance of the screen detected by the photosensor 128 in step S254. Thereafter, the display controller 121 increases the angle of collection at a rate of $0.5 \times 10^{-3}$ sr in step S253. In step S254, the display controller 121 measures the luminance of the screen detected by the photosensor 128 each time the angle of collection is increased. If the display controller 121 detects in step S255 that the angle of collection has reached a value of $9.5 \times 10^{-3}$ sr by which each aperture stop is in the fully open state, the display controller 121 ends the measurement for the white image display. Thereafter, the flow advances to step S204 in FIG. 9.

In step S204, the display controller 121 commands the raster signal generator 122 to minimize the luminance level of the raster signal in step S202. In this case the switches SW1 and SW2 function in the same manner as in step S202. The modulating device driver 107 drives the modulating device 108 such that the light transmittance (modulation degree) is a minimum in correspondence with the raster signal. Consequently, the modulating device 108 outputs the darkest modulated light by which a black image is displayed on the entire screen SC. Thereafter, the display controller 121 executes the measurement illustrated in FIG. 10 in step S205 again. When the display controller 121 completes the measurement for the black image display, the flow advances to step S206.

In step S206, the display controller 121 forms a data table indicating the relationship between the angle of collection and the contrast. This data table is formed by calculating, as the contrast, the ratio of the measured value of the luminance obtained in step S203 to the measured value of the luminance obtained in step S205 for the same angle of collection. In step S207, the display controller 121 finds an optimum angle of collection by which the contrast is a maximum from the data table, and designates this optimum angle of collection to the aperture stop driver 123. The aperture stop driver 123 drives the electric aperture stops 104 and 111 to have the optimum angle of collection. Thereafter, the display controller 121 releases the aperture adjustment mode to set the raster signal generator 122 in an inoperative state, and executes step S201 again. After the release of the aperture adjustment mode, the switch SW1 supplies a picture signal, which is received at the video input terminal, to the modulating device driver 107, and the switch SW3 connects the variable resistor 127 to the aperture stop driver 123.

In the above embodiment, in response to the push operation of the switch SW2 an optimum angle of collection of the aperture stops by which the contrast is a maximum is calculated, and the aperture stops are so automatically adjusted as to have this optimum angle of collection. Since the variable resistor 127 is made usable after this adjustment, the luminance of the displayed image obtained at the optimum angle of collection can be further increased or decreased in accordance with the user's taste.

The results of a display experiment obtained by the modulating device using a polymer dispersion type liquid crystal were as follows. The contrast was 70:1 for a angle of collection of $1.0 \times 10^{-3}$ sr and 18:1 for a angle of collection of $9.5 \times 10^{-3}$ sr. The quantity of light in the white image display was 18 lm for a angle of collection of $1.0 \times 10^{-3}$ sr and 75 lm for a converting angle of $9.5 \times 10^{-3}$ sr. The display experiment was also conducted while varying the luminance of the room. By pushing the switch SW2 each time the luminance of the room was changed, the angle of collection of the aperture stops 104 and 111 was rapidly adjusted to an optimum value at which the contrast was a maximum. This allowed the apparatus to readily cope with changes in the use environment.

Another embodiment of the projection display apparatus according to the first aspect of the present invention will be described below with reference to FIG. 11.

This display apparatus is constituted by exactly the same hardware as that of the apparatus illustrated in FIG. 6B except for the contents of a memory SM provided in a display controller 121. Therefore, the same reference numerals as in the above embodiment denote the same parts in this embodiment, and a detailed description of the hardware will be omitted. In this embodiment, the memory SM prestores a data table indicating a standard relationship between various angle of collections within a common variable range of electric aperture stops 104 and 111 and the intensities of modulated light from a modulating device which are output to display white and black images at these angle of collections. Control programs are modified to use this table.

Figure 11:
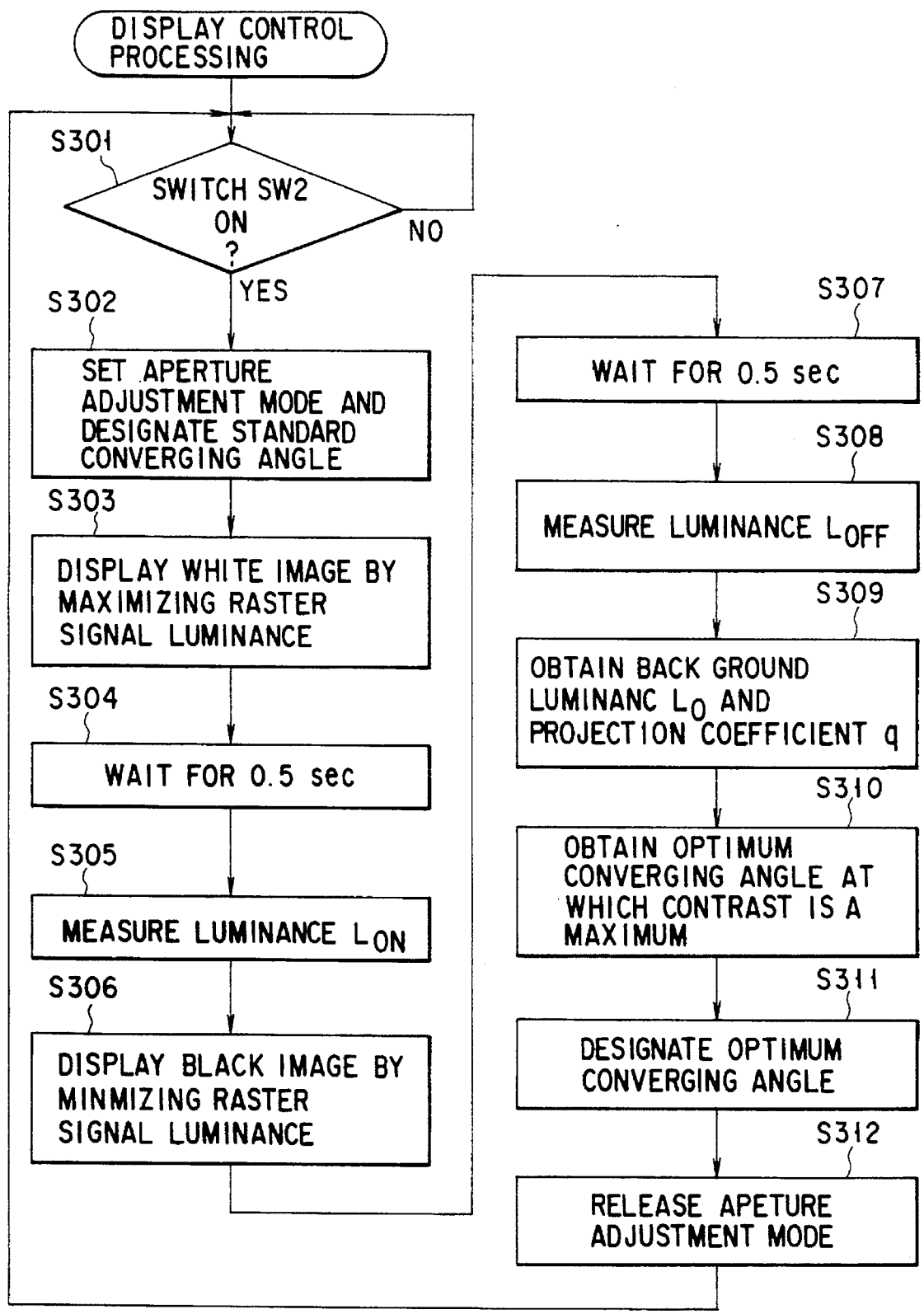
FIG. 11 is a flow chart for explaining the operation of another embodiment of the projection display apparatus according to the first aspect of the present invention.

That is, the display controller 121 performs display control processing shown in FIG. 11 by executing the control programs upon turning on of a power supply. When this display control processing is started, the display controller 121 checks in step S301 whether a push switch SW2 is pushed. If it is detected that the push switch SW2 is pushed, the display controller 121 sets an aperture adjustment mode to render a raster signal generator 122 operative in step S302. The display controller 121 also designates a standard aperture stop angle of collection of $2.1 \times 10^{-3}$ sr to an aperture stop driver 123. In step S303, the display controller 121 commands the raster signal generator 122 to maximize the luminance level of the raster signal. A switch SW1 supplies the raster signal generated by the raster signal generator 122 to a modulating device driver 107. A switch SW3 connects a fixed resistor 126 to the aperture stop driver 123. The modulating device driver 107 drives a modulating device 108 such that the light transmittance (modulation degree) becomes a maximum in correspondence with the raster signal. Consequently, the modulating device 108 outputs the brightest modulated light with which a white image is displayed on an entire screen SC. Thereafter, in step S304 the display controller 121 waits for a predetermined time of about 0.5 second which is determined in consideration of the response time required to actually drive the modulating device 108. In step S305, with the angle of collection of the aperture stops set at $2.1 \times 10^{-3}$ sr, the display controller 121 measures the luminance detected by a photosensor 128. In step S306, the display controller 121 commands the raster signal generator 122 to minimize the luminance level of the raster signal. In this case the switches SW1 and SW3 function in the same fashion as in step S303. The modulating device driver 107 drives the modulating device 108 such that the light transmittance (modulation degree) is a minimum in correspondence with the raster signal. Consequently, the modulating device 108 outputs the darkest modulated light with which a black image is displayed on the entire screen SC. Thereafter, in step S307 the display controller 121 waits for a predetermined time of about 0.5 second which is determined in consideration of the response time required to actually drive the modulating device 108. In step S308, with the angle of collection of the aperture stops set at $2.1 \times 10^{-3}$ sr, the display controller 121 measures the luminance detected by the photosensor 128.

In step S309, the display controller 121 calculates a projection coefficient q and a luminance $L_0$ of the background contained in an equation $L_{ON} = qI_{ON} + L_0$ indicating the relationship between luminance $L_{ON}$, intensity $I_{ON}$ of the output modulated light from the modulating device 108, and the luminance $L_0$ of the background obtained when the white image is displayed on the screen, and in an equation $L_{OFF} = qI_{OFF} + L_0$ indicating the relationship between luminance $L_{OFF}$, intensity $I_{OFF}$ of the output modulated light from the modulating device 108, and the luminance $L_0$ of the background obtained when the black image is displayed on the screen. That is, the measured values of $L_{ON}$ and $L_{OFF}$ obtained in steps S305 and S308, together with the intensities $I_{ON}$ and $I_{OFF}$ of the modulated light, are substituted into these equations. In these equations, q is a positive constant, and $I_{ON}$ and $I_{OFF}$ are values obtained from the data table stored in the memory SM. Thereafter, in step S310 the display controller 121 substitutes q and $L_0$ calculated in step S309 into the two equations $L_{ON} = qI_{ON} + L_0$ and $L_{OFF} = qI_{OFF} + L_0$ shown in step S309, and also substitutes the intensities $I_{ON}$ and $I_{OFF}$ of the modulated light, which are obtained from the data table by assuming that the angle of collection is altered within the common variable range of the aperture stops, thereby calculating a angle of collection at which the contrast $L_{ON}/L_{OFF}$ is a maximum. In step S311, the display controller 121 designates this angle of collection to the aperture stop driver 123. The aperture stop driver 123 drives the aperture stops 104 and 111 to have this angle of collection. Thereafter, the display controller 121 releases the aperture adjustment mode to set the raster signal generator 122 in an inoperative state in step S312, and executes step S301 again. After the release of the aperture adjustment mode, the switch SW1 supplies a picture signal, which is input to a video input terminal, to the modulating device driver 107, and the switch SW3 connects a variable resistor 127 to the aperture stop driver 123.

In this second embodiment, as in the first embodiment discussed above, in response to the push operation of the switch SW2 an optimum angle of collection of the aperture stops by which the contrast is a maximum is calculated, and the aperture stops are so automatically adjusted to have this optimum angle of collection. The variable resistor 127 is rendered usable after this adjustment. Consequently, the luminance of the displayed image obtained at the optimum angle of collection can be further increased or decreased in accordance with the user's taste.

Also, in this embodiment it is possible to optimize the aperture stop angle of collection within a short time period. That is, in the first embodiment, the aperture stop angle of collection is changed at a rate of $0.5 \times 10^{-3}$ sr within the variable range while a white or black image is displayed on the screen, and it is necessary to measure the luminance of the screen each time the angle of collection is altered. In the second embodiment, however, the number of the screen luminance measurements can be reduced to 2 by the use of the data table already prepared in the memory SM. As a result, the time required to optimize the angle of collection of the aperture stops can be shortened to 5 seconds or less.

In addition, in this second embodiment the luminance L is measured by using the two exit light components, i.e., the modulated light with the highest light intensity $I_{ON}$ and the modulated light with the lowest light intensity $I_{OFF}$ obtained by the standard angle of collection, in order to estimate q and $L_0$ in the equation $L = qI + L_0$. However, some other modulated states can also be used without departing from the gist of the present invention.

As an example, q and $L_0$ can be calculated by substituting, into the following equations, light intensity $I_{AMAX}$ of modulated light obtained when the angle of collection is a maximum and light intensity $I_{AMIN}$ of modulated light obtained when the angle of collection is a minimum at a modulation degree of the modulating device set at a predetermined intermediate level, and luminances $L_{AMAX}$ and $L_{AMIN}$ measured using these modulated light components as exit light components:

$$L_{AMAX} = qI_{AMAX} + L_0$$
$$L_{AMIN} = qI_{AMIN} + L_0$$

The point is to project modulated light components with at least two different light intensities onto the screen SC and measure the resulting luminances of the screen SC in order to calculate q and $L_0$. Note that since the accuracy of q and $L_0$ improves as the intensity difference between these modulated light components increases, it is preferable to maximize the intensity of one modulated light and minimize that of the other.

It is also possible to project n (=3 or more) different modulated light components instead of projecting two modulated light components of each different intensity. The luminance obtained by projection of these modulated light components is represented by the following equation:

$$L_i = qI_i + L_0 (i=1, 2, \ldots 3)$$

In this case q and $L_0$ can be calculated by using, e.g., a method of least squares. When q and $L_0$ are obtained, it is possible to determine an optimum aperture condition corresponding to the ratio of q and $L_0$ thus calculated, from a one-dimensional data table indicating optimum aperture conditions for various $q/L_0$ ratios.

In each of the above embodiments, the reflection screen SC is placed on the front side to display images. However, it is also possible to use a transmission screen placed on the rear side to display images.

In addition, in each embodiment the display apparatus is so designed as to use the transmitted light from the modulating device as the modulated light. However, the reflected light from the modulating device can also be used. Furthermore, it is possible to use, e.g., a fine-particle dispersion type liquid crystal, a DMD, and slant field effect liquid crystal diffraction grating instead of the polymer dispersion type liquid crystal of the modulating device.

According to the first aspect of the present invention, the luminance of the screen which reflects the angle distribution of an incident light beam to the modulating device is used in the aperture adjustment by which the contrast of a displayed image is maximized. This makes it possible to obtain displayed images easier to see under any environment in which the screen is placed.

A projection display apparatus according to the second aspect of the present invention will be described below with reference to FIG. 12.

Figure 12:
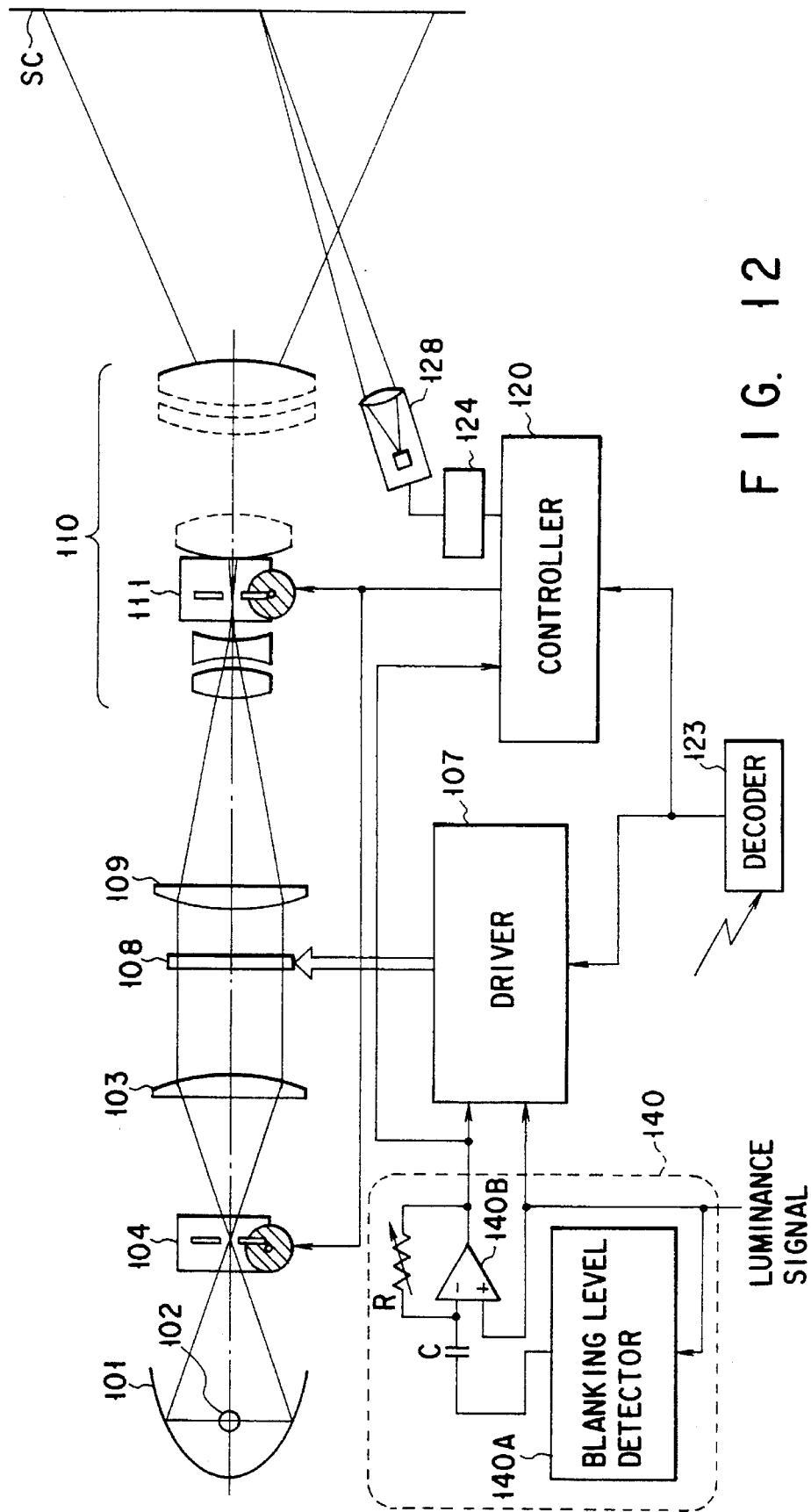
FIG. 12 is a block diagram showing the arrangement of a projection display apparatus according to the second aspect of the present invention.

FIG. 12 shows the arrangement of this projection display apparatus. The projection display apparatus comprises an optical system having a spheroidal mirror 101, a light source lamp 102, a collimator lens 103, an electric aperture stop 104, a modulating device 108, a field lens 109, projection lenses 110, and another electric aperture stop 111. The light from the lamp 102 enters the collimator lens 103 directly and after being reflected by the mirror 101. The collimator lens 103 outputs this incident light as parallel rays to the modulating device 108. The modulating device 108 includes a liquid crystal layer, in which a liquid crystal material is dispersed in a polymer resin, as a light-modulating layer between a pair of transparent electrode substrates. The modulating device 108 is driven by a modulating device driver 107 as a light-modulating device which modulates the spatial propagation direction of light by using this light-modulating layer. The modulated light from the modulating device 108 is incident on the projection lenses 110 through the field lens 109. The projection lenses 110 project the modulated light onto a reflection screen SC. That is, the basic arrangement of this projection display apparatus is identical with that of the projection display apparatus illustrated in FIG. 6B.

As with the apparatus in FIG. 6B, this display apparatus includes the two electric aperture stops 104 and 111. The electric aperture stop 104 narrows the bundle of rays entering the collimator lens 103. The electric aperture stop 111 narrows the bundle of rays projected from the projection lenses 110. A controller 120 operates the aperture stops 104 and 111 on the basis of an input signal A from a luminance signal smoothing circuit 140, an input signal B from a decoder 121, and a signal C from a photosensor interface circuit 124, thereby controlling the distribution of the incident light beam to the modulating device 108 and the exit beam angle range which contributes to a display. The decoder 121 receives a control signal transmitted from an external infrared remote controller and decodes the received signal to obtain the signal B.

FIG. 13 shows the relationship between the input signals A and B to the controller 120 and the angle of collection of the aperture stops. The state of each aperture stop is represented by the angle at which the exit light beam from the scattering type liquid crystal panel 108 passes through the aperture stop, i.e., the angle of collection. The angle of collection of the aperture stop 111 is so set as to be variable within the range from $8.6 \times 10^{-3}$ to $1.1 \times 10^{-3}$ sr. The aperture stop 104 is so controlled that a light beam within the same angle range is incident on the scattering type liquid crystal panel 108.

The input signal A to the controller 120 indicates the time average intensity of a luminance signal contained in a picture signal. The input signal A is generated by the luminance signal smoothing circuit 140. As in FIG. 12, this luminance signal smoothing circuit 140 is composed of a luminance signal blanking level (black level) detector 140A and an RC integrator 140B. A time constant RC of the integrator 140B can be altered by adjusting a resistor R. The input signal A to the controller 120 is obtained by averaging the difference between the output (black level) from the blanking level (black level) detector 140A and the luminance signal by using the RC integrator 140B.

The input signal B to the controller 120 is obtained by decoding the control signal from the infrared remote controller by using the decoder 121. This signal can be set to an arbitrary value by the infrared remote controller. As illustrated in FIG. 13, the input signal B changes the magnitude of the effect that the input signal A has on the aperture stops. When the value of the input signal B is sufficiently small, the angle of collection of each aperture stop is held minimized regardless of the input signal A. When the value of the input signal B is sufficiently large, the angle of collection of each aperture stop is held maximized regardless of the input signal A. To fix the angle of collection at a specific value, the input signal A is held constant at an intermediate signal fixed value, FIG. 13, by using a switch (not shown) of the controller 120.

The driver 107 is characterized by receiving, as its one input, an output signal from the smoothing circuit 140B and correcting the voltage for driving the scattering type liquid crystal panel. In this correction, the operation state of the controller 120 is detected on the basis of the decoded signal from the decoder 121, and the driving signal is corrected in synchronism with the controller such that a change in the average intensity of the signal is decreased. Therefore, if a projected image which is originally dark is further darkened with a decrease in the angle of collection, the driving signal is corrected such that the luminance of the scattering type liquid crystal panel is increased. Consequently, a variation in the luminance is reduced in the projected image finally obtained.

After the input signal A is held constant at the intermediate signal fixed value, FIG. 13, as discussed above, the aperture stops are controlled on the basis of the signal C from the photosensor interface circuit 124.

The average picture level (APL) detector 140 of the display apparatus in FIG. 12 will be described in detail below with reference to FIGS. 14 to 17.

In the average picture level (APL) detector 140 illustrated in FIG. 14, an input positive picture signal from an input terminal 151 is applied to the collector of a transistor 174 via a coupling capacitor 171. The collector of the transistor 174 is biased with a voltage obtained by dividing a power supply voltage $V_{CC}$, which is supplied to a power supply terminal 161, by resistors 172 and 173.

The base of the transistor 174 is applied with a gate pulse from a terminal 162 via a resistor 175. The transistor 174 detects an average picture level (APL) during the period of the gate pulse. This period of detection is, e.g., the blanking period of a picture signal.

The detected APL is passed through a buffer transistor 176 and peak-rectified by a time constant circuit consisting of a rectifier diode 177, a resistor 178, and a capacitor 179. The rectified signal is passed through a buffer amplifier consisting of a transistor 180 and a resistor 181, and through a resistor 182, resulting in the signals explained below.

Figure 15:
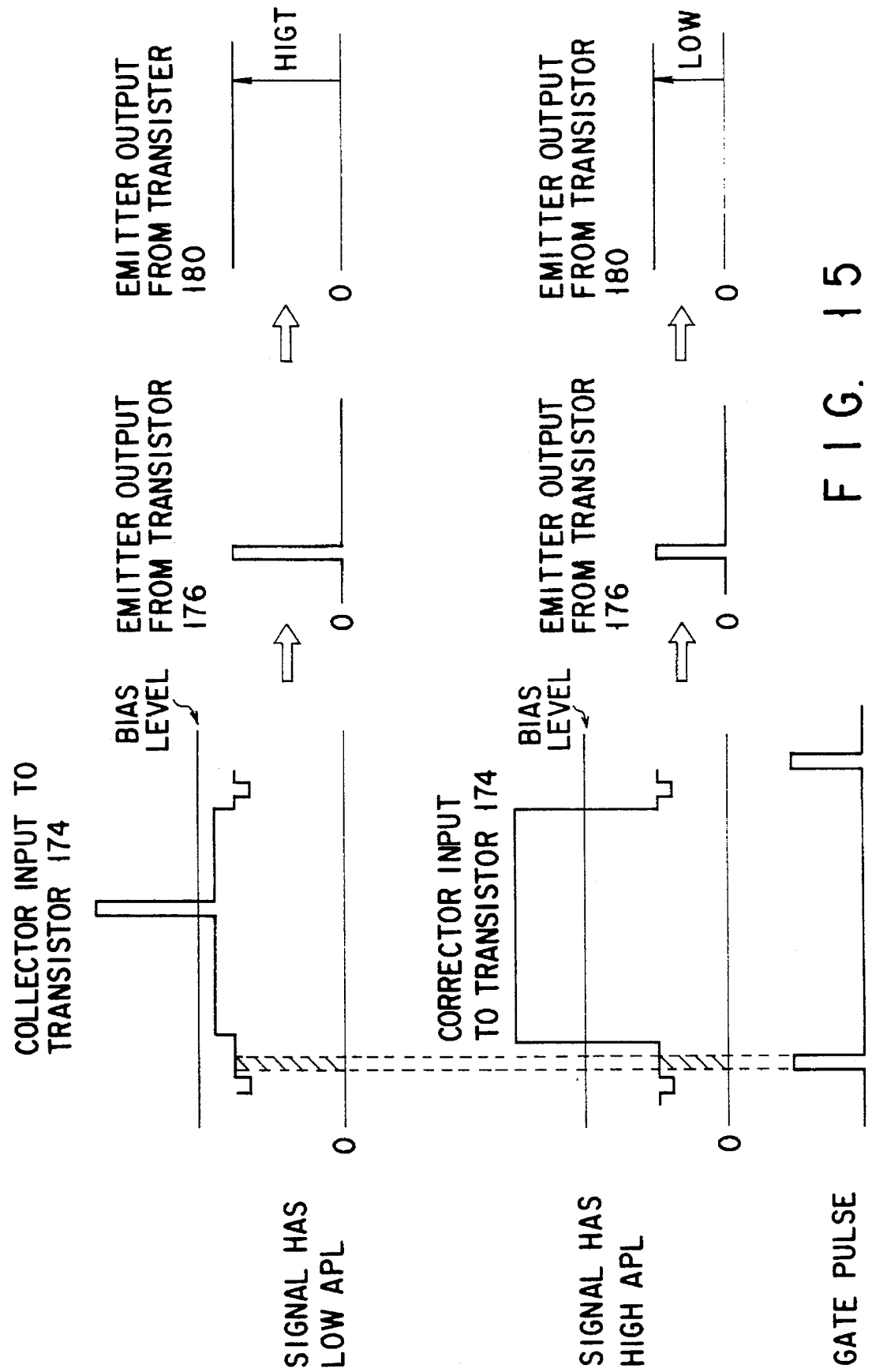
FIG. 15 is a view showing the collector input to a transistor, the emitter output from a buffer transistor, and the emitter output from another buffer transistor of the circuit illustrated in FIG. 14.

FIG. 15 shows the collector input to the transistor 174, the emitter output from the buffer transistor 176, and the emitter output from the buffer transistor 180 for each of a picture signal with a low APL and a picture signal with a high APL. It is evident from FIG. 15 that the emitter output from the buffer transistor 180 is low when the APL is low and high when the APL is high. The voltage change is obtained via the transistor 182.

FIG. 16 is a circuit diagram showing another example of the APL detector. Assuming, for example, that a picture signal which is clamped at the leading edge of a sync signal is applied to a terminal 151. A transistor 190 is connected to a power supply terminal 161 via a parallel circuit consisting of a resistor 191 and a capacitor 192. The emitter of the transistor 190 is connected to the reference potential point via a resistor 193 and a Zener diode 194.

The collector of the transistor 190 is connected to the base of a PNP transistor 195. The emitter of the PNP transistor 195 is connected to a power supply terminal 162 via a parallel circuit consisting of a resistor 196 and a capacitor 197, and is also connected to the base of the transistor 180. The transistor 180 and the resistor 182 are similar to those shown in FIG. 15.

In the circuit with the configuration illustrated in FIG. 16, when the clamped picture signal is applied to the base of the transistor 190, a signal with a level equal to or higher than a threshold value set by the Zener diode 194 is repeatedly amplified and output from the collector of the transistor 190. This signal is rectified by the base-emitter path of the transistor 195 and extracted via the transistor 180.

By the emitter output from the transistor 180, the reference voltage at the input terminal (−) of an error amplifier 150 changes. The results are the collector input to the transistor 190 and the emitter output from the buffer transistor 195 as illustrated in FIG. 17. Note that in FIG. 17, each hatched portion represents the portion amplified by the transistor 195. A portion below this threshold value is rectified through the base-emitter path of the transistor 180.

The display apparatus with the arrangement illustrated in FIG. 12 was operated to perform a display in a dark room. The result was that the contrast was 70:1 for a angle of collection of $1.1 \times 10^{-3}$ sr and 18:1 for a angle of collection of $8.6 \times 10^{-3}$ sr, because of unsatisfactory characteristics of the polymer dispersion type liquid crystal. The quantity of light in a white image display was 18 lm for a angle of collection of $1.1 \times 10^{-3}$ sr and 75 lm for a angle of collection of $8.6 \times 10^{-3}$ sr. When the aperture stops were fixed, it was necessary to use the aperture stops at the minimum angle of collection of $1.1 \times 10^{-3}$ sr in order to obtain a sufficient contrast. When the aperture stops were variable as in this embodiment, in contrast, the impression of the display was dramatically improved since the entire luminance could be raised in bright scenes. Especially when the display operation was done by using video software recording pictures of constellations and the lunar world, the blackness of the background was enhanced in the scenes of constellations, resulting in a very good display entirely different from that obtained with the fixed aperture stops. In addition, to check the relationship between the average luminance change and the aperture adjustment speed, the time constant of the aperture adjustment was changed from 0.5 to about 1 sec. As a result, the display characte-ristics were improved with little unnaturalness.

The display operation was also done by using a screen with a reflection gain of 13 times in a 500-lux room. Consequently, the brightness of the screen resulting from the internal light in the room was rather disturbing. The best impression was obtained when the angle of collection was set to nearly a maximum. This setting is worse than decreasing the angle of collection, since an insufficient contrast results if the room is sufficiently dark. It was confirmed that the use of the display apparatus of this embodiment made it possible to perform the display operation by optimizing the display characteristics even if the luminance of the use environment changed.

In a bright environment, the sense of a human recognizes a portion which is dark by contrast with the brightness as black. Therefore, the requirement for a black display in bright scenes is not very strict. In this case a sufficient brightness of white portions is more important than the contrast.

Conversely, in dark scenes the sense of a human becomes sensitive to the darkness so that light black and dark black are clearly distinguished. The brightness of white portions is emphasized by contrast with black portions surrounding white portions, and so an absolute luminance of white portions is not so important. In this case it is required that the contrast be high enough to display sufficiently dark black.

The projection display apparatus of this embodiment can change the display characteristics to satisfy the sense of a human and also can obtain a display characteristic that has never been obtained by conventional apparatuses. That is, it is possible to improve an essential brightness at a sufficiently high contrast.

This projection display apparatus is put into practical use in various environments depending on, e.g., the period of time or the location. In particular, since external light (illumination of a room or light from a window) acts on the screen to determine its luminance, black images are readily affected by the external light. That is, if a portion surrounding the screen is too bright, the contrast of an image displayed on the screen decreases even when the output light from the display apparatus has a high contrast. In these circumstances, therefore, display is performed by giving priority to the luminance rather than the contrast. In a sufficiently dark room or the like place, a display is performed such that black is shown with a sufficient darkness even if white is somewhat darkened.

In the projection display apparatus of this embodiment, it is possible to freely choose which of a black display or a white display is given priority in accordance with various conditions of the surrounding environment. In addition, this display apparatus consumes less power regardless of the above-mentioned superior display performance.

Note that in this embodiment, the reflection screen SC is placed on the front side to display images. However, it is also possible to use a transmission screen placed on the rear side to display images.

In addition, in this embodiment the display apparatus is so designed as to use the transmitted light from the scattering type liquid crystal panel, which is provided as a light-modulating device, as the modulated light. However, the reflected light from the scattering type liquid crystal panel also can be used. This scattering type liquid crystal panel can have a fine-particle dispersion type liquid crystal layer, instead of the polymer dispersion type liquid crystal layer, as the light-modulating layer. Also, the scattering type liquid crystal panel can be replaced with a light-modulating device such as a DMD.

The display apparatus according to this embodiment can display images more brightly in bright scenes and more darkly in dark scenes, thereby improving the effective contrast and luminance. This is so because, as illustrated in FIG. 18, the display characteristics change in accordance with the state of the aperture stop. Referring to FIG. 18, the state of the aperture stop is indicated by the angle at which the exit light beam from the light-modulating device passes through the aperture stop, i.e., the angle of collection. When the angle of collection is small, the display is darkened as a whole. Since the display is particularly darkened in the case of a black display, the contrast improves. When the angle of collection is increased, not only a white display but a black display is brightened, resulting in a decreased contrast. Altering the angle of collection in accordance with the luminance of a display makes it possible to use the maximum luminance and the minimum luminance in the display.

Figure 19:
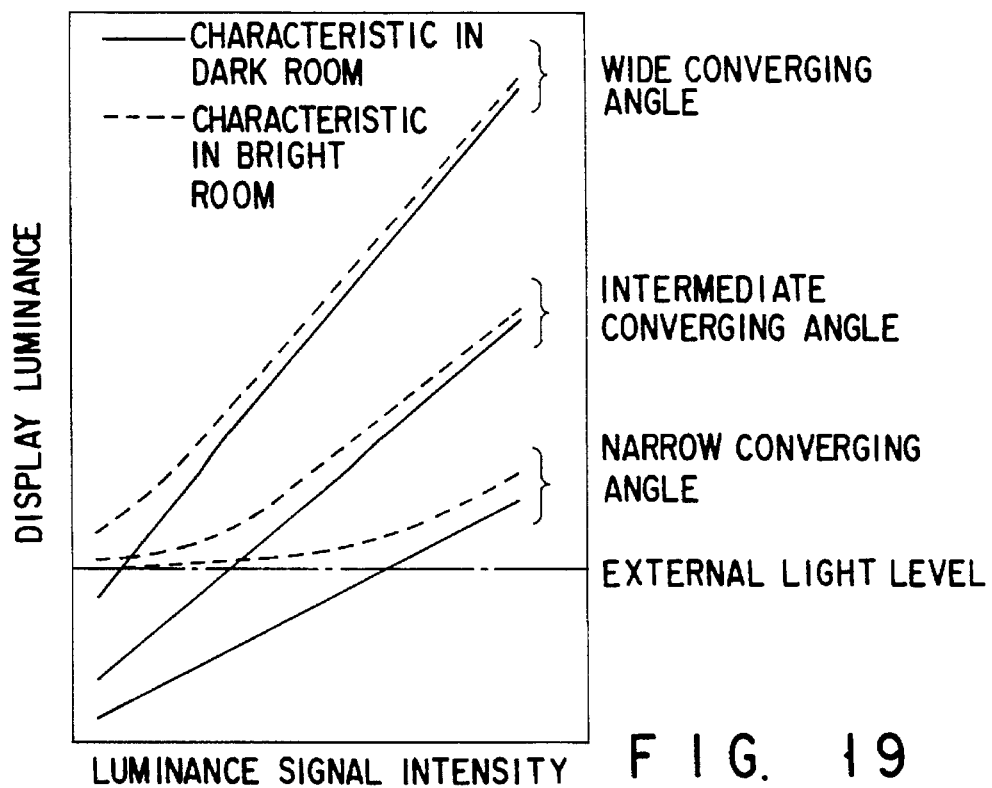
FIG. 19 is a graph showing the effective display characteristics in a bright environment.

In a bright environment, display characteristics attaching importance to the luminance can be obtained. In a dark environment, on the other hand, display characteristics with a high contrast attaching importance to the black level can be obtained. That is, as illustrated in FIG. 19, when the luminance of the display screen is constantly held at a fixed value or higher due to the external brightness, the black level does not decrease to be lower than that value. In this case it makes no difference whether the output light beam from the display apparatus is decreased. Therefore, in this case the overall display characteristics including the environment can be improved by performing a display attaching importance to the luminance by opening the aperture stops.

According to the second aspect as has been discussed above, it is possible to properly control the contrast and the luminance of images displayed on the screen.

The third aspect of the present invention will be described below.

In the display apparatuses according to the first and second aspects or in conventional display apparatuses, when the angle of collection of the aperture stops is adjusted, no desired transmitted light intensity can be obtained any longer at a driving voltage generated in correspondence with a luminance signal voltage. That is, the gradation of a displayed image is not accurately reproduced. In addition, when the modulating device displays a color image consisting of color components of red, green, and blue, the gradation balance between these color components changes depending on the angle of collection, resulting in a change in the tone of the displayed image.

Also, in the projection display apparatuses described above, the display state can be optimized under various environments. However, the angle distribution of light rays to be incident on the liquid crystal panel when a display is performed by giving priority to the luminance is different from that when a display is performed by giving priority to the contrast. The result is a reduction in the contrast or a degradation in the display quality. It is found that this degradation in the display quality is caused by variations in an optical leakage current from a switching device of the liquid crystal panel, which is due to variations in light flux incident on the liquid crystal panel.

The third aspect of the present invention has been made in consideration of the above technical problems and provides a projection display apparatus capable of accurately reproducing the gradation of an image, projecting good images in various environments, and projecting high-quality images even when used in a bright environment.

There will be described a dependence of the driving voltage-modulated light intensity characteristic of the modulating device on the angle of collection controlled by the aperture stop. According to studies made by the present inventors, the driving voltage-modulated light intensity characteristic of the modulating device is shown in FIG. 20. In FIG. 20, a characteristic curve Y1 represents the relationship between the driving voltage and the transmitted light (modulated light) intensity of the modulating device obtained when the angle of collection takes a standard value, 5°. This characteristic curve due to variations in the angle distribution of incident rays on the liquid crystal panel.

It may be possible to suppress the optical leakage current by sufficiently shielding the switching device from light. When the aperture efficiency of the liquid crystal panel is taken into consideration, however, it is difficult to completely shield the switching device from light particularly in a projection display apparatus which projects images in an enlarged scale, since the effective use of light from a light source is essential in an apparatus of this sort.

The third aspect of the present invention has been made in consideration of the above technical problems and provides a projection display apparatus capable of accurately reproducing the gradation of an image, projecting good images in various environments, and projecting high-quality images with no degradation in the contrast even when used in a bright environment.

The present inventors have made extensive studies and found that a change in the driving voltage-modulated light intensity characteristic of the modulating device is dependent on the angle of collection. In FIG. 20, a characteristic curve Y1 represents the relationship between the driving voltage and the transmitted light (modulated light) intensity of the modulating device obtained when the angle of collection takes a standard value, 5°. This characteristic curve Y1 shifts as indicated by a curve Y2 when the aperture stop is widened, and shifts as indicated by a curve Y3 when the aperture stop is stopped down. This consequently changes the transmitted light intensity for the same driving voltage. As an example, when the characteristic curve Y1 of the modulating device shifts to the curve Y2, the transmittance of the modulating device is set at a value higher than 0.6 which is supposed to be set for a luminance signal voltage of 0.6 V, as shown in FIG. 21.

Figure 24A:
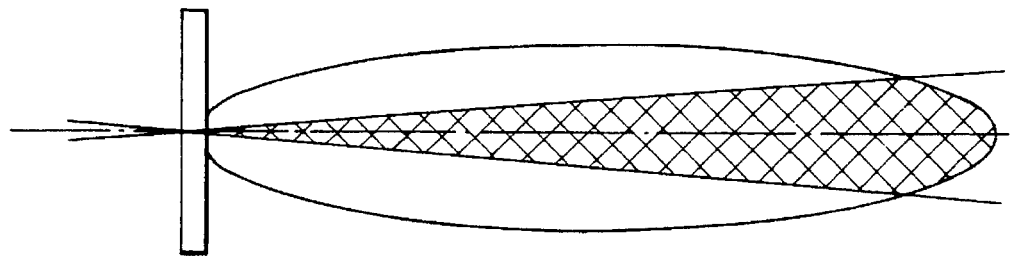
FIGS. 24A to 24C are views showing the state in which an effective portion of the exit light beam, FIG. 23, which contributes to a display, changes in dependence on the angle of collection.
Figure 24B:
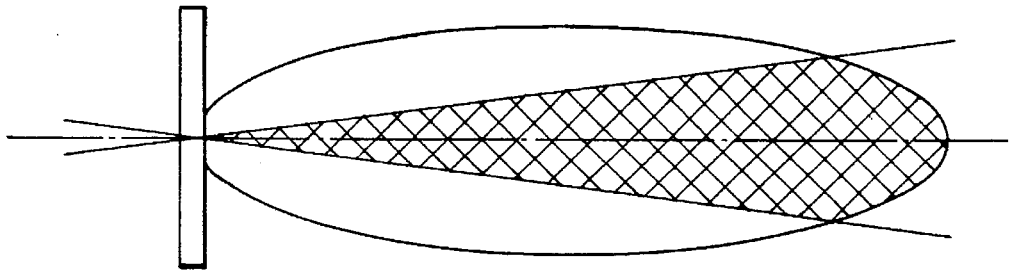
Figure 24C:
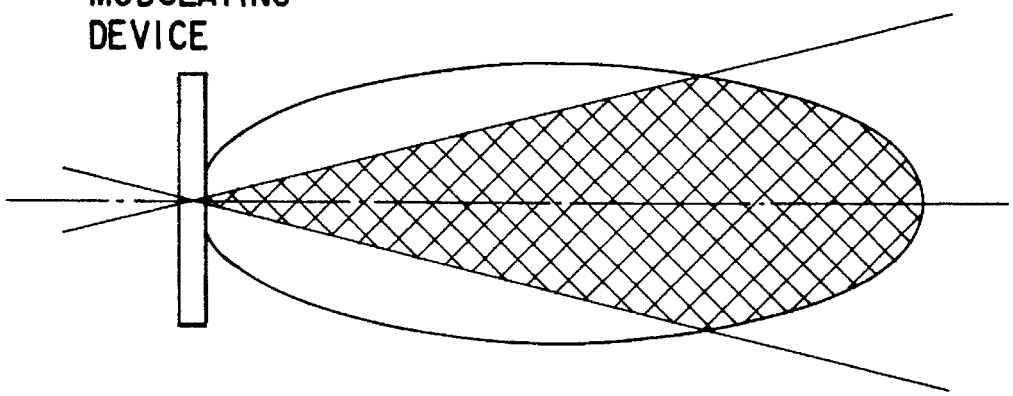

This dependence of the driving voltage-modulated light intensity characteristic on the aperture stop is considered to be caused by the following reason. That is, as illustrated in FIG. 22, the distribution of an incident light beam to the modulating device is equal to the distribution of an exit light beam which is determined by the angle of collection of the aperture stop. As shown in FIG. 23, the modulating device has a property of scattering light. When the angle of collection of the aperture stop is changed as indicated by A, B, and C in FIG. 22, the exit light beam is distributed as shown in FIGS. 24A, 24B, and 24C for the angle of collections A, B, and C, respectively.

Each of these exit light beams, however, is intercepted by the aperture stop on the exit side except in a portion within the same constant angle range as the distribution of the incident light beam. In FIGS. 24A to 24C, only a hatched portion is effective as the exit light beam which contributes to a display. As is apparent from FIGS. 24A to 24C, the ratio of the effective portion to the light-intercepted portion increases as the angle of collection widens.

The relative transmittance of the modulating device is the ratio between the quantity of the exit light beam passing through the aperture stop on the exit side when no incident light beam is scattered by the modulating device and the quantity of the exit light beam passing through the aperture stop on the exit side when the incident light beam is scattered by the scattering property of the modulating device. When the modulating device has the scattering nature as in FIG. 23, transmittances corresponding to the aperture amounts, by which the incident and exit light beams as indicated by A, B, and C in FIG. 22 are obtained, are as shown in FIGS. 24A, 24B, and 24C, respectively. That is, widening the angle of collection increases the ratio of the exit light beam transmitting through the aperture stop on the exit side to the incident light beam.

In the display apparatus according to the third aspect of the present invention, a change in the driving voltage-modulated light intensity characteristic of the modulating device is compensated for by a compensator which is interlocked with an aperture controller. Consequently, gamma correction can be properly performed even when the luminance of an image is altered by adjusting the aperture amount. Therefore, it is possible to prevent a poor gradation reproduction and an unnatural color change.

The projection display apparatus according to the third aspect of the present invention will be described below with reference to the accompanying drawings.

Figure 25:
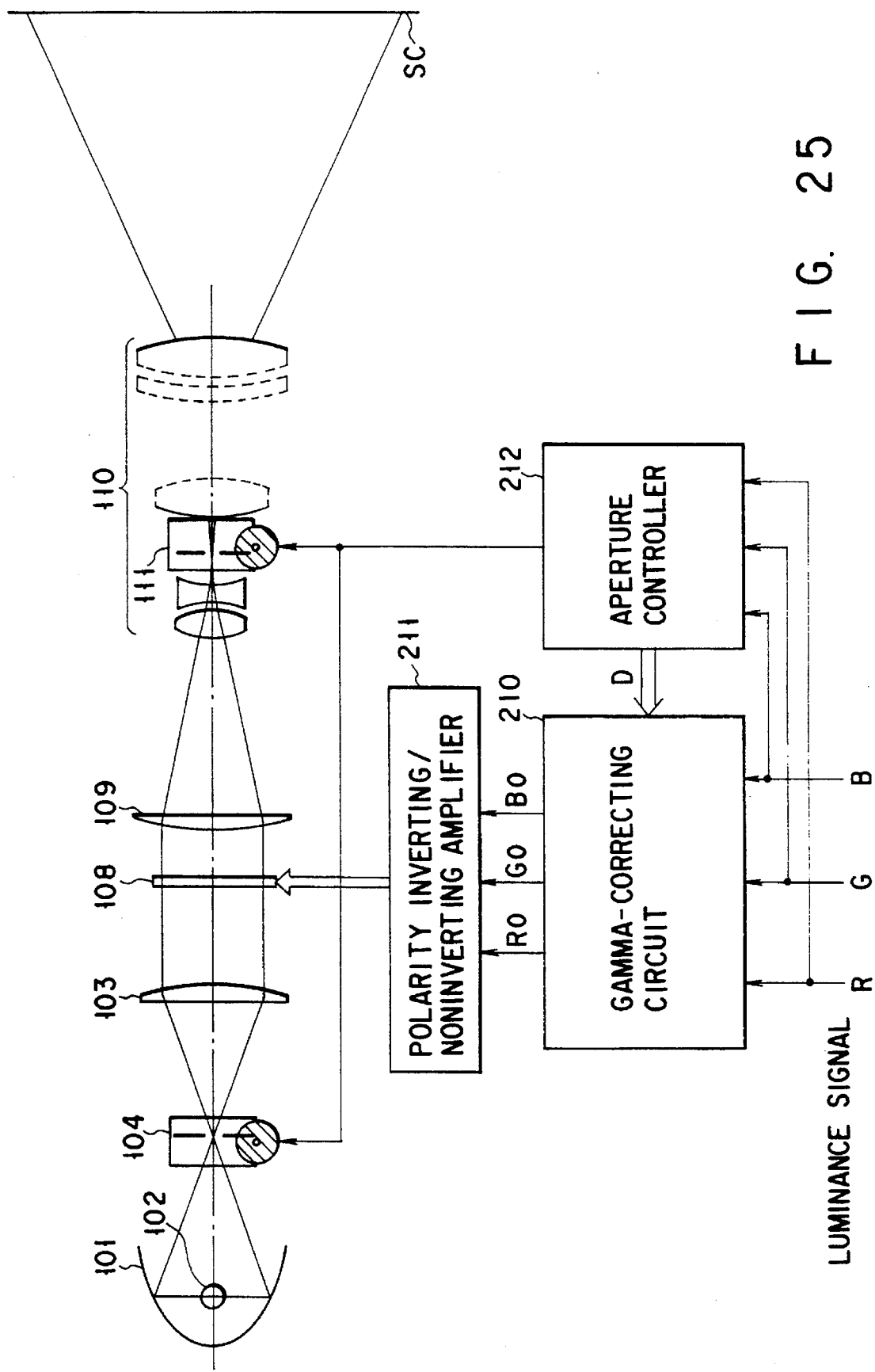
FIG. 25 is a view showing the arrangement of the projection display apparatus according to the third aspect of the present invention.

FIG. 25 shows the overall arrangement of this projection display apparatus. This projection display apparatus has an optical system in which a spheroidal mirror 101, a light source lamp 102, an electric aperture stop 104, a collimator lens 103, a scattering type modulating device 108, a field lens 109, projection lenses 110, and another electric aperture stop 111 are arranged on the optical axis. The light from the lamp 102 is incident on the collimator lens 103 directly and after being reflected by the mirror 101. The collimator lens 103 outputs this incident light as parallel rays to the modulating device 108. The modulating device 108 modulates the spatial propagation direction of the incident light in a two-dimensional region. The modulating device 108 is driven by a driver constituted by a gamma-correcting circuit 210 and a polarity inverting/noninverting amplifier 211. The modulating device 108 is a polymer dispersion type liquid crystal panel in which a liquid crystal layer formed by dispersing a liquid crystal material in a polymer resin is held between a pair of transparent electrode substrates. A plurality of color pixel groups are arranged in a matrix manner in this liquid crystal panel. Each pixel group consists of red, green, and blue pixels. The field lens 109 guides the modulated light from the modulating device 108 to the projection lenses 110. The projection lenses 110 project the modulated light onto a reflection screen. That is, the basic display principle of this projection display apparatus is identical with that of conventional apparatuses.

In this display apparatus, the electric aperture stop 104 is arranged between the light source lamp 102 and the collimator lens 103, and the electric aperture stop 111 is arranged within the projection lenses 110. The electric aperture stop 104 stops down the beam of the light from the light source lamp 102 in order to control the angle range of light rays to be incident on the modulating device 108. The electric aperture stop 111 stops down the beam of the modulated light from the modulating device 108 in order to control the angle range of light rays to be projected onto a screen SC. Each of the electric aperture stops 104 and 111 consists of five ceramic blades with a high heat resistance and has a servo motor M. Each aperture stop functions as a circular variable aperture stop whose angle of collection is changed by changing the size, i.e., the radius of the circular aperture constituted by the combination of the ceramic blades by using the servo motor.

This display apparatus is supplied with three luminance signals R, G, and B obtained by separating a color picture signal into color components of red, green, and blue. Each luminance signal sequentially designates, in units of field periods, the luminance of a pixel of the corresponding color provided in the modulating device 108. To optimize the contrast and the luminance of a displayed image, the display apparatus further includes an aperture controller 212 for performing a common adjustment for the angle of collections, i.e., the aperture radii of the electric aperture stops 104 and 111 on the basis of the luminance signals R, G, and B. This aperture controller 212 supplies angle of collection data D, which represents the adjusted aperture stop angle of collection, to the gamma-correcting circuit 210. On the basis of the angle of collection data D, the gamma-correcting circuit 210 performs gamma correction for the luminance signals R, G, and B and supplies resulting driving voltages RO, GO, and BO to the polarity inverting/noninverting amplifier 211. The amplifier 211 inverts the polarity of the driving voltages RO, GO, and BO from positive to negative or vice versa in, e.g., the horizontal scanning period of the picture signal, and supplies the inverted driving voltages to the modulating device 108.

Figure 26:
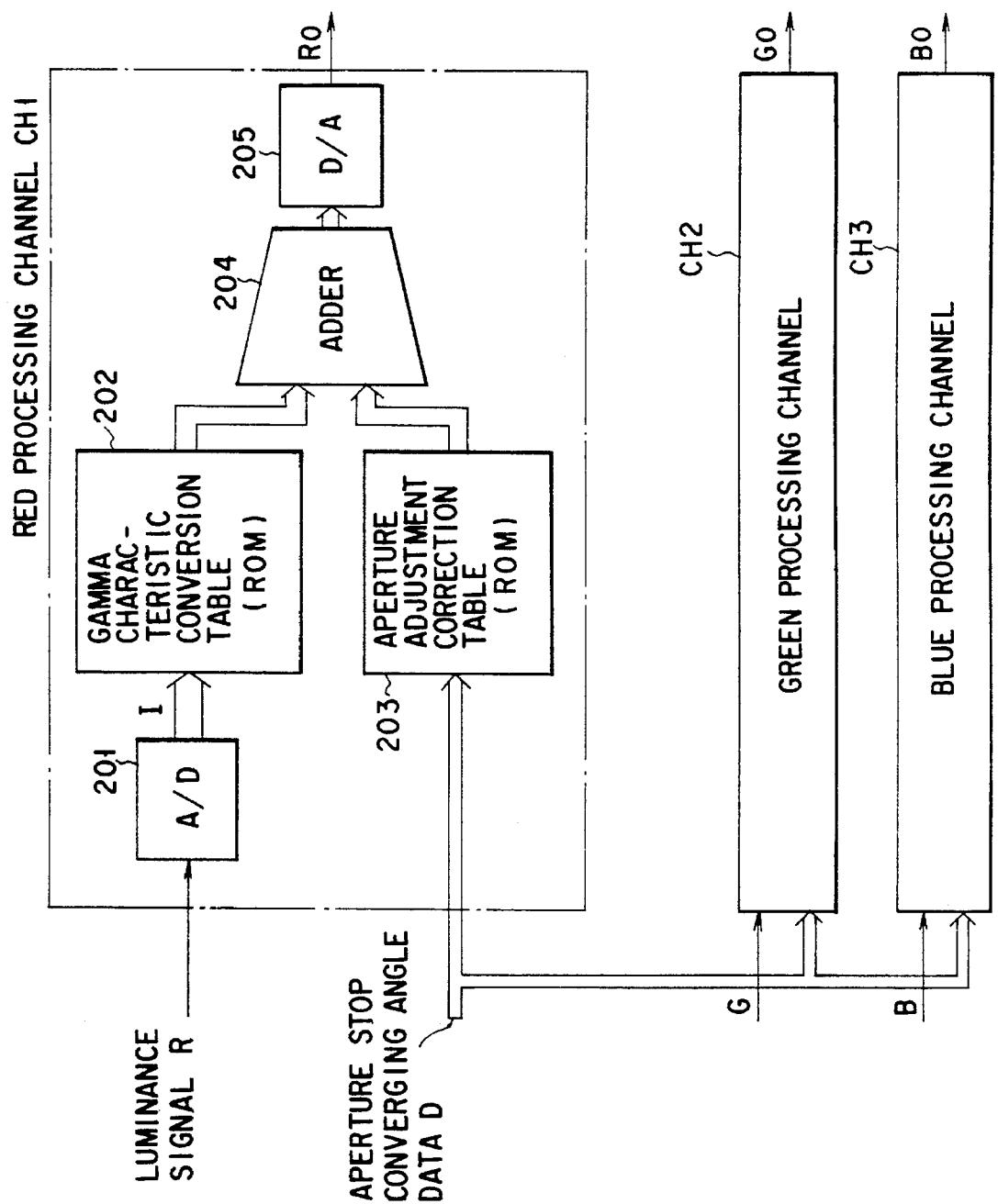
FIG. 26 is a block diagram showing the details of the arrangement of a gamma-correcting circuit in FIG. 25.

FIG. 26 shows details of the configuration of the gamma-correcting circuit 210. The gamma-correcting circuit 210 has processing channels CH1, CH2, and CH3 with an identical arrangement in order to perform gamma correction for the luminance signals R, G, and B, respectively. Each of these processing channels CH1 to CH3 includes an A/D converter 201, a gamma characteristic conversion table 202, a correction table 203, an adder 204, and a D/A converter 205. The A/D converter 201 converts a luminance signal of the corresponding color into luminance data I in a digital form which represents the luminance of each pixel. The gamma characteristic conversion table 202 generates reference driving voltage data VR corresponding to the luminance data I from the A/D converter 201. The correction table 203 generates correction data $\Delta V$ corresponding to the angle of collection data D from the aperture controller 212. The adder 204 adds the correction data a V to the reference voltage data VR. The D/A converter 205 converts the addition result into a driving voltage signal in an analog form.

The characteristic conversion table 202 is a ROM storing a plurality of reference driving voltages VR to be selected in accordance with the luminance data I. Each reference driving voltage VR represents the reference driving voltage which is determined by the characteristic curve Y1, FIG. 20, with respect to the luminance designated by the luminance data I. The correction table 203 is a ROM storing a plurality of correction data $\Delta V$ to be selected in accordance with the luminance data I. Each correction data $\Delta V$ indicates the correction voltage obtained by approximating the difference between a curve, such as the curve Y2 or Y3, FIG. 20, which is obtained for the angle of collection designated by the angle of collection data D, and the characteristic curve Y1.

The operation of each processing channel will be described below. The A/D converter 201 converts the luminance signal into the luminance data I and supplies the data to the gamma characteristic conversion table 202. Consequently, one of the reference driving voltage data VR stored in the table 202 is selected in accordance with this luminance data I and supplied to the adder 204 as a result of the gamma correction based on the characteristic curve Y1 obtained by a standard angle of collection, 5°. Meanwhile, one of the correction data $\Delta V$ stored in the correction table 203 is selected in accordance with the angle of collection data D from the aperture controller 212. The selected correction data $\Delta V$ is supplied to the adder 204 as a correction voltage approximating the difference between the characteristic curve, which is obtained with respect to the angle of collection designated by the angle of collection data D, and the characteristic curve Y1. The adder 204 adds the reference driving voltage data VR to the correction data $\Delta V$. The addition result represents a driving voltage suitable for the current angle of collection. This addition result is converted into a driving voltage signal by the D/A converter 205.

When the electric aperture stops 104 and 111 are set at the standard angle of collection of 5°, for example, the correction data $\Delta V$ indicates 0. Consequently, the addition result from the adder 204 is equal to the reference driving voltage data VR. When the angle of collection data D changes upon adjustment of the angle of collection, the correction data $\Delta V$ also changes in either the positive or negative direction from 0. The correction data $\Delta V$ becomes negative when the aperture stop angle of collection is larger than 5°, and positive when the angle of collection is smaller than 5°. The modulating device 108 using the polymer dispersion type liquid crystal is a device which decreases the light scattering degree and increases the modulated light intensity upon application of a voltage. Therefore, the driving voltage is so corrected as to decrease as the aperture stop angle of collection is increased, and to increase as the angle of collection is decreased.

In this display apparatus, the two electric aperture stops 104 and 111 are provided, and the essential characteristic of the gamma-correcting circuit 210 changes in accordance with the adjustment of the angle of collections of these aperture stops. As a result, the driving voltage is appropriately corrected in accordance with the aperture stop angle of collection. This makes it possible to obtain a luminance designated by the luminance signal independently of the angle of collection. That is, neither a poor gradation reproduction nor an unnatural color change occurs when the aperture stop angle of collection has changed.

In the above embodiment the angle of collections of both the electric aperture stops 104 and 111 are similarly varied. However, it is also possible to vary the angle of collection of only one of these aperture stops. In addition, a fine-particle dispersion type liquid crystal, DMD, or a slant field effect liquid crystal diffraction grating can also be used instead of the polymer dispersion type liquid crystal of the modulating device 108. If a modulating device which increases the light scattering degree and decreases the modulated light intensity upon application of a voltage is used, the contents of the correction table 203 are altered to correct the driving voltage such that the driving voltage decreases as the aperture stop angle of collection increases.

The correction table 203 holds one correction data $\Delta V$ for each angle of collection in the above embodiment. However, the correction table 203 can also hold a plurality of correction data $\Delta V$ representing the voltage which is the difference between the curve, such as the curve Y2 or Y3, obtained for each angle of collection and the reference characteristic curve Y1, for each luminance. In this case, these correction data $\Delta V$ are selected and used in accordance with the combination of the luminance data I and the angle of collection data D. With this arrangement a more precise correction can be performed, although the storage capacity of the correction table 203 must be increased.

Furthermore, instead of guiding the transmitted light from the modulating device 108 to the screen SC, the reflected light from the modulating device 108 can be guided to the screen SC. Also, the screen SC is not limited to a reflection type used to project images on the front side but can be a transmission type used to project images on the rear side.

According to the third aspect of the present invention as discussed above, while the aperture stop angle of collection is optimized on the basis of the surrounding environment or the state of a displayed image, the gradation of the displayed image can be accurately reproduced.

The fourth aspect of the present invention will be described below.

Even if no light leaks at the switch element of the modulating device 108 as described above, it is necessary to control the drive voltage-to-modulated light intensity characteristic, depending on changes of the angle of collection caused by the aperture stop. Practically, however, it is difficult to completely shield the switch element from light, in view of the numerical aperture. Further, since the intensity of the incident light flux varies as the aperture of the aperture stop 52 is controlled, it is also necessary to control said characteristic in view of the leakage of light at the switch element. Light leakage, if any, at the switch element, will deteriorate the pixel-potential holding characteristic. Consequently, the drive voltage-to-modulated light intensity characteristic will shift toward a high-voltage side. The resultant light-leakage current is proportional to the intensity of the light applied to the switch element. Hence, the extent of the shift increases as the intensity of the light increases because of an increased aperture. The display quality is inevitably degraded. It is desirable that the switch element be optimally constructed and incorporate a polysilicon TFT rather than an amorphous silicon TFT. It is more preferred that a picture signal control means be used to correct the light-leaking characteristic of the modulating device. Furthermore, since the light-leaking characteristic depends on the wavelength of the incident light, it is desirable that measures be taken to reduce changes in the hue of the image displayed. The hue of the image changes as the gradient balance between the color components changes when the angle of collection varies. In practice, the drive voltage-to-modulated light intensity characteristic should better be corrected, in consideration of the light leakage which takes place when the aperture size of the aperture stop is controlled.

In a display apparatus using a polymer dispersion type liquid crystal or a fine-particle dispersion type liquid crystal, the display state changes with the display luminance or with an elapse of time from the initial stages of the display, or the display quality changes with the ambient temperature. The cause of these problems is considered that, in the polymer dispersion type liquid crystal or the fine-particle dispersion type liquid crystal, the applied voltage (V)-light transmittance (T) characteristic, the hysteresis characteristic, or the response speed, for example, varies in accordance with temperature changes, and this variation is large compared to that in a twisted nematic (TN) liquid crystal.

In addition, particularly a projection display apparatus has another problem that the display quality is degraded due to a temperature difference resulting from a bundle of rays which changes in accordance with control of the aperture diameters of aperture stops arranged in a light source optical system.

The fourth aspect of the present invention has been made in consideration of the above technical problems and provides a display apparatus capable of projecting high-quality images regardless of the size of an aperture stop for controlling a light beam, the time elapsed from an ON operation of a light source, or the ambient temperature, or when images are continuously displayed.

More specifically, as discussed above, a light-modulating device including a polymer dispersion type (PD) liquid crystal layer in which a liquid crystal material is contained in a polymer resin or a fine-particle dispersion type liquid crystal layer in which fine particles are contained in a liquid crystal has, e.g., an applied voltage (V)-light transmittance (T) characteristic, a hysteresis characteristic, or a response speed which largely varies in accordance with temperature changes.

Figure 27:
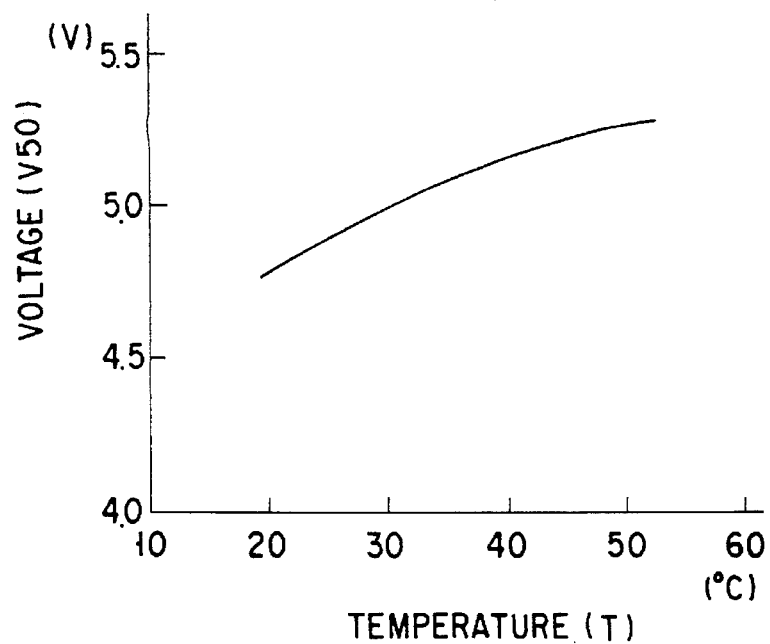
FIG. 27 is a graph showing the temperature dependence of a light-modulating device.

FIG. 27 shows the temperature dependence of the modulating device, in which the voltage ($V_{50}$) at which the light transmittance is 50% is plotted on the ordinate, and the temperature (T) is plotted on the abscissa. As is apparent from FIG. 27, to obtain a constant displayed image independently of the temperature (T), it is necessary to raise the applied voltage to the liquid crystal layer as the temperature (T) rises.

The fourth aspect of the present invention, therefore, comprises a picture signal control means for increasing or decreasing a picture signal in accordance with a change in the temperature of the modulating device. With this means a constant displayed image can be obtained independently of the temperature (T).

Figure 28:
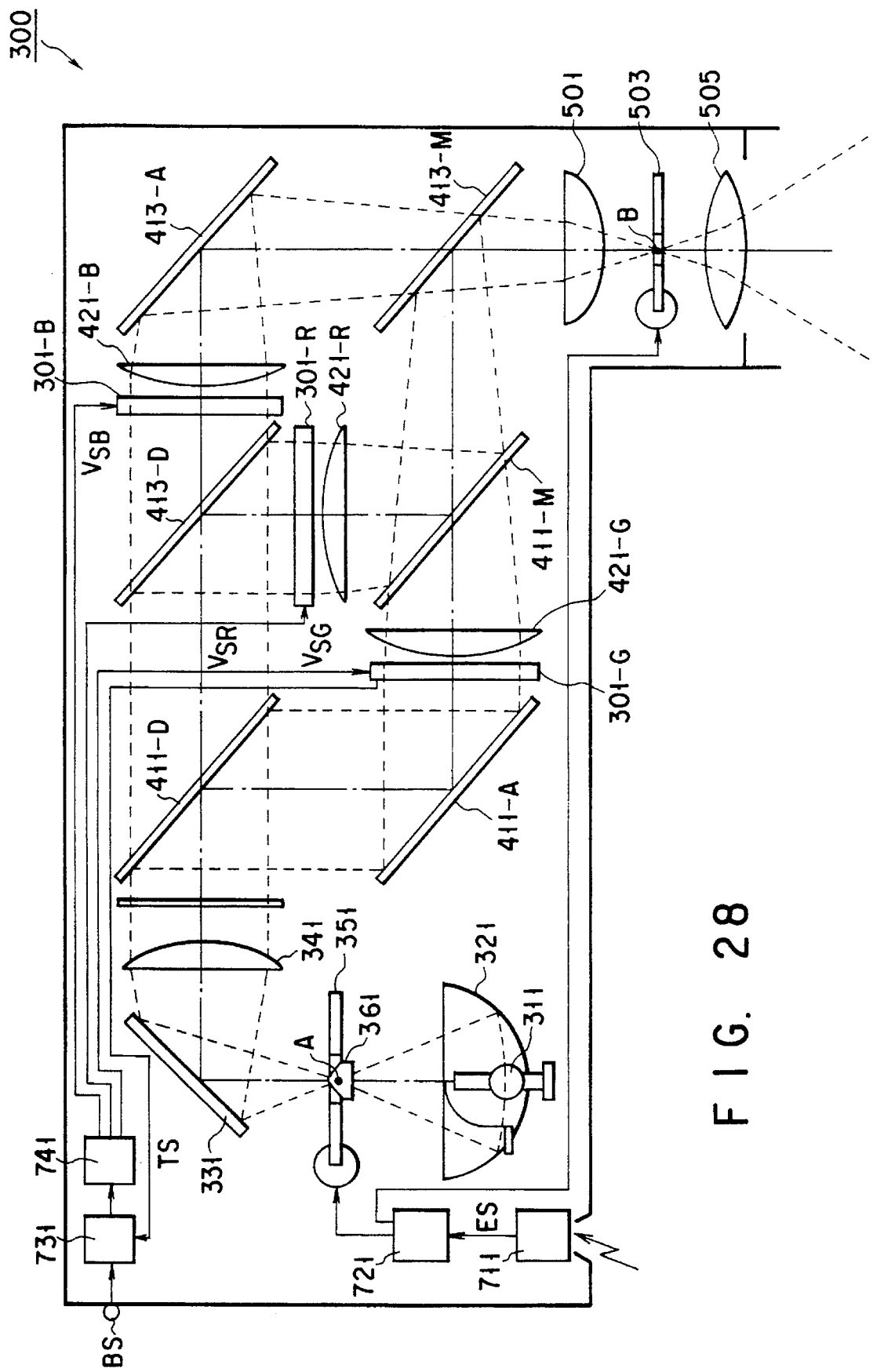
FIG. 28 is a view showing the arrangement of a projection liquid crystal display apparatus according to the fourth aspect of the present invention.

FIG. 28 is a view showing a projection liquid crystal display apparatus according to the fourth aspect of the present invention.

As illustrated in FIG. 28, this projection liquid crystal display apparatus 300 is of a 3-panel type, i.e., includes three modulating devices, e.g., liquid crystal panels 301-R, 301-G, and 301-B for red (R), green (G), and blue (B), respectively.

A light source optical system of this display apparatus has a metal halide lamp as a light source 311 and a spheroidal reflector 321. The reflector 321 converges the light from the light source 311 to have a focal point at a point A on the optical axis between the light source 311 and the liquid panels 301-R, 301-G, and 301-R. The light once converged at the point A by the reflector 321 is reflected by a cold mirror 331 and is guided as parallel light to the liquid crystal panels 301-R, 301-G, and 301-B by a collimator lens 341. A first aperture stop means 351 is arranged at the point A as the focal position of the reflector 321. The first aperture stop means 351 has a nearly circular aperture, and the aperture diameter $D_1$ of the aperture can be varied by a servo motor.

In this display apparatus, the light source 311 is fixed to the central portion of the reflector 321 to obtain a prescribed positional accuracy with respect to the reflector 321. Consequently, the light beam in the center of the light from the light source 311 is decreased in amount. To compensate for this, in the light source optical system of this display apparatus a convex conical lens 361 is arranged between the light source 311 and the first aperture stop means 351 at a position near the first aperture stop means 351. This conical lens 361 guides the light beam, which is diverged and hence is not effectively used in a display, to the central portion of the light, thereby preventing a decrease in the light amount in the center of the light. Note that a concave conical lens can also be used in place of the convex conical lens 361 as long as the lens guides the light beam, which is diverged and not effectively used, to the central portion of the light. Note also that a structure as disclosed in Jpn. Pat. Appln. KOKAI Publication No. 6-175129 can be used instead of the lens 361.

A projection optical system includes a focusing lens 501, a second aperture stop means 503, and a projection lens 505. The focusing lens 501 focuses the light modulated by the liquid crystal panels 301-R, 301-G, and 301-B at a point B. The second aperture stop means 503 has an aperture for intercepting the scattered light and transmitting the transmitted light from the liquid crystal panels 301-R, 301-G, and 301-B at the point B. An aperture diameter $D_2$ of this aperture can be varied by a servo motor. The projection lens 505 projects the modulated light passing through the second aperture stop means 503. As described above, the second aperture stop means 503 intercepts the scattered light and transmits the transmitted light from the liquid crystal panels 301-R, 301-G, and 301-B. Therefore, the display luminance can be increased by increasing the aperture diameter $D_2$ of the second aperture stop means 503.

The first and second aperture stop means 351 and 503 are electrically connected to an aperture control means 721. The aperture control means 721 controls the aperture diameters $D_1$ and $D_2$ of the first and second aperture stop means 351 and 503 on the basis of an environmental luminance signal ES from a photosensor 711 for monitoring the luminance on the screen. More specifically, the aperture control means 721 controls the aperture diameter $D_1$ of the first aperture stop means 351 and the aperture diameter $D_2$ of the second aperture stop means 503 such that their respective angle of collections $\Omega_1$ and $\Omega_2$ are increased as the environmental luminance on the screen increases. In this display apparatus, the aperture diameters $D_1$ and $D_2$ of the first and second aperture stop means 351 and 503 are so controlled that the angle of collections $\Omega_1$ and $\Omega_2$ are varied within the range from $8.6 \times 10^{-3}$ sr to $1.1 \times 10^{-3}$ sr.

Note that assuming the distribution angle of the light-source light is $\pm\theta$, the angle of collection $\Omega_1$ of the first aperture stop means 351 in this specification is represented by a value obtained by integrating $[2 \pi \sin \theta]$ for $\theta$ from 0 to $\theta$. In addition, assuming that the focal length of the collimator lens 341 is $f_1$, this angle of collection $\Omega_1$ is expressed as $\Omega_1 = \pi(D_1/2f_2)^2$ as a function of the aperture diameter $D_1$ of the first aperture stop means 351.

Also, assuming that the focal length of the field lens is $f_2$, the angle of collection $\Omega_2$ of the second aperture stop means 503 in this specification is expressed as $\Omega_2 = \pi(D_1/2f_2)^2$ as a function of the aperture diameter $D_2$ of the second aperture stop means 503.

When factors such as the light use efficiency and the like are taken into account, these angle of collections $\Omega_1$ and $\Omega_2$ are desirably varied in association with each other to almost agree with each other.

The arrangement of the liquid crystal panels 301-R, 301-G, and 301-B will be described below. Of the light from the light source optical system, only green (G) light is reflected by a first dichroic mirror 411-D. The reflected green (G) light is guided to the liquid crystal panel 301-G by a first total reflection mirror 411-A and output through the liquid crystal panel 301-G and a green (G) field lens 421-G.

Of the light-source light transmitted through the first dichroic mirror 411-D, only red (R) light is reflected by a second dichroic mirror 413-D and guided to the liquid crystal panel 301-R. The red (R) light passing through the liquid crystal panel 301-R and a red (R) field lens 421-R is synthesized with the green (G) light from the liquid crystal panel 301-G by a first synthesizing mirror 411-M.

The light-source light transmitted through the second dichroic mirror 413-D is guided to the liquid crystal panel 301-B. The blue (B) light passing through the liquid crystal panel 301-B and a blue (B) field lens 421-B is reflected by a second total reflection mirror 413-A and synthesized with the red (R) light and the green (G) light, which are synthesized after being transmitted through the liquid crystal panels 301-G and 301-R, by a second synthesizing mirror 413-M. The resulting light is guided to the projection optical system.

The liquid crystal panels 301-R, 301-G, and 301-B will be described below. Since the arrangements of the liquid crystal panels 301-R, 301-G, and 301-B have no large difference except for the driving systems, the liquid crystal panel 301-G for green (G) will be described as a representative. In this liquid crystal panel 301-G, 640 display pixels and 480 display pixels are arranged in the row and the column directions, respectively, with a pitch of 100 μm.

Figure 29:
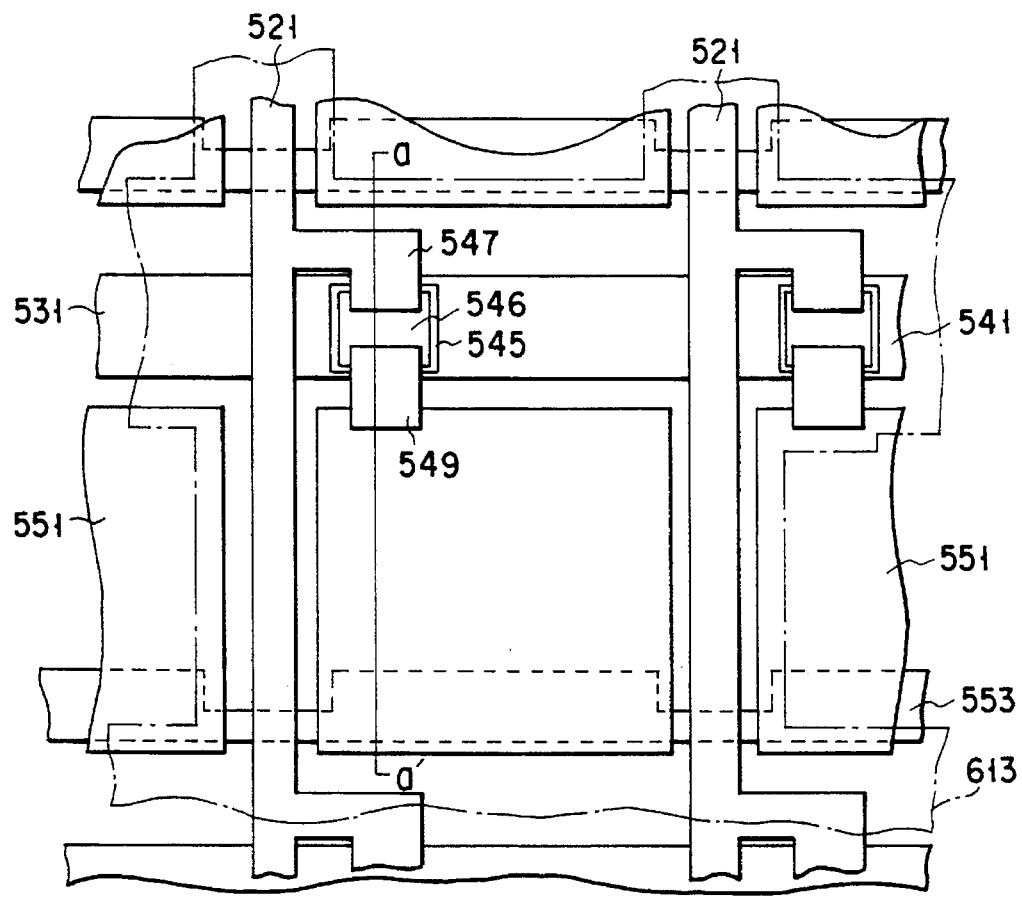
FIG. 29 is a plan view showing the arrangement of a modulating device used in the display apparatus shown in FIG. 28.
Figure 30:
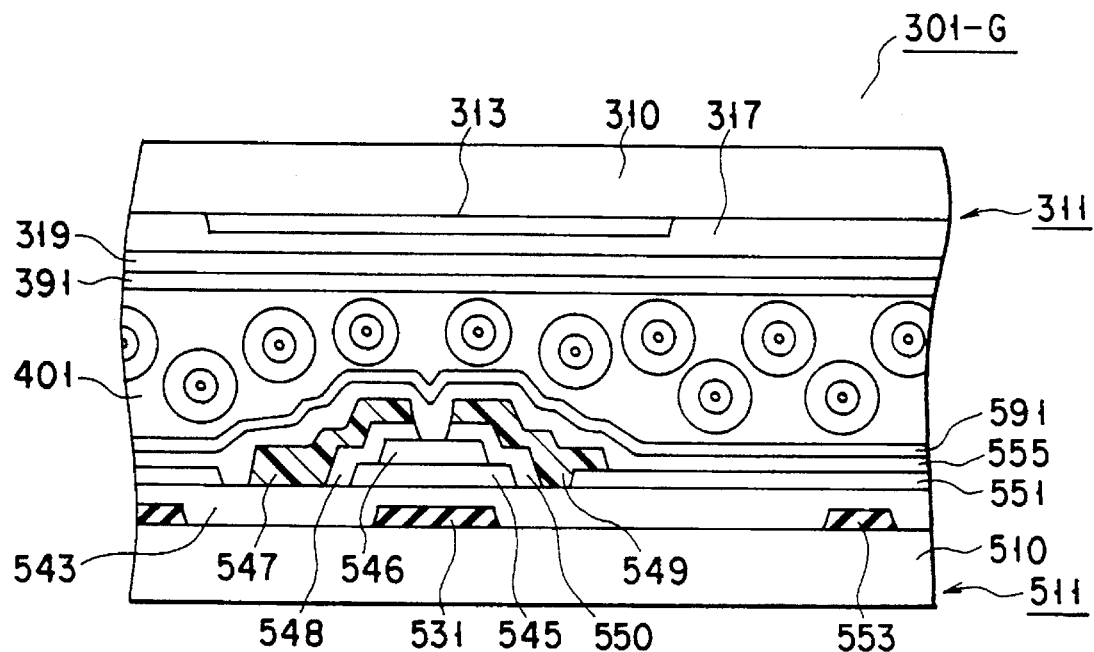
FIG. 30 is a sectional view showing the arrangement of the modulating device used in the display apparatus in FIG. 28.

As illustrated in FIGS. 29 and 30, in the liquid crystal panel 301-G a polymer dispersion type liquid crystal layer 401, in which a nematic liquid crystal having a positive dielectric anisotropy is dispersed in a polymer resin, is held in place between an array substrate 511 and a counter substrate 611 via surface-treated films 591 and 691.

In the array substrate 511, as in FIG. 29, signal lines 521 and scanning lines 531 are arranged to be substantially perpendicular to each other on a 0.7-mm thick transparent glass substrate 510. Thin-film transistors (to be abbreviated as TFTs hereinafter) 541 are arranged near the intersections of the signal lines 521 and the scanning lines 531. As illustrated in FIG. 30, each TFT 541 has a reverse-staggered structure using the scanning line 531 as a gate electrode and also including a thin amorphous silicon film 545, a semiconductor protective film 546, a drain electrode 547, and a source electrode 549. The thin amorphous silicon film 545 is formed as a semiconductor layer on the scanning line 531 via a gate insulating film 543. The semiconductor protective film 546 is made from silicon nitride and is self-aligned with the scanning line 531 in order to protect the thin amorphous silicon film 545 and suppress a parasitic capacitance. The drain electrode 547 extends from the signal line 521 and electrically connects the thin amorphous silicon film 545 to the signal line 521 via a thin n⁺-type amorphous silicon film 548. The source electrode 549 electrically connects a pixel electrode 551, which is arranged in the region surrounded by the signal lines 521 and the scanning lines 531 and made from ITO (Indium Tin Oxide), to the thin amorphous film 545 via a thin n⁺-type amorphous silicon film 550. Also, auxiliary capacitance lines 553 each for forming an auxiliary capacitance (Cs) between the line 553 and the pixel electrode 551 via the gate insulating film 543 are arranged substantially parallel to the scanning lines 531. In addition, a protective film 555 is formed on the TFTs 541 and the pixel electrodes 551 to constitute the array substrate 511.

The counter substrate 311 is constituted by a 0.7-mm thick transparent glass substrate 310, a matrix-like light-shielding layer 313, a protective film 317, and a counter electrode 319. The light-shielding layer 313 shields portions surrounding the TFTs 541 and the pixel electrodes 551 on the array substrate 511 from light and is constructed from chromium (Cr). The protective film 317 is formed on the light-shielding layer 313. The counter electrode 319 is formed on the protective film 317 and constructed from ITO. The liquid crystal panel 301-G with this arrangement achieves an aperture efficiency of 40%.

Figure 31:
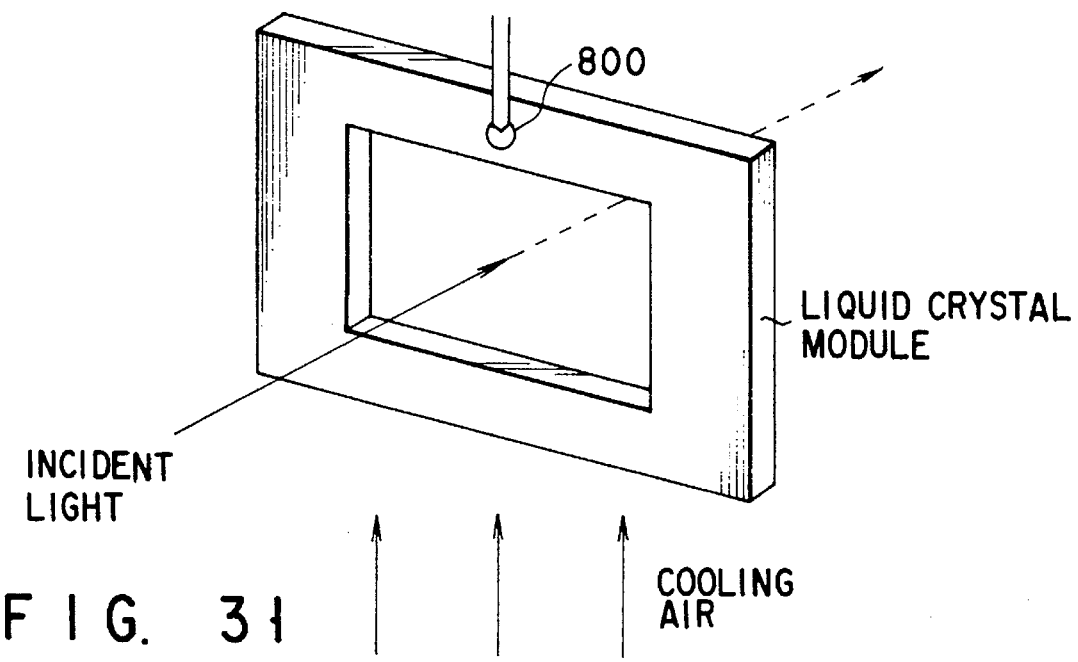
FIG. 31 is a perspective view showing the position of a temperature sensor in the display apparatus in FIG. 28.

In this display apparatus, as illustrated in FIG. 31, a temperature sensor 800 is arranged near the display portion of the plane of incidence of the liquid crystal module. On the basis of a temperature signal (TS) from this sensor, an input brightness signal (BS) to a driving voltage supply circuit 731 is controlled. Consequently, video signals $V_{SR}$, $V_{SG}$, and $V_{SB}$ are respectively supplied to the liquid crystal panels 301-R, 301-G, and 301-B via a polarity inverting/noninverting amplifier 741.

As the temperature sensor, it is possible to use, e.g., μPC3911 (tradename: manufactured by NEC Corp.) In this IC a reference voltage, a temperature sensor, and an operational amplifier with a phase compensator are integrated in a single chip, so only a few external circuit components are required. In addition, this temperature sensor is very superior in linearity to conventional temperature sensors such as thermistors and can therefore perform temperature measurements with a high accuracy. A practical circuit of the sensor is depicted in FIG. 32.

As shown in FIG. 28, the input brightness signal (BS) to the driving voltage supply circuit 731 is controlled on the basis of the temperature signal (TS) from the temperature sensor. Consequently, the video signals ($V_{SR}$), ($V_{SG}$), and ($V_{SB}$) are supplied to the liquid crystal panels 301-R, 301-G, and 301-B, respectively, via a polarity inverting/noninverting amplifier 751.

In the driving voltage supply circuit 731, as illustrated in FIG. 33, an analog-to-digital converter 733 converts the input brightness signal (BS) into a digital signal. A gamma-correcting circuit 734 constituted by a ROM performs gamma correction for the brightness signal (BS) in the digital signal form and supplies the gamma-corrected digital brightness signal to one input terminal of an adder 735. In addition, on the basis of the temperature signal (TS) from the temperature sensor, a temperature-compensating circuit 736 constituted by a ROM supplies, to the other input terminal of the adder 735, compensation data for correcting the temperature dependence of the light transmittance (T)-voltage (V) characteristic of the liquid crystal panel 301-G. The adder 735 outputs the sum of the digital brightness signal and the compensation data to a digital-to-analog converter 737. The digital-to-analog converter 737 outputs an analog signal to the polarity inverting/noninverting amplifier 731.

The polarity inverting/noninverting amplifier 731 amplifies the analog signal to have a signal level required for the liquid crystal panel 301-G and converts the signal into a video signal ($V_{SG}$) which inverts its polarity with respect to the reference voltage at a predetermined frequency for, e.g., each field period or each scan period. The amplifier 731 supplies the video signal ($V_{SG}$) to the liquid crystal panel 301-G.

Likewise, the liquid crystal panels 301-R and 301-B are supplied with video signals ($V_{SR}$) and ($V_{SB}$) corrected on the basis of the temperature signal (TS) from the temperature sensor provided in the liquid crystal panel 301-G.

More specifically, this gamma-correcting circuit 734 is so designed as to perform gamma correction for the brightness signal (BS) applied on the basis of the voltage (V)-light transmittance (T) characteristic when the internal temperature of the liquid-crystal panel 301-G is 40° C. For example, assuming that the reference internal temperature of the liquid crystal panel 301-G is 40° C., the compensation data from a temperature-compensating circuit 746 increases toward the positive side as the temperature rises from 40° C. and decreases toward the negative side as the temperature falls from 40° C.

A rotational number of the cooling fan for cooling the panel is controlled corresponding to the panel temperature monitored by the temperature sensor, and thus, the temperature of the panel can be controlled. As a result, it is possible to precisely control the picture signal corresponding to the panel temperature. It is, therefore, desirable to control the cooling fan on the basis of the output of the temperature sensor. In addition, when the panel temperature elevates immediately after switching-on of the light source, it is desirable to stop the rotation of the fan for a determined time, or to suppress the rotation of the fan, thus shortening the time reaching the steady operation temperature.

In this projection liquid crystal display apparatus 300 as discussed above, the display state is optimized in accordance with temperature changes in the liquid crystal panels 301-R, 301-G, and 301-B. Therefore, proper driving can be done constantly even if the liquid crystal panels 301-R, 301-G, and 301-B keep changing their temperatures for a time period of, e.g., 3 to 30 minutes, which is required for the liquid crystal panels 301-R, 301-G, and 301-B to reach a predetermined temperature after the light source 311 is turned on when the projection liquid crystal display apparatus 300 is used at relatively low room temperatures. Consequently, good displayed images free from color variations or the like can be obtained.

In particular, in this display apparatus the aperture diameters $D_1$ and $D_2$ of the first and second aperture stop means 351 and 503 are varied in accordance with the luminance of the screen. Therefore, since the intensity of the incident light to the liquid crystal panels 301-R, 301-G, and 301-B changes depending on the aperture diameter $D_1$ of the first aperture stop means 351, the degree of the temperature rise in the liquid crystal panels 301-R, 301-G, and 301-B changes accordingly.

That is, when the screen luminance is small, a high contrast, rather than a high display luminance, is visually recognized as a good displayed image. Therefore, the aperture diameter $D_1$ of the first aperture stop means 351 is decreased. In contrast, when the screen luminance is large, the display luminance is considered to be of more importance. Therefore, the aperture diameter $D_1$ of the first aperture stop means 351 is increased. Consequently, as the screen luminance increases, the degree of the temperature rise in the liquid crystal panels 301-R, 301-G, and 301-B increases. As an example, in this embodiment the temperature of the liquid crystal panels 301-R, 301-G, and 301-B changes by 3° to 5° C. when the angle of collection $\Omega_1$ of the light-source light incident on the liquid crystal panels 301-R, 301-G, and 301-B changes from $8.6\times10^{-3}$ sr to $1.1\times10^{-3}$ sr.

In this embodiment, however, the temperature sensor is arranged in the liquid crystal panel 301-G to constantly monitor the temperature to thereby optimize the video signals ($V_{SR}$), ($V_{SG}$), and ($V_{SB}$). As a consequence, good displayed images can be obtained even if the temperature of the liquid crystal panels 301-R, 301-G, and 301-B changes due to an increase or decrease in the angle of collection $\Omega_1$ of the light-source light when the aperture diameter $D_1$ of the first aperture stop means 351 is varied.

In this display apparatus, the aperture diameters $D_1$ and $D_2$ of the first and second aperture stop means 351 and 503 are controlled by the first aperture control means 721 in accordance with the environmental luminance signal (ES). It is also possible to control the aperture diameters $D_1$ and $D_2$ of the first and second aperture stop means 351 and 503 on the basis of the video signals ($V_{SR}$), ($V_{SG}$), and ($V_{SB}$) supplied to the liquid crystal panels 301-R, 301-G, and 301-B. In this case the control is based on the difference between the time average intensity of the brightness signal (BS) and the blanking level (black level) of the brightness signal. That is, if the difference is small, the aperture diameters $D_1$ and $D_2$ are decreased to decrease the angle of collections $\Omega_1$ and $\Omega_2$. If the difference is large, the aperture diameters $D_1$ and $D_2$ are increased to increase the angle of collections $\Omega_1$ and $\Omega_2$. Consequently, good displayed images can be obtained.

The first and second aperture stop means 351 and 503 can also be controlled in accordance with both the environmental luminance signal (ES) and the brightness signal (BS).

In this display apparatus, the temperature sensor is so arranged as to be able to directly monitor the temperature of the polymer dispersion type (PD type) liquid crystal layer 401. However, it is also possible to detect a signal correlated to the temperature of the polymer dispersion type liquid crystal layer and perform control on the basis of the detected signal.

Also, in this display apparatus the temperature of the liquid crystal panel 301-G is constantly monitored, and the display state is optimized on the basis of the temperature signal (TS). However, instead of using the temperature sensor, compensation data can be set such that the video signals ($V_{SR}$), ($V_{SG}$), and ($V_{SB}$) are gradually decreased each predetermined period of time.

In the above display apparatus, the temperature sensor is arranged in an upper portion of the display portion on the incident side. This position can be a lower portion or a right or a left portion as long as the temperature can be measured accurately. In addition, the temperature sensor can be either in contact with or spaced apart from the liquid crystal module or can be arranged inside the liquid crystal module. Furthermore, the temperature sensor can be arranged on the light exit side.

As discussed earlier, the angle of collection of the aperture stop on the light source side desirably agrees with the angle of collection of the aperture stop on the projection side, for otherwise the performance degrades as follows. That is, if the angle of collection of the aperture stop on the light source side is larger than the angle of collection of the aperture stop on the projection side, although the maximum luminance remains the same as when the two angles are in agreement, the contrast decreases due to an increase in the luminance in a black display. Likewise, if the angle of collection of the aperture stop on the light source side is smaller than the angle of collection of the aperture stop on the projection side, the contrast decreases due to an increase in the luminance in a black display, although the maximum luminance remains unchanged from that in the agreement case. Since the luminance in a black display increases almost in proportion to the area of the aperture stop, the contrast also decreases nearly proportionally to the area of the aperture stop.

Assuming that the area of the aperture stop is $S_0$ and the area of the aperture stop with a larger angle of collection is $S_0+\Delta S$ when the angle of collection of the aperture stop on the light source side is in completely agreement with the angle of collection of the aperture stop on the projection side, contrast r' when the angle of collections are in disagreement is represented by the following equation as a function of contrast r when the angle of collections are in agreement.

$$r'=r\{S_0/(S_0+\Delta S)\}$$

According to an experiment made by the present inventors, a decrease in the contrast is recognized as a decrease in the image quality when the contrast decreases to about ⅔. The procedure of this experiment will be described below.

A motion picture was projected for 10 minutes with the contrast of the display screen held constant, and then for 5 minutes after the contrast was changed. Thereafter, information on whether the contrast change was recognized as degradation in the image quality was obtained through a questionnaire, thereby calculating a threshold value at which the change was recognized as degradation.

As shown in FIG. 34, the experiment was conducted by setting the initial value of the threshold value of the contrast to 200:1, 100:1, 50:1, and 20:1. As a result, when the initial value was 100:1 or smaller, the change began to be recognized as degradation in the image quality from about 85% of the initial value and was recognized as degradation in the image quality for most samples at about 65% of the initial value. Therefore, the aperture control must be done at an accuracy with which a reduction in the contrast is 40% or lower for displayed images of the same luminance.

That is, it is necessary to control the solid angle within the range of about ±30%. For example, when circular aperture stops are used, a control accuracy of ±0.15 θ is required with respect to an apex angle θ of a conical light flux. For example, if a change in the angle of collection of the aperture stop is θ=3° to 10°, the accuracy of the aperture stop angle of collection must be controlled within the range of ±0.5° to ±1.5°.

An aperture adjustment margin with respect to the screen luminance (unit:cd/m²) will be described below.

If the screen luminance (unit:cd/m²) resulting from external light is high, a change in the contrast with respect to the angle of collection is modest compared to that when there is no external light. Consequently, the necessary control accuracy decreases as the external light increases.

As illustrated in FIG. 5, the optimized contrast is nearly one half of an original contrast free from the influence of external light. For example, when the illuminance of a room is 0 lux, the optimum contrast is 50 in correspondence with the aperture stop state in which the contrast is 100. Similarly, a contrast corresponding to a contrast of 30 is about 15.

It is therefore considered that when the angle of collection of the aperture stop is optimized with respect to external light, the luminance of the screen in an original black display is almost equal to the luminance of the screen under the influence of external light.

If the contrast is shifted from its optimum value due to an error occurring in the control of the angle of collection, the contrast is given by the following equation.

$$r' = r\{(S_{ext} + S_0)/(S_{ext} + S_0 + \Delta S)\}$$
$$= r\{S_0/(S_0 + \Delta S/2)\}$$

Note that $S_{ext}$ indicates a value obtained by converting the luminance of the external light into the angle of collection of the aperture stop in a black display of the projection display apparatus. Since the original black display of the projection display apparatus is equal to the influence of the luminance of the external light, $S_{ext}=S_0$.

As can be seen from the above equation, the margin is doubled. However, when the presence of a margin pertaining to the agreement between the two aperture stops discussed above is taken into consideration, an error of the aperture stop angle of collection to be controlled with respect to the external conditions is one half the margin. Therefore, in this case a margin concerning the agreement between the angle of collections of the two aperture stops is also required as the margin.

There will be described the fifth aspect of the present invention with reference to FIG. 41. The fundamental structure of the apparatus shown in FIG. 6A is substantially the same as that shown in FIG. 28.

Figure 41:
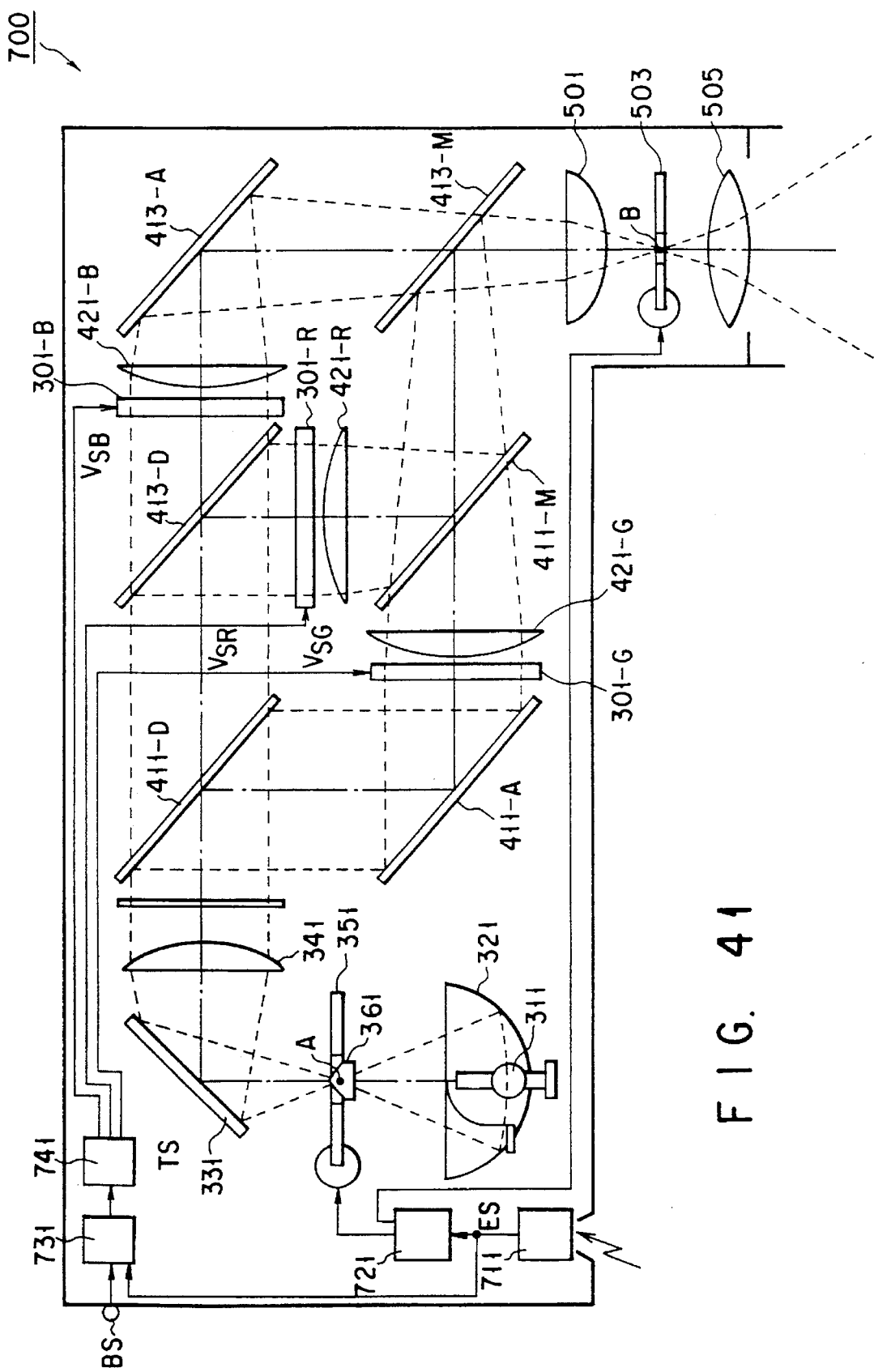
FIG. 41 is a view showing the arrangement of a projection liquid crystal display apparatus according to the fifth aspect of the present invention.
Figure 42:
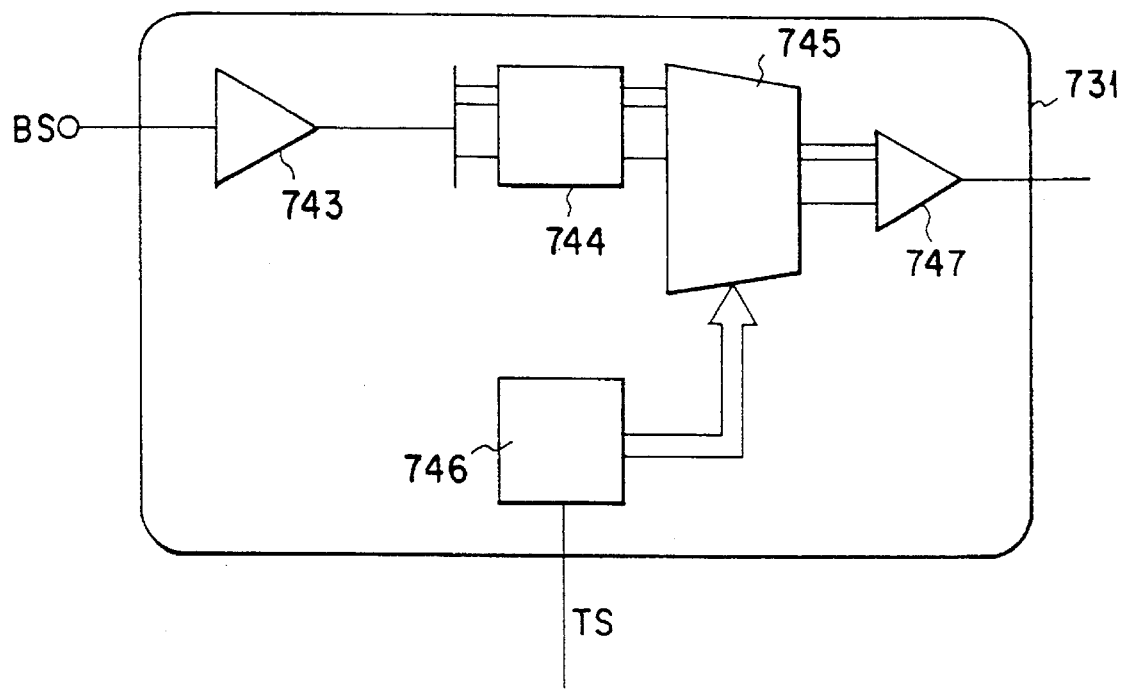
FIG. 42 is a view showing a driving voltage supply circuit in the display apparatus in FIG. 41.

As shown in FIG. 41, the display apparatus has a driving voltage supply circuit 731 for supplying the video signals ($V_{SR}$), ($V_{SG}$), and ($V_{SB}$) to the liquid crystal panels 301-R, 301-G, and 301-B, respectively, and a polarity inverting/noninverting amplifier 751.

In the driving voltage supply circuit 731, as illustrated in FIG. 33, an analog-to-digital converter 733 converts the input brightness signal (BS) into a digital signal. A gamma-correcting circuit 734 constituted by a ROM performs gamma correction for the brightness signal (BS) in the digital signal form and supplies the gamma-corrected digital brightness signal to one input terminal of an adder 735. In addition, on the basis of the environmental luminance signal (ES) from the photosensor, a light-leak-compensating circuit 744 constituted by a ROM supplies, to the other input terminal of the adder 745, compensation data for correcting the potential lowering due to light leak current ($I_{off}$) of TFT 541 constituting the liquid crystal panel 301-G. The adder 745 outputs the sum of the digital brightness signal and the compensation data to a digital-to-analog converter 747. The digital-to-analog converter 747 outputs an analog signal to the polarity inverting/noninverting amplifier 741.

The polarity inverting/noninverting amplifier 741 amplifies the analog signal to have a signal level required for the liquid crystal panel 301-G and converts the signal into a video signal ($V_{SG}$) which inverts its polarity with respect to the reference voltage at a predetermined frequency for, e.g., each field period or each scan period. The amplifier 741 supplies the video signal ($V_{SG}$) to the liquid crystal panel 301-G.

Similarly, video signals ($V_{SR}$) and ($V_{SB}$) corrected based on the environmental luminance signal (ES) supplied from the photosensor 711 are supplied to the other liquid crystal panels 201-R and 201-B. In this case, the aperture stop control means 721 controls the aperture D1 of the first aperture stop means 151 and the aperture D2 of the second aperture stop means 503, such that the light-collecting angles $\Omega_1$ and $\Omega_2$ increase as the luminance of the screen increases. At the same time, the drive voltage supplying circuit 731 also control the apertures $D_1$ and $D_2$ so that the video signals $V_{SR}$, $V_{SG}$ and $V_{SB}$ supplied to the liquid crystal panels 201-R, 201-G and 201-B may increase in magnitude.

The operation of the projection type display apparatus described above will now be explained briefly.

First, the photosensor 711 detects the luminance (in cd/m$^2$) on the screen, generating an environmental luminance signal (ES). From the signal (ES) the aperture stop control means 721 determines apertures $D_1$ and $D_2$ appropriate for the first aperture stop means 151 and the second aperture means 503. The higher the screen illuminance, the greater the apertures $D_1$ and $D_2$.

In the case where the drive voltage supplying circuit 731 does not optimize the video signals ($V_{SR}$), ($V_{SG}$) and ($V_{SB}$) because the screen illuminance is as low as 30 lux, the converting angles $\Omega_1$ and $\Omega_2$ are set at $1.1\times10^{-3}$ sr, achieving contrast ratio of 70:1. If screen illuminance is as high as 200 lux, the angles $\Omega_1$ and $\Omega_2$ are set at $8.6\times10^{-3}$ sr, providing high display peak luminance flux of 75 lm, much higher than the display peak luminance flux of 18 lm attained when the angles $\Omega_1$ and $\Omega_2$ are limited to $1.1\times10^{-3}$ sr.

In this embodiment, when the screen illuminance is 200 lux, the drive voltage supplying circuit 731 increases in accordance with the signal (ES) the magnitudes of the video signals ($V_{SR}$), ($V_{SG}$) and ($V_{SB}$) by about 10%, as compared with the case where the screen luminance is 30 lux.

When the video signals ($V_{SR}$), ($V_{SG}$) and ($V_{SB}$) were optimized in this way, both the contrast ratio and the display luminance increased about 10% from the values specified above, when the screen illuminance is 200 lux.

In this embodiment, the contrast ratio and the display luminance are prevented from degrading despite the light-leakage current Ioff which flows through the FET 241 due to an increase in the angle of collection $\Omega_1$. The embodiment can therefore attains sufficient display quality.

In the present embodiment, the second aperture stop means 503 is driven in complete interlock with the first aperture stop means 151 so that its aperture $D_2$ may equal to the aperture $D_1$ of the first aperture stop means 151. Nonetheless, the the second aperture stop means 503 may be driven to have its aperture changed differently from that of the first aperture stop means 151.

In this embodiment, three aperture stop means may be provided for the liquid crystal panels 201-R, 201-G and 201-B, respectively, so that the angle of collection $\Omega_1$ can be controlled for each color independently. In the embodiment, the aperture stop control means 721 controls the angle of collection $\Omega_1$ for the first and second aperture stop means 151 and 503 in accordance with the environmental luminance signal (ES). Nevertheless, the first aperture stop means 151 and the second aperture stop means 503 may be controlled by a brightness signal (BS) input to the drive voltage supplying circuit 741. Alternatively, the environmental luminance signal (ES) and the brightness signal (BS) may be used in combination to control the first and second aperture stop means 151 and 503. For example, the angles $\Omega_1$ and $\Omega_2$ may changed in accordance with the difference between the average magnitude of the brightness signal (BS) and the blank level (black level) of the brightness signal (BS). More specifically, the angles $\Omega_1$ and $\Omega_2$ are set at small values when the difference is small, and at large values when the difference is large. High-quality images can therefore be displayed, irrespective of their display luminance.

In this embodiment, the photosensor 711 monitors the luminance of the screen. Instead, it may monitor the environmental illuminance (lux).

This embodiment is a three-plate projection type display apparatus 100. The present invention is not limited to this type of a projection display apparatus. Rather, it can be applied to a single-plate projection display apparatus which has a liquid crystal panel with color filters of three primary colors which are arranged in a striped or mosaic pattern.

Since the micro-lens array substrate 411 is used in combination with the liquid crystal panels 201-R, 201-G and 201-B, the effective aperture of each panel is great enough to enhance the effective contrast and the display luminance on the screen.

Figure 43:
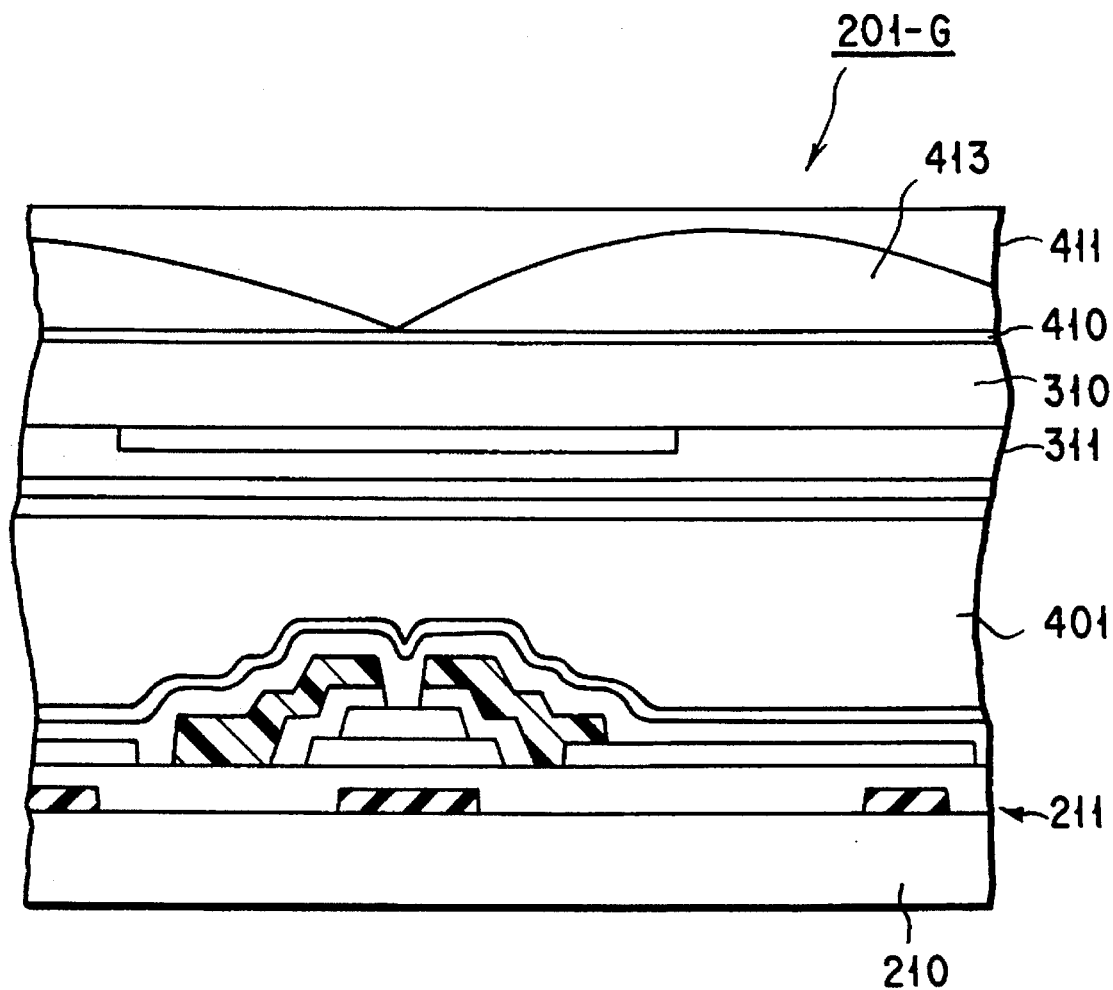
FIG. 43 is a sectional view showing the arrangement of the modulating device used in the display apparatus in FIG. 41.

The liquid crystal panel 201-G will now be described with reference to FIG. 43. A microlens array substrate 411 is adhered onto the major surface of the substrate 311 constituting the panel 201-G, with an adhesive layer 410 interposed between them. The substrate 411 includes a group of focusing lenses 413 corresponding to the respective display picture elements, and the focal point of each lens 413 is set so as to fall within the glass substrate 210.

If the liquid crystal panels 201-R, 201-G and 201-B are constituted as described above, the light, which was shielded by the light-shielding layer 313, can be utilized effectively; therefore, the effective aperture rate of each of the panels 201-R, 201-G and 201-B can be increased and, even if the angle of collections $\Omega_1$ and $\Omega_2$ are narrowed, a considerable peak flux is obtained, and the displayed luminance is prevented from decreasing.

When the microlens array substrate 411 is provided on the light-incoming side of the liquid crystal panel 201-G as in the above embodiment, it is preferable that the aperture diameter $D_2$ of the second aperture stop means 503 be set larger than the diameter $D_1$ of the first aperture stop means 151. This is because the light focused by the microlens is scattered afterward.

More specifically, when the microlens array substrate 411 is arranged on only the light-incoming side as in the above embodiment, the efficiency of use of the light focused in the vicinity of the light-shielding layer 313 by the microlens array substrate 411, is likely to decrease, since the light is scattered afterward. It is thus important to determine the focal point of each focusing lens 413 of the substrate 411. In other words, the focal point has to be set such that the scattered light falls within the projection lens 505. To miniaturize the projection lens 505, the focal length of each focusing lens 413 should be greater and the numerical aperture thereof should be smaller. However, as the distance between the focal point and the light-incoming side increases, the effect of the microlens array substrate 411 lowers and so does the degree of increase in the effective aperture rate of each liquid crystal panel. Consequently, it is advisable to set the focal point of each focusing lens 413 within the substrate 210 on the light-outcoming side or slightly outside the substrate 210 rather than within the PD-type liquid crystal layer 410.

According to the above embodiment, the servo motors are used as the first and second aperture stop 151 and 503, as shown in FIG. 41, and the diameters $D_1$ and $D_2$ of circular apertures are varied by the servo motors. However, the shape of the apertures can be rectangular, elliptic, and the like. Furthermore, the light-shielding plate for shielding the upper and lower portions of the apertures by the servo motors can be movably constituted.

In the above embodiment, the angle of collections $\Omega_1$ and $\Omega_2$ are controlled by controlling the aperture diameters $D_1$ and $D_2$ of the first and second aperture stop means 151 and 503 by the first aperture stop control means 721. However, the angle of collections can be controlled by controlling the aperture diameters by moving the first and second aperture stop means along the optical axis of the light source 111.

The active matrix type liquid crystal panel in which a switching element of TFT is provided for each of the display picture elements, has been described as a liquid crystal panel of the above embodiment. The TFT can be formed mainly of a polycrystalline silicon film or a monocrystalline silicon film.

The sixth aspect of the present invention will be described below.

Figure 35:
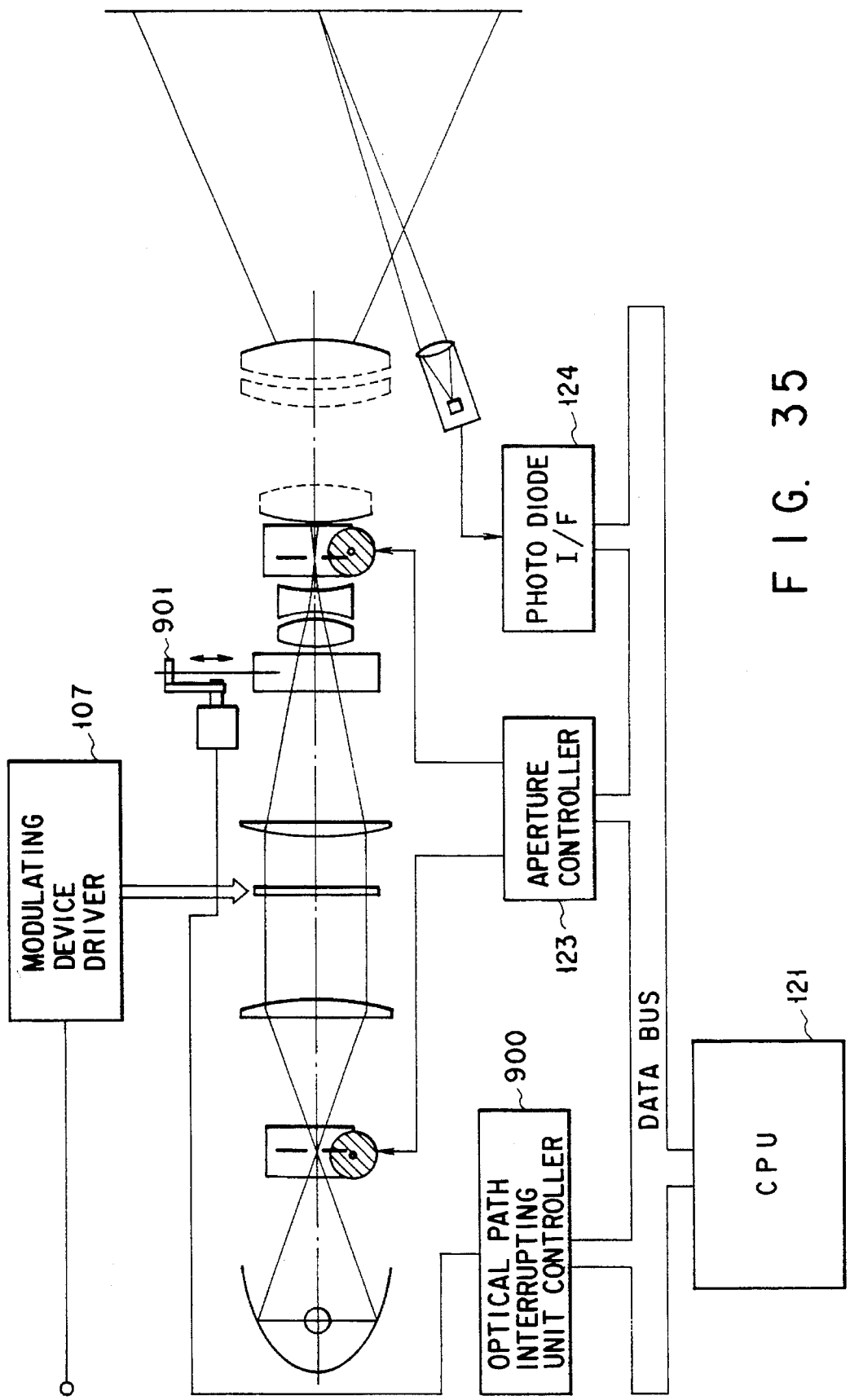
FIG. 35 is a block diagram showing the arrangement of a simplified projection display apparatus according to the sixth aspect of the present invention.

This aspect relates to a simplified projection display apparatus. To simplify the operation, after a power supply is turned on the setting of aperture stops is automatically optimized in accordance with the ambient luminance. FIG. 35 shows one embodiment of this simplified projection display apparatus. In this display apparatus, by assuming the size and the gain of a screen in advance, the luminance of the screen is directly measured by measuring a projected bundle of rays with no projected light present. This makes it possible to rapidly determine the optimum angle of the aperture stops. This determination of the aperture stop angle of collection is done automatically at the same time the power supply of the projection display apparatus is turned on.

This display apparatus includes an optical path interrupting unit 901 in order to measure the luminance of the screen with no projected light from the projection display apparatus. As in FIG. 35, this optical path interrupting unit 901 is arranged on the exit side of the panel. The unit 901 is controlled by an optical path interrupting unit controller 900 to perform switching between the interrupted and the non-interrupted states of the light from a light source at the entrance of projection lenses.

Figure 36:
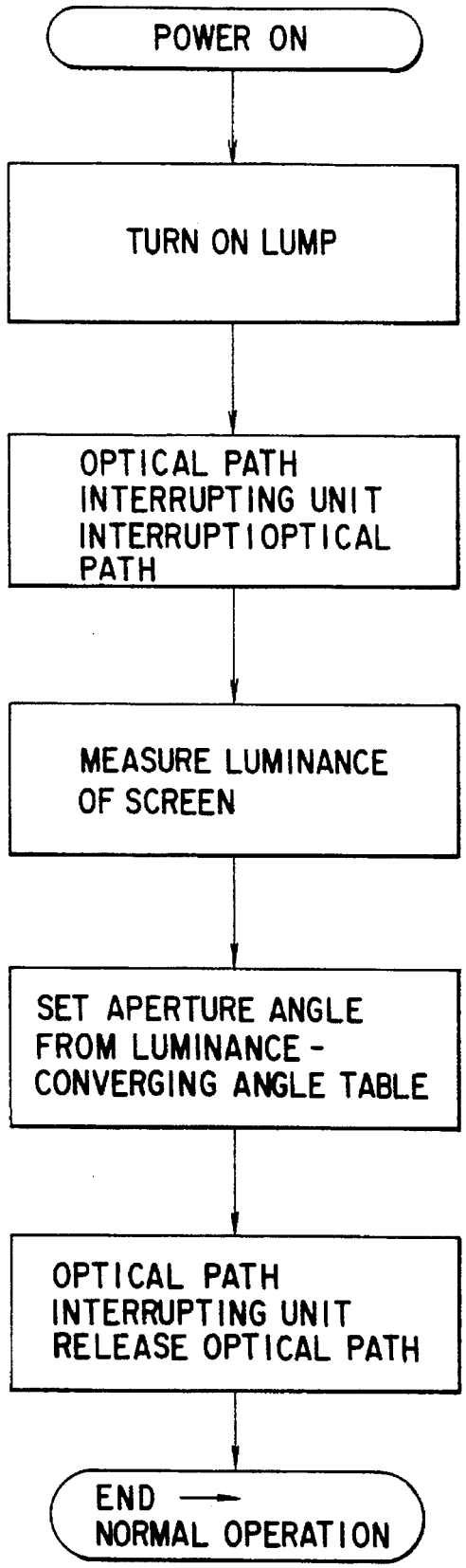
FIG. 36 is a flow chart showing the processing of automatically determining the angle of collection after a power supply is turned on in the display apparatus shown in FIG. 35.

FIG. 36 is a flow chart showing the processing of automatically determining the angle of collection after an ON operation of the power supply in the display apparatus illustrated in FIG. 35. It takes a few minutes to completely turn on a metal halide lamp as the light source. In the display apparatus shown in FIG. 35, the luminance of the screen resulting from the brightness of a room is measured with the optical path interrupted by the optical path interrupting unit. Therefore, a user need not wait until the luminance of the lamp reaches a steady state. In this processing, the lamp is turned on (application of a high voltage and discharge are started) first, but the luminance of the screen is measured to determine the angle of collection of the aperture stops without waiting until the lamp is completely turned on.

Figure 37:
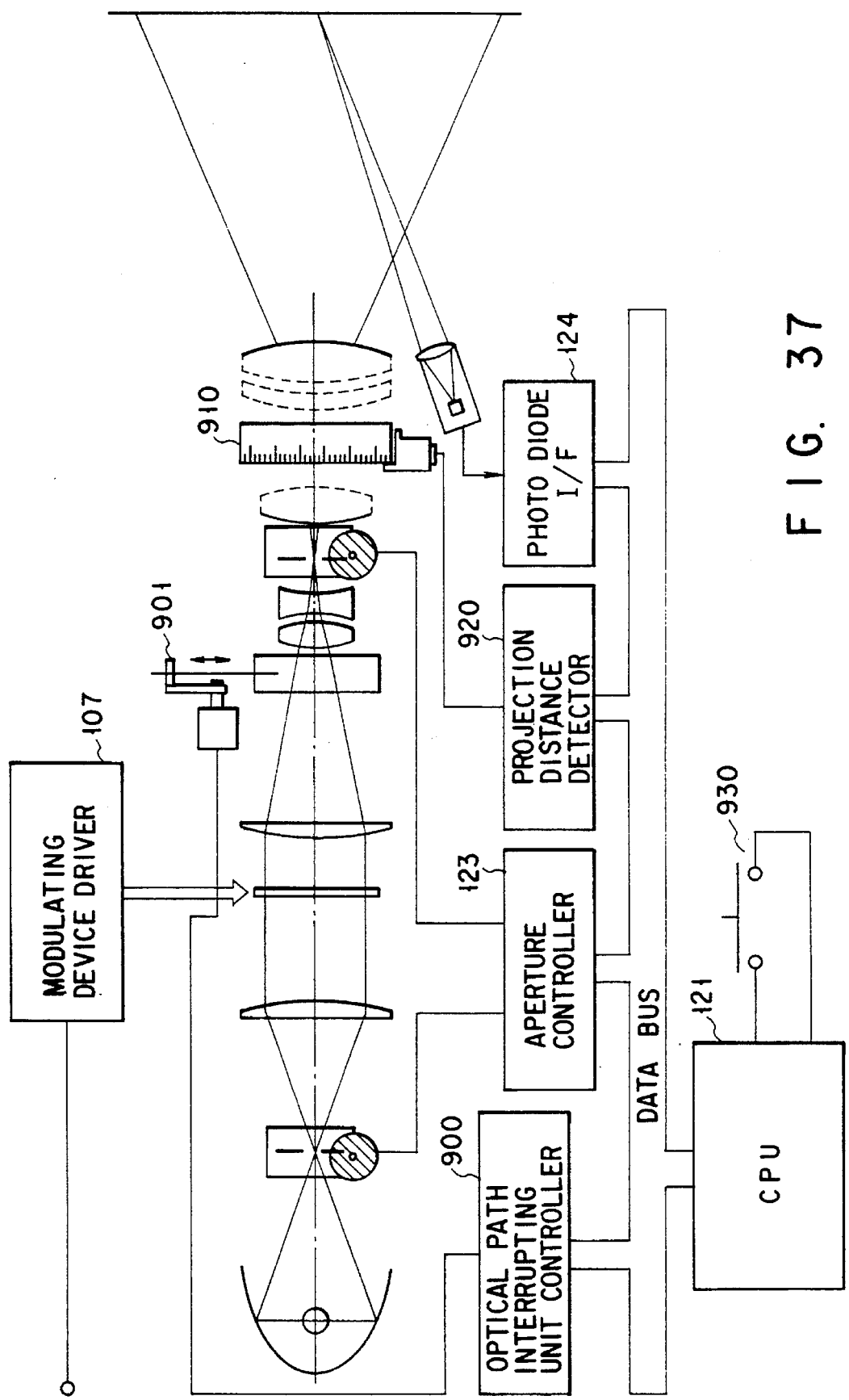
FIG. 37 is a block diagram showing the arrangement of another embodiment of the simplified projection display apparatus.

FIG. 37 shows another embodiment of the simplified projection display apparatus. To simplify the operation, this display apparatus includes an encoder 910 in projection lenses to detect the focal position of the projection lenses. A projection distance detector 920 allows a CPU to detect the output from the encoder 910. Therefore, the screen size can be detected by the projection distance detector 920.

In the display apparatus illustrated in FIG. 37, a projection coefficient q in the following equation is automatically calculated by assuming the screen gain is 1.5. Consequently, since only $L_0$ is unknown, luminance $L_0$ of a room can be obtained by measuring screen luminance L, in the state of I=0, by an optical path interrupting unit.

$$L=qI+L_0$$

Figure 38:
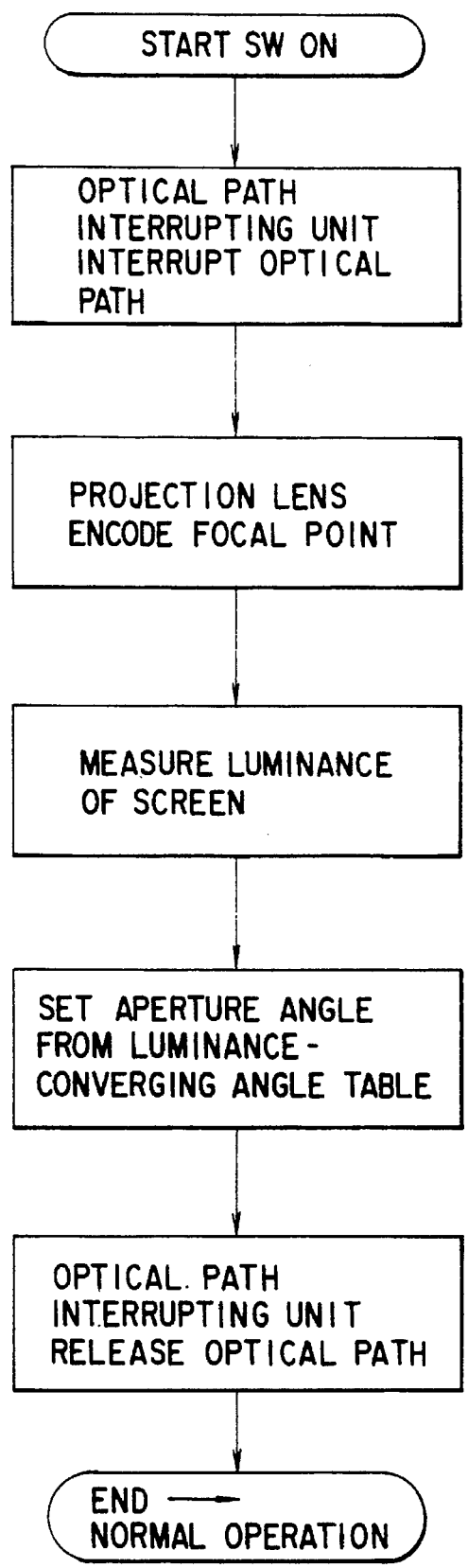
FIG. 38 is a flow chart showing the processing of automatically determining the angle of collection in the display apparatus shown in FIG. 37.

FIG. 38 is a flow chart showing the processing of automatically determining the angle of collection in the display apparatus of FIG. 37. In this display apparatus the screen size is detected by the focal position of the projection lenses. Therefore, after the focal point of a projected image is obtained, optimization of the aperture stops is executed by depressing an aperture stop optimization switch.

The display quality of this projection type display apparatus changes depending on the luminance of black level of a screen which depends on various environmental luminance levels as of a projection location and a time zone. In correction using the display quality by the environmental luminance in a front projection type display apparatus, a large distance is present between the front projection type display apparatus and the screen, and the environmental luminance of a location at which the projection display apparatus is located is different from the luminance around the screen. In practice, the illuminance and luminance of the illumination which are determined by the screen surface almost vertically standing and the screen gain contribute to the display quality. For this reason, the display quality is greatly influenced by environmental illumination conditions around the screen and external light from a room window. It is therefore important to control the display quality of the projection type display apparatus by directly monitoring the screen surface luminance changed by the environmental luminance. In an application field such as a conference, the environmental luminance of an entire room or part of the room is preferably controlled in accordance with a use condition, or the display quality is preferably adjusted in accordance with the screen surface luminance at the final stage because the environmental luminance around the screen changes from an adjustment stage to the final operation stage. For this purpose, it is important that a photosensor for monitoring the luminance of black display level and the contrast level on the screen surface of the display apparatus is arranged in the projection display apparatus, thereby performing a higher-quality image display.

The embodiments of front projection type display apparatuses using a reflection screen have been described above. However, the present invention is not limited to these embodiments but can be applied to rear projection type display apparatuses as shown in FIGS. 39 and 40.

Figure 39:
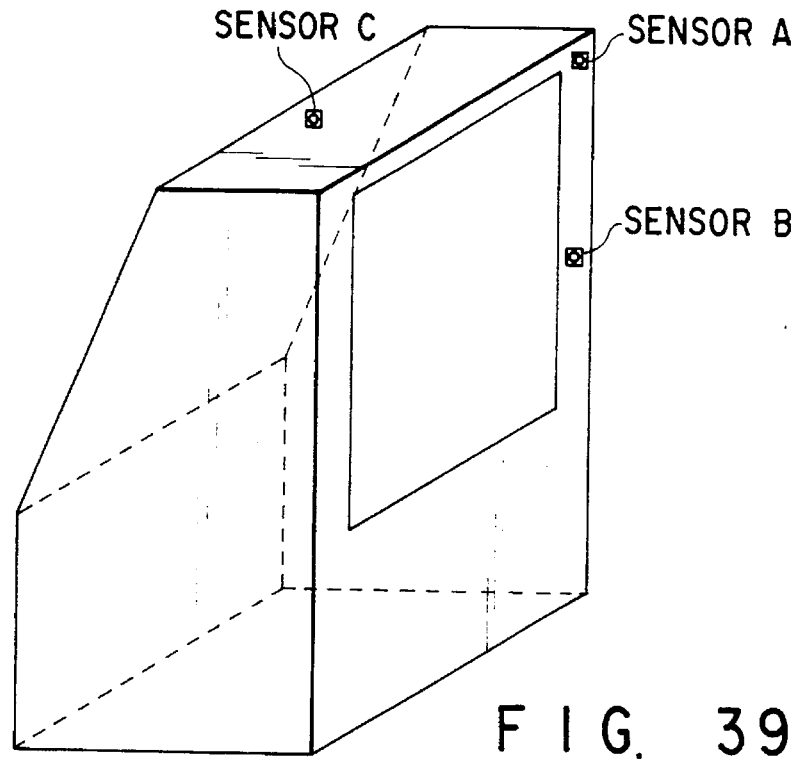
FIG. 39 is a perspective view showing a rear projection type display apparatus.
Figure 40:
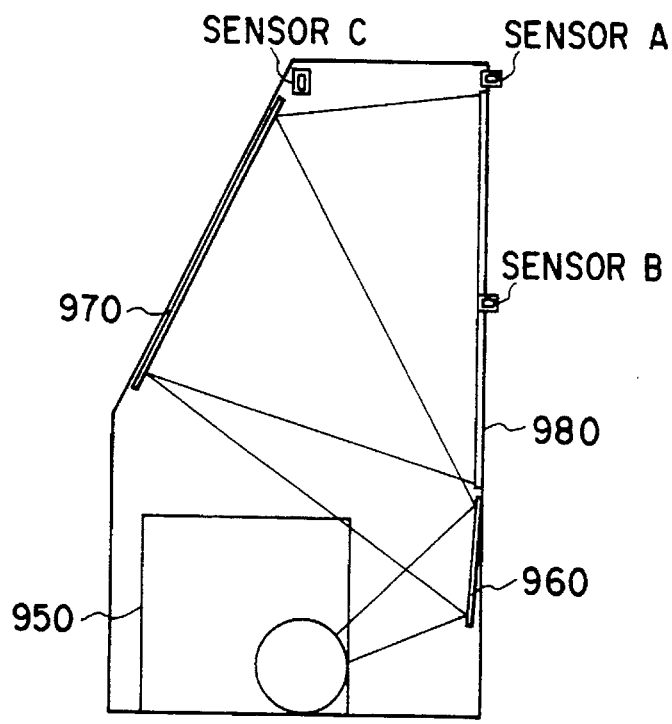
FIG. 40 is a sectional view showing the rear projection type display apparatus in FIG. 39.

In a rear projection type display apparatus illustrated in FIGS. 39 and 40, the light from an optical system 950 is reflected by a first mirror 960 and a second mirror 970 and projected on a transmission screen 980. The apparatus also includes an optical sensor for measuring the screen luminance resulting from external light. In the front projection type display apparatuses discussed above, the optical sensor is arranged on the side of the projection lenses and directed to the screen to measure the intensity of the reflected light from the screen. In this rear projection type display apparatus, as illustrated in FIGS. 39 and 40, the optical sensor can be mounted on the peripheral portion of the screen, like a sensor A or B, to measure the illuminance. In rear projection type display apparatuses, the characteristics of the screen are already determined in many cases. Therefore, it is possible to estimate the screen luminance from the illuminance.

The optical sensor can also be arranged inside the screen, like a sensor C, to measure the luminance of external light passing through the screen. In order for these sensors to be able to measure only the influence of pure external light, these sensors, of course, must be so arranged that the light from the projection optical system is not incident on the sensors.

In addition, in rear projection type display apparatuses the projection coefficient q in the above equation is already determined. Therefore, an optimum aperture stop angle of collection can be determined only by measuring luminance $L_0$ of external light.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A display apparatus comprising:

a light source;

a modulating device for modulating light emitted from said light source;

first aperture stop means, arranged between said light source and said modulating device, for limiting a bundle of rays to be incident on said modulating device from said light source, said first aperture stop means having an aperture with a variable size;

a display screen onto which exit light from said modulating device is projected;

a projection optical system for projecting the exit light from said modulating device onto said display screen;

second aperture stop means, arranged between said modulating device and said projection optical system, for limiting a bundle of rays to be incident on said projection optical system from said modulating device, said second aperture stop means having an aperture with a variable size;

aperture control means for controlling the size of the aperture of at least one of said first and second aperture stop means; and liquid crystal driving means for supplying to said modulating device a picture signal controlled on the basis of the size of the aperture, which is controlled by said aperture control means, of at least one of said first and second aperture stop means.

2. An apparatus according to claim 1, further comprising a photosensor for detecting a display luminance on said display screen, wherein said aperture control means controls the size of the aperture of at least one of said first and second aperture stop means on the basis of a display luminance signal from said photosensor.

3. An apparatus according to claim 2, wherein said aperture control means controls the size of the aperture of at least one of said first and second aperture stop means on the basis of the display luminance signal and a contrast signal from said photosensor.

4. An apparatus according to claim 3, wherein said photosensor detects a white level display luminance on said display screen on which a white image is displayed by a white image signal supplied from said liquid crystal driving means to said modulating device, and detects a black level display luminance on said display screen on which a black image is displayed by a black image signal supplied from said liquid crystal display means to said modulating device, and said aperture control means controls the size of the aperture of at least one of said first and second aperture stop means on the basis of a contrast calculated from a ratio of the white level display luminance to the black level display luminance detected by said photosensor.

5. An apparatus according to claim 4, wherein said aperture control means controls the size of the aperture of at least one of said first and second aperture stop means such that the contrast is maximized.

6. An apparatus according to claim 2, wherein said photosensor detects an environmental luminance on said display screen resulting from light of an environment in which said display apparatus is placed, and said aperture control means controls the size of the aperture of at least one of said first and second aperture stop means on the basis of an environmental luminance signal and the display luminance signal from said photosensor.

7. An apparatus according to claim 1, wherein said aperture control means controls angle of collections of said first and second aperture stop means.

8. An apparatus according to claim 7, wherein said aperture control means controls the size of the aperture of at least one of said first and second aperture stop means such that the angle of collections of said first and second aperture stop means are substantially equal to each other.

9. An apparatus according to claim 1, further comprising:

a spheroidal mirror arranged near said light source and having a focal point at the position of said light source; and a collimator optical system for guiding light reflected by said spheroidal mirror to said modulating device.

10. An apparatus according to claim 1, wherein said modulating device is one selected from the group consisting of a dispersion type liquid crystal device, and a slant field effect liquid crystal diffraction grating.

11. An apparatus according to claim 10, wherein said dispersion type modulating device is one of a polymer dispersion type modulating device and a fine-particle dispersion type modulating device.

* * * * *